United States Patent
Lim et al.

(10) Patent No.: US 12,267,492 B2
(45) Date of Patent: *Apr. 1, 2025

(54) IMAGE ENCODING/DECODING METHOD AND DEVICE EMPLOYING IN-LOOP FILTERING

(71) Applicant: INTELLECTUAL DISCOVERY CO., LTD., Seoul (KR)

(72) Inventors: Sung Chang Lim, Daejeon (KR); Jung Won Kang, Daejeon (KR); Ha Hyun Lee, Seoul (KR); Dong San Jun, Daejeon (KR); Hyun Suk Ko, Daejeon (KR); Jin Ho Lee, Daejeon (KR); Hui Yong Kim, Daejeon (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,315

(22) Filed: Dec. 28, 2023

(65) Prior Publication Data
US 2024/0137507 A1  Apr. 25, 2024

Related U.S. Application Data

(63) Continuation of application No. 17/676,698, filed on Feb. 21, 2022, now Pat. No. 11,943,436, which is a
(Continued)

(30) Foreign Application Priority Data

Nov. 29, 2017  (KR) .................. 10-2017-0162230
Jun. 15, 2018  (KR) .................. 10-2018-0068908
(Continued)

(51) Int. Cl.
*H04N 19/00* (2014.01)
*H04N 19/105* (2014.01)
(Continued)

(52) U.S. Cl.
CPC ........ *H04N 19/117* (2014.11); *H04N 19/105* (2014.11); *H04N 19/132* (2014.11);
(Continued)

(58) Field of Classification Search
CPC .. H04N 19/117; H04N 19/105; H04N 19/132; H04N 19/176; H04N 19/186; H04N 19/1883; H04N 19/82
See application file for complete search history.

(56) References Cited

U.S. PATENT DOCUMENTS

2010/0091127 A1* 4/2010 Hampton ............... G06V 10/52
                                                             348/E5.022
2011/0243249 A1* 10/2011 Lee ....................... H04N 19/122
                                                             375/E7.2
(Continued)

FOREIGN PATENT DOCUMENTS

CN  103096060 A  5/2013
CN  103621083 A  3/2014
(Continued)

OTHER PUBLICATIONS

Jicheng An et al., Unified Adaptive Loop Filter for Luma and Chroma, Document: JVET-G0095, Joint Video Exploration Team (JVET) of ITU-T SG 16 WP 3 and ISO/IEC JTC 1/SC 29/WG 11, 7th Meeting: Torino, IT, Jul. 13-21, 2017.
(Continued)

*Primary Examiner* — Zhihan Zhou
(74) *Attorney, Agent, or Firm* — BROADVIEW IP LAW, PC

(57) ABSTRACT

The present invention relates to a video encoding/decoding method and apparatus. The video decoding method according to the present invention may comprise decoding filter information on a coding unit; classifying samples in the coding unit into classes on a per block classification unit
(Continued)

basis; and filtering the coding unit having the samples classified into the classes on a per block classification unit basis by using the filter information.

11 Claims, 42 Drawing Sheets

Related U.S. Application Data continuation of application No. 16/768,634, filed as application No. PCT/KR2018/015014 on Nov. 29, 2018, now Pat. No. 11,290,715.

(30) Foreign Application Priority Data

| | | | |
|---|---|---|---|
| Jul. 16, 2018 | (KR) | ......................... | 10-2018-0082117 |
| Sep. 7, 2018 | (KR) | ......................... | 10-2018-0106849 |
| Sep. 21, 2018 | (KR) | ......................... | 10-2018-0114424 |
| Sep. 27, 2018 | (KR) | ......................... | 10-2018-0115327 |
| Oct. 4, 2018 | (KR) | ......................... | 10-2018-0118377 |
| Oct. 29, 2018 | (KR) | ......................... | 10-2018-0129908 |

(51) Int. Cl.
*H04N 19/117* (2014.01)
*H04N 19/132* (2014.01)
*H04N 19/169* (2014.01)
*H04N 19/176* (2014.01)
*H04N 19/186* (2014.01)
*H04N 19/82* (2014.01)

(52) U.S. Cl.
CPC ......... *H04N 19/176* (2014.11); *H04N 19/186* (2014.11); *H04N 19/1883* (2014.11); *H04N 19/82* (2014.11)

(56) References Cited

U.S. PATENT DOCUMENTS

| | | | |
|---|---|---|---|
| 2013/0101018 A1 | 4/2013 | Chong et al. | |
| 2014/0168362 A1* | 6/2014 | Hannuksela | ......... H04N 13/161 348/43 |
| 2014/0328387 A1 | 11/2014 | Puri et al. | |
| 2015/0146779 A1 | 5/2015 | Bang et al. | |
| 2015/0271517 A1* | 9/2015 | Pang | ....................... H04N 19/52 375/240.16 |
| 2015/0350685 A1 | 12/2015 | Lee et al. | |
| 2016/0234492 A1 | 8/2016 | Li et al. | |
| 2016/0277762 A1* | 9/2016 | Zhang | .................. H04N 19/593 |
| 2017/0237982 A1 | 8/2017 | Karczewicz et al. | |
| 2018/0091825 A1* | 3/2018 | Zhao | ..................... H04N 19/117 |
| 2018/0270480 A1* | 9/2018 | Zhang | .................. H04N 19/154 |
| 2019/0082179 A1* | 3/2019 | Ahn | ....................... H04N 19/184 |
| 2020/0137404 A1* | 4/2020 | Yoo | ....................... H04N 19/117 |
| 2020/0260120 A1* | 8/2020 | Hanhart | ............... H04N 19/513 |

FOREIGN PATENT DOCUMENTS

| | | |
|---|---|---|
| CN | 107211154 A | 9/2017 |
| CN | 108605126 | 9/2018 |
| JP | 2012-65120 A | 3/2012 |
| JP | 2012065120 A | 3/2012 |
| JP | 2015-515829 A | 5/2015 |
| JP | 2016158283 A | 9/2016 |
| KR | 100772576 B1 | 11/2007 |
| KR | 1020130030254 A | 3/2013 |
| KR | 1020170116595 A | 10/2017 |
| KR | 1020170117062 A | 10/2017 |
| WO | 2011112237 A1 | 9/2011 |
| WO | 2016130801 A1 | 8/2016 |
| WO | 2017201011 A1 | 11/2017 |

OTHER PUBLICATIONS

Marta Karczewicz et al., "Improvements on adaptive loop filter", Joint Video Exploration Team (JVET) of ITU-T SG 16 WP 3 and ISO/IEC JTC 1/SC 29/WG 11, 2nd Meeting, Feb. 20-26, 2016, pp. 1-6 JVET-B0060, Qualcomm Inc., San Diego, USA.

Wang Lai et al., CE8 Subtest 1: Block-based filter adaptation with features on subset of pixels, Joint Collaborative Team on Video Coding (JCT-VC) of ITU-T SG16 WP3 and ISO/IEC JTC1/SC29/WG11, 6th Meeting, Jul. 14-22, 2011, pp. 1-4, JCTVC-F301, Samsung Electronics Co., Ltd., Torino, Italy.

Jianle Chen et al., Algorithm Description of Joint Exploration Test Model 7 (JEM 7), Joint Video Exploration Team (JVET) of ITU-T SG 16 WP 3 and ISO/IEC JTC 1/SC 29/WG 11, Document: JVET-G1001-v1, 7th Meeting: Torino, IT, Jul. 13-21, 2017.

Office Action for JP 2023-129198 by Japanese Patent Office dated Aug. 6, 2024.

Office Action for EP 18882727.3 by European Patent Office dated Jul. 31, 2024.

Chen, Jianle et al. "Algorithm Description of Joint Exploration Test Model 7 (JEM 7)," Joint Video Exploration Team (JVET) of ITU-T SG 16 WP 3 and ISO/IEC JTC 1/SC 29/WG 11 , JVET-G1001-v1. Jul. 2017.

* cited by examiner

FIG. 9

(a) calculation of vertical gradient V (b) calculation of horizontal gradient H (c) calculation of first diagonal gradient D1

(d) calculation of second diagonal gradient D2

(a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling

FIG. 19

(a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling

FIG. 20

(a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V
on the basis of subsampling (b) calculation of horizontal gradient H
on the basis of subsampling (c) calculation of first diagonal gradient D1
on the basis of subsampling (d) calculation of second diagonal gradient D2
on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling (a) calculation of vertical gradient V (b) calculation of horizontal gradient H (c) calculation of first diagonal gradient D1

(d) calculation of second diagonal gradient D2

(a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling

FIG. 28

(a) calculation of vertical gradient V (b) calculation of horizontal gradient H (c) calculation of first diagonal gradient D1

(d) calculation of second diagonal gradient D2

FIG. 29

(a) calculation of vertical gradient V (b) calculation of horizontal gradient H (c) calculation of first diagonal gradient D1

(d) calculation of second diagonal gradient D2

(a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling

FIG. 32

(a) 3x3 2D Laplacian (b) 3x3 2D Laplacian (c) 3x3 2D horizontal direction Sobel (d) 3x3 2D vertical direction Sobel (e) 3x3 2D horizontal edge extraction (f) 3x3 2D second diagonal edge extraction (g) 3x3 2D vertical edge extraction (h) 3x3 2D first diagonal edge extraction (i) 5×5 2D LoG (j) 9×9 2D LoG

(a) calculation of vertical gradient V
on the basis of subsampling (b) calculation of horizontal gradient H
on the basis of subsampling (c) calculation of first diagonal gradient D1
on the basis of subsampling (d) calculation of second diagonal gradient D2
on the basis of subsampling

FIG. 40

(a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling

FIG. 41

(a) calculation of vertical gradient V on the basis of subsampling (b) calculation of horizontal gradient H on the basis of subsampling (c) calculation of first diagonal gradient D1 on the basis of subsampling (d) calculation of second diagonal gradient D2 on the basis of subsampling

FIG. 42

(a) calculation of vertical gradient V
on the basis of subsampling (b) calculation of horizontal gradient H
on the basis of subsampling (c) calculation of first diagonal gradient D1
on the basis of subsampling (d) calculation of second diagonal gradient D2
on the basis of subsampling

IMAGE ENCODING/DECODING METHOD AND DEVICE EMPLOYING IN-LOOP FILTERING

CROSS-REFERENCE TO RELATED APPLICATION

The present application is a continuation application of U.S. patent application Ser. No. 17/676,698, filed on Feb. 21, 2022, which is a continuation application of U.S. patent application Ser. No. 16/768,634, filed on May 29, 2020, now U.S. Pat. No. 11,290,715 issued on Mar. 29, 2022, which was the National Stage of International Application No. PCT/KR2018/015014 filed on Nov. 29, 2018, which claims priority to Korean patent applications: KR10-2017-0162230 filed on Nov. 29, 2017, KR10-2018-0068908 filed on Jun. 15, 2018, KR10-2018-0082117 filed on Jul. 16, 2018, KR10-2018-0106849 filed on Sep. 7, 2018, KR10-2018-0114424 filed on Sep. 21, 2018, KR10-2018-0115327 filed on Sep. 27, 2018, KR10-2018-0118377 filed on Oct. 4, 2018, and KR10-2018-0129908 filed on Oct. 29, 2018 with the Korean Intellectual Property Office, which are incorporated herein by reference in their entirety.

TECHNICAL FIELD

The present invention relates to a video encoding/decoding method, a video encoding/decoding apparatus, and a recording medium in which a bitstream is stored. In particular, the present invention relates to a video encoding/decoding method and apparatus using in-loop filtering.

BACKGROUND ART

These days, the demand for high-resolution, high-quality video such as high definition (HD) video and ultra high definition (UHD) video is increasing in various applications. As video has higher resolution and quality, the amount of video data increases as compared with existing video data. Therefore, when video data is transmitted through a medium such as a wired/wireless broadband line or is stored in an existing storage medium, transmission or storage cost is increased. In order to solve such a problem with high-resolution, high-quality video data, a high-efficiency video encoding/decoding technique is required.

There are various video compression techniques such as an inter prediction technique for predicting values of pixels within a current picture from values of pixels within a preceding picture or a subsequent picture, an intra prediction technique for predicting values of pixels within a region of a current picture from another region of the current picture, a transform and quantization technique for compressing energy of a residual signal, and an entropy encoding technique for allocating shorter codes for frequently occurring pixel values and longer codes for less-occurring pixel values. With these video compression techniques, video data can be effectively compressed, transmitted, and stored.

Deblocking filtering is intended to reduce blocking artifacts around block boundaries by performing vertical filtering and horizontal filtering on the block boundaries. However, the deblocking filtering has a problem in that it cannot minimize the distortion between an original picture and a reconstructed picture when performing filtering on the block boundaries.

Sample adaptive offset (SAO) is a method of adding an offset to a specific sample after comparing the pixel value of the sample with the pixel value of an adjacent sample on a per sample basis or adding an offset to samples whose pixel values are within a specific pixel value range in order to reduce ringing artifacts. The SAO has an effect of reducing the distortion between an original picture and a reconstructed picture to some degree by using rate-distortion optimization. However, when the difference between the original picture and the reconstructed picture is large, there is a limit in minimizing the distortion.

DISCLOSURE

Technical Problem

An objective of the present invention is to provide a video encoding/decoding method and apparatus using in-loop filtering.

Another objective of the present invention is intended to provide a method and apparatus for in-loop filtering using subsampling-based block classification to reduce computational complexity and memory access bandwidth of a video encoder/decoder.

A further objective of the present invention is to provide a method and apparatus for in-loop filtering using multiple filter shapes to reduce computational complexity, memory capacity requirement, and memory access bandwidth of a video encoder/decoder.

A further objective of the present invention is to provide a recording medium in which a bitstream generated by a video encoding/decoding method or apparatus is stored.

Technical Solution

A video decoding method according to the present invention, the method may comprise decoding filter information on a coding unit; classifying samples in the coding unit into classes on a per block classification unit basis; and filtering the coding unit having the samples classified into the classes on a per block classification unit basis by using the filter information.

In the video decoding method according to the present invention, the method further may comprise assigning block class indices to the coding unit having the samples classified into the classes on a per block classification unit basis, wherein the block class indices are determined according to directionality information and activity information.

In the video decoding method according to the present invention, wherein at least one of the directionality information and the activity information is determined on the basis of a gradient value with respect to at least one of a vertical direction, a horizontal direction, a first directional direction, and a second directional direction.

In the video decoding method according to the present invention, wherein the gradient value is obtained using a one-dimensional Laplacian operation for each of the block classification units.

In the video decoding method according to the present invention, wherein the one-dimensional Laplacian operation is a one-dimensional Laplacian operation in which an operation position is a sub-sampled position.

In the video decoding method according to the present invention, wherein the gradient value is determined on the basis of a temporal layer identifier.

In the video decoding method according to the present invention, wherein the filter information comprises: at least one piece of information selected from among information on whether filtering is executed, a filter coefficient value, the number of filters, the number of filter taps (a filter length), filter shape information, filter type information, information on whether a fixed filter is used for the block class index, and filter symmetry type information.

In the video decoding method according to the present invention, wherein the filter shape information comprises at least one of a rhombus, a rectangle, a square, a trapezoid, a diagonal shape, a snowflake shape, a number sign shape, a clover shape, a cross shape, a triangle, a pentagon, a hexagon, an octagon, a decagon and a dodecagon.

In the video decoding method according to the present invention, wherein the filter coefficient value comprises geometrically transformed filter coefficient values for the coding unit having the samples classified into the classes on a per block classification unit basis.

In the video decoding method according to the present invention, wherein the filter symmetry type information comprises at least one of a point symmetry, a horizontal symmetry, a longitudinal symmetry, and a diagonal symmetry.

Also, a video encoding method according to the present invention, the method may comprise classifying samples of a coding units into classes on a per block classification unit basis; filtering the coding unit having the samples classified into the classes on a per block classification unit basis by using filter information on the coding unit; and encoding the filter information.

In the video encoding method according to the present invention, the method further may comprise assigning block class indices to the coding unit having the sample classified into the classes on a per block classification unit basis, wherein the block class indices are determined on the basis of directionality information and activity information.

In the video encoding method according to the present invention, wherein at least one of the directionality information and the activity information is determined on the basis of a gradient value with respect to at least one of a vertical direction, a horizontal direction, a first directional direction, and a second directional direction.

In the video encoding method according to the present invention, wherein the gradient value is obtained using a one-dimensional Laplacian operation for each of the block classification unit.

In the video encoding method according to the present invention, wherein the one-dimensional Laplacian operation is a one-dimensional Laplacian operation in which an operation position is a sub-sampled position.

In the video encoding method according to the present invention, wherein the gradient value is determined on the basis of a temporal layer identifier.

In the video encoding method according to the present invention, wherein the filter information comprises at least one piece of information selected from among information on whether filtering is executed, a filter coefficient value, the number of filters, the number of filter taps (a filter length), filter shape information, filter type information, information on whether a fixed filter is used for a block class index, and filter symmetry type information.

In the video encoding method according to the present invention, wherein the filter shape information comprises at least one of a rhombus, a rectangle, a square, a trapezoid, a diagonal shape, a snowflake shape, a number sign shape, a clover shape, a cross shape, a triangle, a pentagon, a hexagon, an octagon, a decagon and a dodecagon.

In the video encoding method according to the present invention, wherein the filter coefficient value comprises geometrically transformed filter coefficients for each of the block classification units of the coding unit.

Also, a computer-readable recording medium according to the present invention may store a bitstream generated by a video encoding method according to the present invention.

Advantageous Effects

According to the present invention, it is possible to provide a video encoding/decoding method and apparatus using in-loop filtering.

In addition, according to the present invention, it is possible to provide a method and apparatus for in-loop filtering using subsampling-based block classification to reduce computational complexity and memory access bandwidth of a video encoder/decoder.

In addition, according to the present invention, it is possible to provide a method and apparatus for in-loop filtering using multiple filter shapes to reduce computational complexity, memory capacity requirement, and memory access bandwidth of a video encoder/decoder.

In addition, according to the present invention, it is possible to provide a recording medium in which a bitstream generated by a video encoding/decoding method or apparatus is stored.

In addition, according to the present invention, video encoding and/or decoding efficiency can be improved.

DESCRIPTION OF DRAWINGS

FIG. 9 is a diagram illustrating an exemplary method of determining gradient values for horizontal, vertical, first diagonal, and second diagonal directions;

FIGS. 19 to 30 are diagrams illustrating exemplary methods of determining gradient values for horizontal, vertical, first diagonal, and second diagonal directions at a specific sample position according to an embodiment of the present invention;

FIG. 32 is a diagram illustrating various computation techniques that can be used instead of a one-dimensional Laplacian operation according to an embodiment of the present invention;

FIGS. 35A and 35B are diagrams illustrating various filter shapes according to an embodiment of the present invention;

FIG. 37 is a diagram illustrating filters generated by geometrically transforming a square filter, an octagonal filter, a snowflake-shaped filter, and a rhombic filter according to an embodiment of the present invention;

FIGS. 39 to 42 are diagrams illustrating exemplary subsampling-based methods of determining gradient values for horizontal, vertical, first diagonal, and second diagonal directions.

BEST MODE

Figure 1:
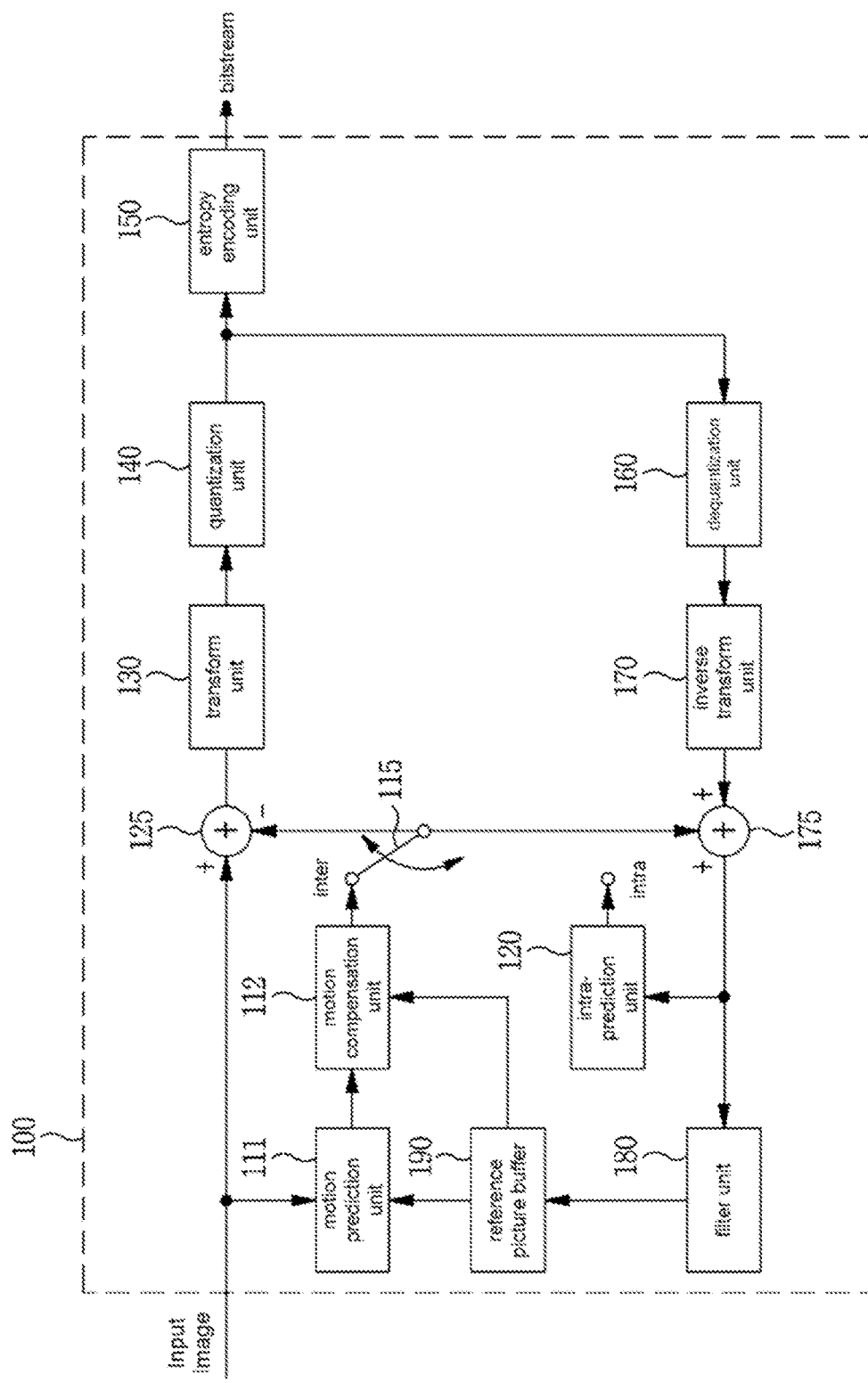
FIG. 1 is a block diagram illustrating the configuration of an encoding apparatus to which one embodiment of the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component.

The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd−1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list.

Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
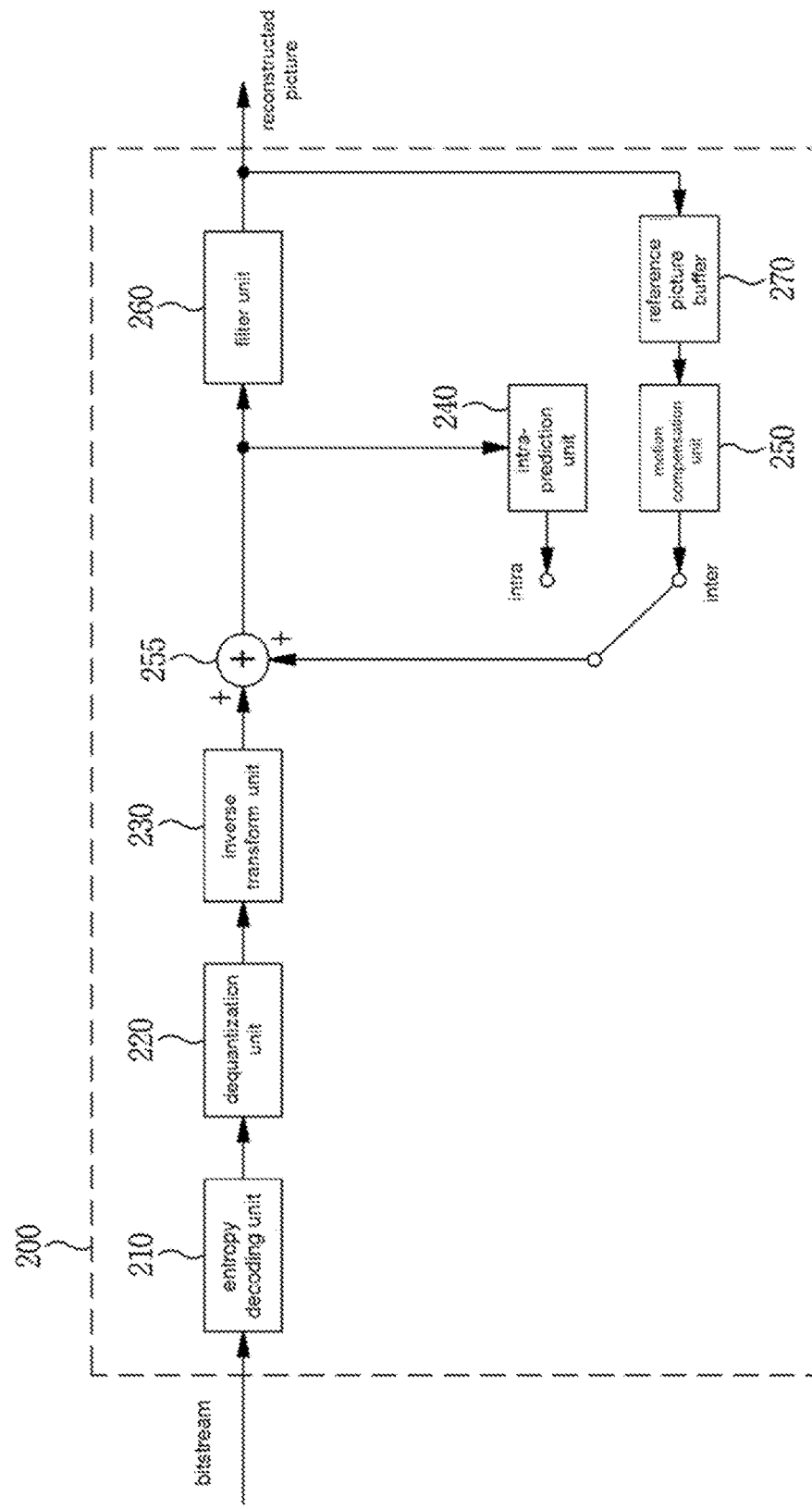
FIG. 2 is a block diagram illustrating the configuration of a decoding apparatus to which one embodiment of the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
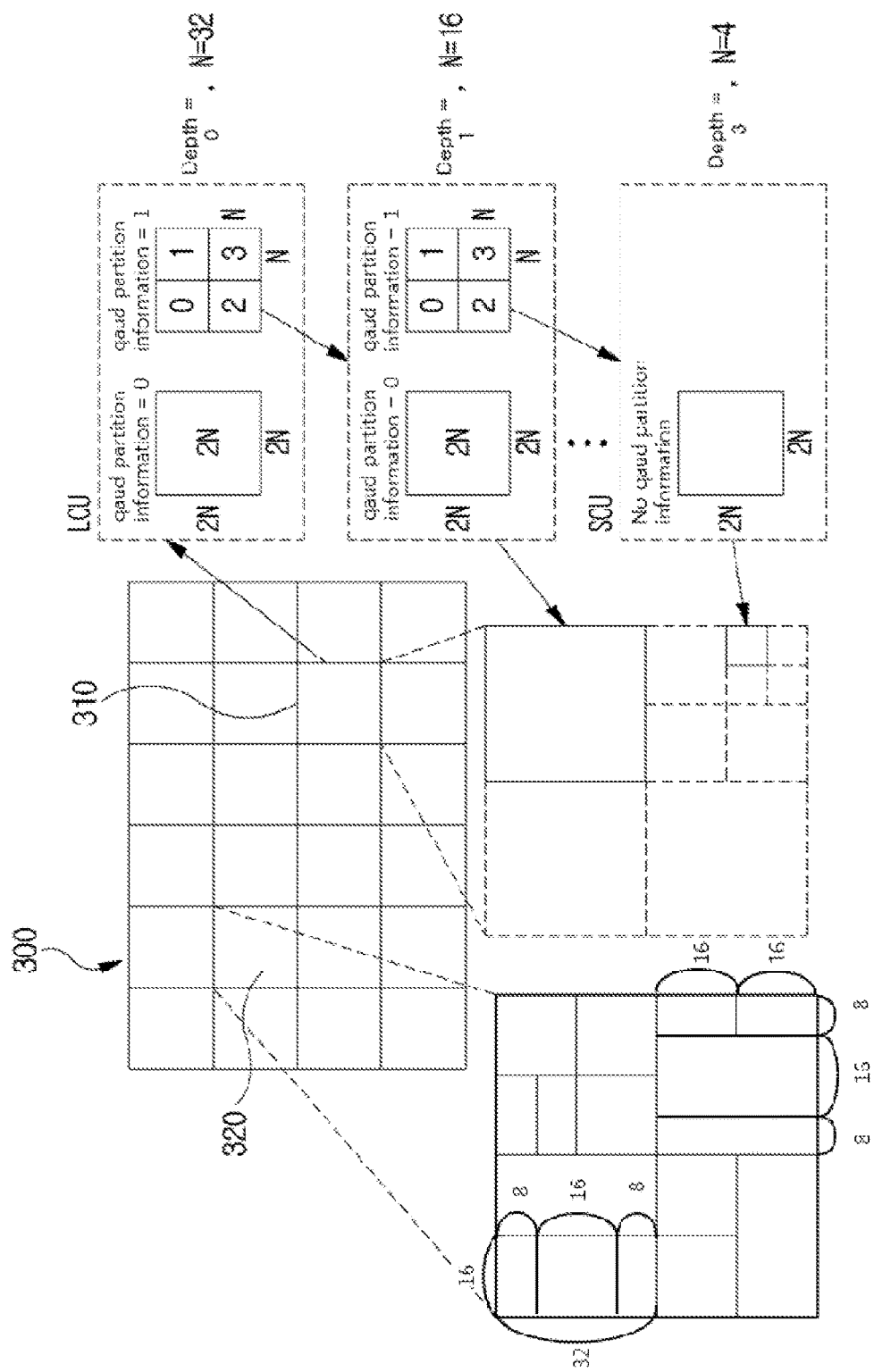
FIG. 3 is a schematic view illustrating a picture partition structure use to encode/decode a video.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to anode of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
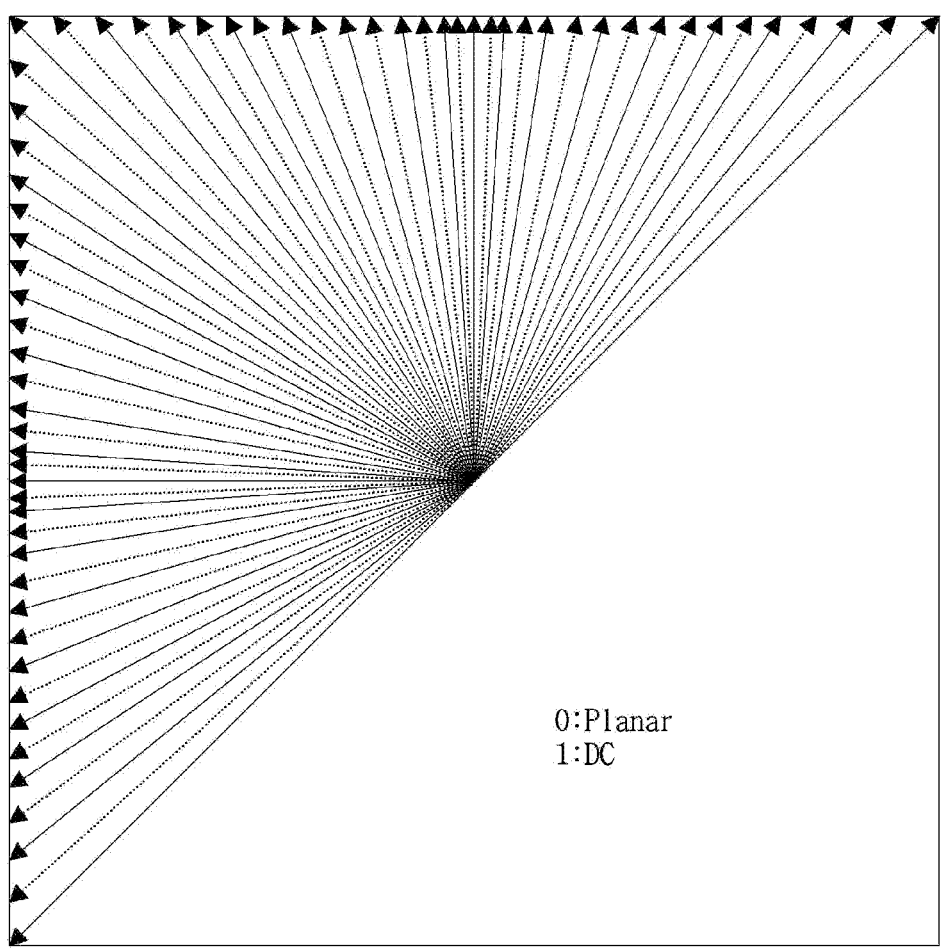
FIG. 4 is a diagram illustrating one embodiment of an intra prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than or equal to 1, including the non-angular and the angular mode.

In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
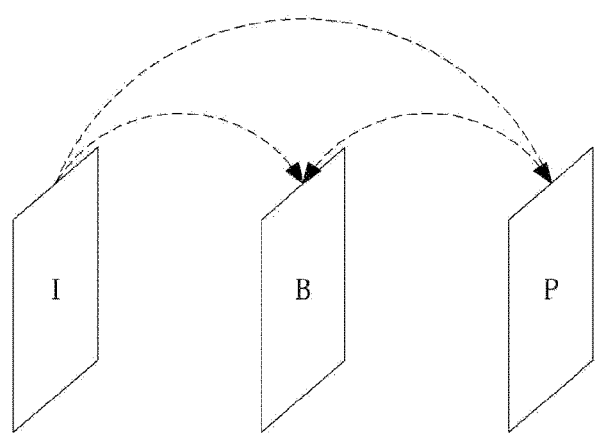
FIG. 5 is a diagram illustrating one embodiment of an inter prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Figure 6:
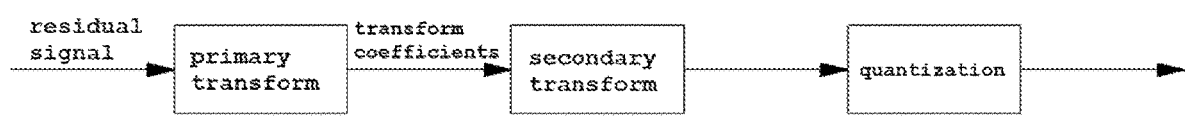
FIG. 6 is a diagram used to describe a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, the transform scheme may be determined through signaling of transform information.

Since the residual signal is quantized through the primary transform and the secondary transform, a quantized-level signal (quantization coefficients) is generated. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Hereinafter, an in-loop filtering method using subsampling-based block classification, according to an embodiment of the present invention, will be described with reference to FIGS. 7 to 42.

In the present invention, the in-loop filtering method includes deblocking filtering, sample adaptive offset (SAO), bilateral filtering, and adaptive in-loop filtering, etc.

By applying at least one of the deblocking filtering and the SAO to a reconstructed picture (i.e., video frame) that is generated by summing a reconstructed intra/inter prediction block and a reconstructed residue block, it is possible to effectively reduce blocking artifacts and ringing artifacts within the reconstructed picture. The deblocking filtering is intended to reduce blocking artifacts around block boundaries by performing vertical filtering and horizontal filtering on the block boundaries. However, the deblocking filtering has a problem in that it cannot minimize the distortion between an original picture and a reconstructed picture when block boundaries are filtered. The sample adaptive offset (SAO) is a filtering technique of adding an offset to a specific sample after comparing the pixel value of the sample with the pixel value of an adjacent sample on a per sample basis or adding an offset to samples whose pixel values are within a specific pixel value range in order to reduce the ringing artifacts. The SAO has an effect of reducing the distortion between an original picture and a reconstructed picture to some degree by using rate-distortion optimization. However, when the difference between the original picture and the reconstructed picture is large, there is a limit in minimizing the distortion.

The bidirectional filtering refers to a filtering technique by which filter coefficients are determined on the basis of the distances from the center sample in a filtering target area to each of the other samples in the filtering target area and on the basis of the differences between the pixel value of the center sample and the pixel value of each of the other samples.

The adaptive in-loop filtering refers to a filtering technique to minimize the distortion between an original picture and a reconstructed picture by using a filter that can minimize the distortion between the original picture and the reconstructed picture.

Unless otherwise specifically stated in the description of the present invention, in-loop filtering means adaptive in-loop filtering.

In the present invention, filtering means a process of applying a filter to at least one basic unit selected from among a sample, a block, a coding unit (CU), a prediction unit (PU), a transform unit (TU), a coding tree unit (CTU), a slice, a tile, a group of tiles (tile group), a picture, and a sequence. The filtering includes at least one of a block classification process, a filtering execution process, and a filter information encoding/decoding process.

In the present invention, a coding unit (CU), a prediction unit (PU), a transform unit (TU), and a coding tree unit (CTU) respectively have the same meaning as a coding block (CB), a (prediction block (PB), a transform block (TB), and a coding tree block (CTB).

In the present invention, a block refers to at least one of a CU, PU, TU, CB, PB, and TB that are used as a basic unit in an encoding/decoding process.

The in-loop filtering is performed such that bidirectional filtering, deblocking filtering, sample adaptive offset, and adaptive in-loop filtering are sequentially applied to a reconstructed picture to generate a decoded picture. However, the order in which the filtering schemes categorized as the in-loop filtering are applied to a reconstructed picture varies.

For example, the in-loop filtering may be performed such that the deblocking filtering, the sample adaptive offset, and the adaptive in-loop filtering are sequentially applied to a reconstructed picture in this order.

Alternatively, the in-loop filtering may be performed such that the bidirectional filtering, the adaptive in-loop filtering, the deblocking filtering, and the sample adaptive offset are sequentially applied to a reconstructed picture in this order.

Further alternatively, the in-loop filtering may be performed such that the adaptive in-loop filtering, the deblocking filtering, and the sample adaptive offset are sequentially applied to a reconstructed picture in this order.

Further alternatively, the in-loop filtering may be performed such that the adaptive in-loop filtering, the sample adaptive offset, and the deblocking filtering are sequentially applied to a reconstructed picture in this order.

In the present invention, a decoded picture refers to the output from the in-loop filtering or post-processing filtering performed on a reconstructed picture composed of reconstructed blocks each of which is generated by summing reconstructed residual blocks and the corresponding intra prediction blocks, or summing reconstructed blocks and the corresponding inter prediction blocks. In the present invention, the meaning of the decoded sample, block, CTU, or picture does not differ from that of the reconstructed sample, block, CTU, or picture, respectively.

The adaptive in-loop filtering is performed on a reconstructed picture to generate a decoded picture. The adaptive in-loop filtering may be performed on a decoded picture that has undergone at least one of the deblocking filtering, the sample adaptive offset, and the bidirectional filtering. In addition, the adaptive in-loop filtering may be performed on a reconstructed picture that has undergone the adaptive in-loop filtering. In this case, the adaptive in-loop filtering can be repeatedly performed N times on the reconstructed or decoded picture. In this case, N is a positive integer.

The in-loop filtering may be performed on a decoded picture that has undergone at least one of the in-loop filtering methods. For example, when at least one of the in-loop filtering methods is performed on a decoded picture which has undergone at least one of the other in-loop filtering methods, parameters used for the latter filtering method may be changed, and then the former filtering with the changed parameters may be performed on the decoded picture. In this case, the parameters include a coding parameter, a filter coefficient, the number of filter taps (a filter length), a filter shape, a filter type, the number of filtering executions, a filter strength, a threshold value, and/or combinations of those.

The filter coefficient means a coefficient constituting a filter. Alternatively, the filter coefficient means a coefficient value corresponding to a specific mask position in a mask form, and a reconstructed sample is multiplied by the coefficient value.

The number of filter taps refers to the length of a filter. When a filter is symmetric respect to one specific direction, filter coefficients to be encoded/decoded can be reduced by half. In addition, the filter tap refers to the width (horizontal dimension) or the height (vertical dimension) of a filter. Alternatively, the filter tap refers to both of the width (dimension in the transverse direction) and the height (dimension in the longitudinal direction) of a two-dimensional filter. In addition, the filter may be symmetrical with respect to two or more specific directions.

When a filter has a mask form, the filter may be a two-dimensional geometrical figure having a diamond/rhombus shape, a non-square rectangle shape, a square shape, a trapezoid shape, a diagonal shape, a snowflake shape, a number sign shape, a clover shape, a cross shape, a triangle shape, a pentagon shape, a hexagon shape, an octagon shape, a decagon shape, a dodecagon shape, or any combination of those. Alternatively, the filter shape may be a shape obtained by projecting a three-dimensional figure to a two-dimensional plane.

The filter type means a filter selected from among a Wiener filter, a low-pass filter, a high-pass filter, a linear filter, a non-linear filter, and a bidirectional filter.

In the present invention, among the various filters, description will be focused on the Wiener filter. However, the present invention is not limited thereto, and a combination of the above filters may be used in embodiments of the present invention.

As the filter type for the adaptive in-loop filtering, the Wiener filter may be used. The Wiener filter is an optimal linear filter for effectively removing noise, blurring, and distortion within a picture, thereby improving coding efficiency. The Wiener filter is designed to minimize the distortion between an original picture and a reconstructed/decoded picture.

At least one of the filtering methods may be performed in an encoding process or a decoding process. The encoding process or the decoding process refers to encoding or decoding that is performed in units of at least one of a slice, a tile, a tile group, a picture, a sequence, a CTU, a block, a CU, a PU, and a TU. At least one of the filtering methods is performed during encoding or decoding that is performed in units of a slice, a tile, a tile group, a picture, or the like. For example, the Wiener filter is used for adaptive in-loop filtering during encoding or decoding. That is, in the phrase "adaptive in-loop filtering", the term "in-loop" means that the filtering is performed during the encoding or decoding process. When adaptive in-loop filtering is performed, a decoded picture that has undergone the adaptive in-loop filtering may be used as a reference picture when encoding or decoding a subsequent picture. In this case, since intra prediction or motion compensation is performed on the subsequent picture to be encoded/decoded by referring to a reconstructed picture that has undergone the adaptive in-loop filtering, coding efficiency of the subsequent picture as well as the coding efficiency of the current picture that has undergone in-loop filtering can be improved.

In addition, at least one of the filtering methods described above is performed in a CTU-based or block-based encoding or decoding process. For example, the Wiener filter is used for adaptive in-loop filtering in a CTU-based or block-based encoding or decoding process. That is, in the phrase "adaptive in-loop filtering", the term "in-loop" means that the filtering is performed during the CTU-based or block-based encoding or decoding process. When the adaptive in-loop filtering is performed on a per CTU basis or a per block basis, a decoded CTU or block which has undergone the adaptive in-loop filtering is used as a reference CTU or block for a subsequent CTU or block to be encoded/decoded. In this case, since intra prediction or motion compensation is performed on the subsequent CTU or block by referring to the current CTU or block on which the adaptive in-loop filtering is applied, the coding efficiency of the current CTU or block on which the in-loop filtering is applied is improved as well as the coding efficiency of the subsequent CTU or block to be encoded/decoded is improved.

In addition, at least one of the filtering methods is performed as post-processing filtering after a decoding process is performed. For example, the Wiener filter may be used as a post-processing filter after the decoding process is performed. When the Wiener filter is used after the decoding process, the Wiener filter is applied to a reconstructed/decoded picture before the reconstructed/decoded picture is output (i.e., displayed). When the post-processing filtering is performed, the decoded picture that has undergone the post-processing filtering may not be used as a reference picture for a subsequent picture to be encoded/decoded.

The adaptive in-loop filtering cannot be performed on a per block basis. That is, the block-based filter adaption cannot be performed. Here, the block-based filter adaption means that different filters are selected for different blocks, respectively. The block-based filter adaption also means block classification.

Figure 7:
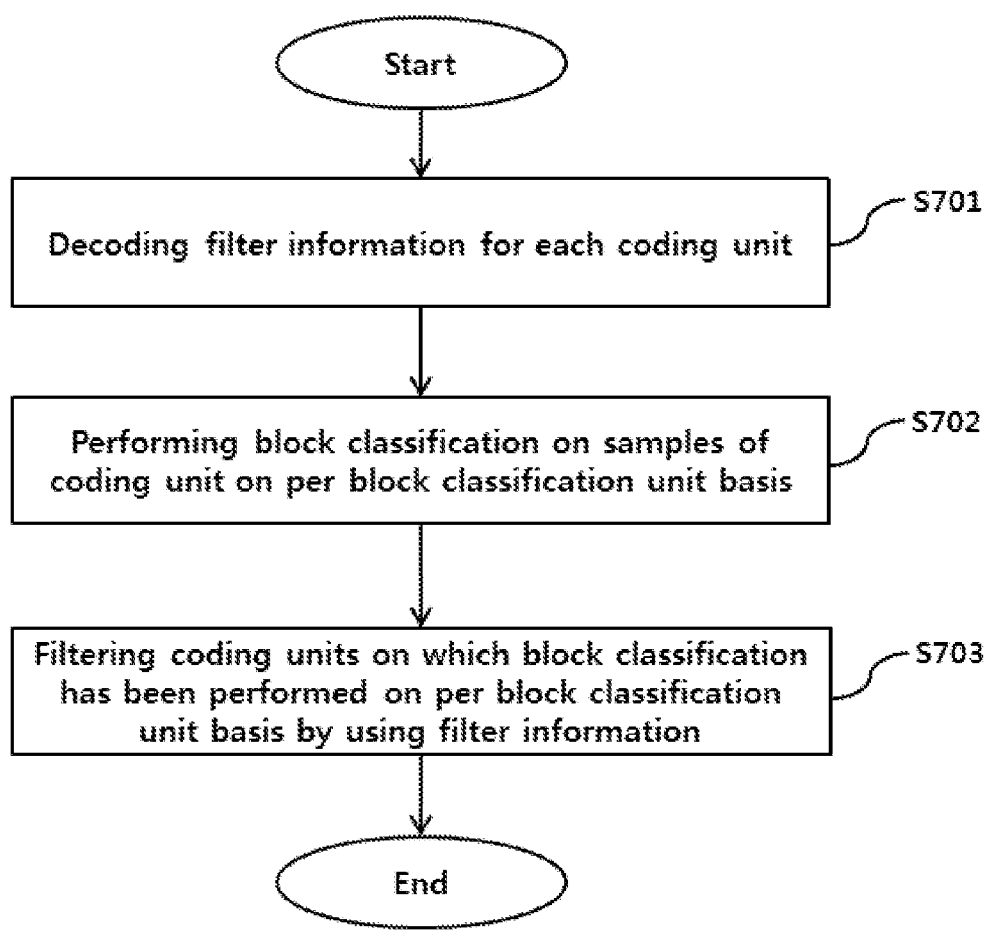
FIG. 7 is a flowchart illustrating a video decoding method according to an embodiment of the present invention.

FIG. 7 is a flowchart illustrating a video decoding method according to an embodiment of the present invention.

Referring to FIG. 7, a decoder decodes filter information for each coding unit (S701).

The filter information is not limited to filter information on a per coding unit basis. It also means filter information on a per slice, tile, tile group, picture, sequence, CTU, block, CU, PU, or TU basis.

The filter information includes information on whether filtering is executed, a filter coefficient value, the number of filters, the number of filter taps (a filter length), filter shape information, filter type information, information on whether a fixed filter is used for a block class index, and/or filter symmetry type information.

The filter shape information includes at least one shape selected from among a rhombus (diamond), a rectangle, a square, a trapezoid, a diagonal shape, a snowflake shape, a number sign shape, a clover shape, a cross shape, a triangle, a pentagon, a hexagon, an octagon, a decagon, and a dodecagon.

The filter coefficient value includes geometrically transformed filter coefficient values for each block in which samples are classified into classes on a per block classification unit basis.

On the other hand, examples of the filter symmetry type include at least one of a point symmetry, a horizontal symmetry, a longitudinal symmetry, and a diagonal symmetry.

In addition, the decoder performs block classification on samples of a coding unit on a per block classification unit basis (Step S702). In addition, the decoder allocates block class indices to the block classification units in the coding unit.

The block classification is not limited to the classification on a per coding unit basis. That is, the block classification may be performed in units of a slice, a tile, a tile group, a picture, a sequence, a CTU, a block, a CU, a PU, or a TU.

The block class indices are determined on the basis of directionality information and activity information.

At least one of the directionality information and the activity information is determined according to a gradient value with respect to at least one of vertical, horizontal, first diagonal, and second diagonal directions.

On the other hand, the gradient value is obtained using a one-dimensional Laplacian operation on a per block classification unit basis.

The one-dimensional Laplacian operation is preferably a one-dimensional Laplacian operation in which the operation position is a sub-sampled position.

Alternatively, the gradient value may be determined according to a temporal layer identifier.

In addition, the decoder filters the coding units on which the block classification has been performed on a per block classification unit basis by using the filter information (S703).

A filtering target unit is not limited to the coding unit. That is, the filtering may be performed in units of a slice, a tile, a tile group, a picture, a sequence, a CTU, a block, a CU, a PU, or a TU.

Figure 8:
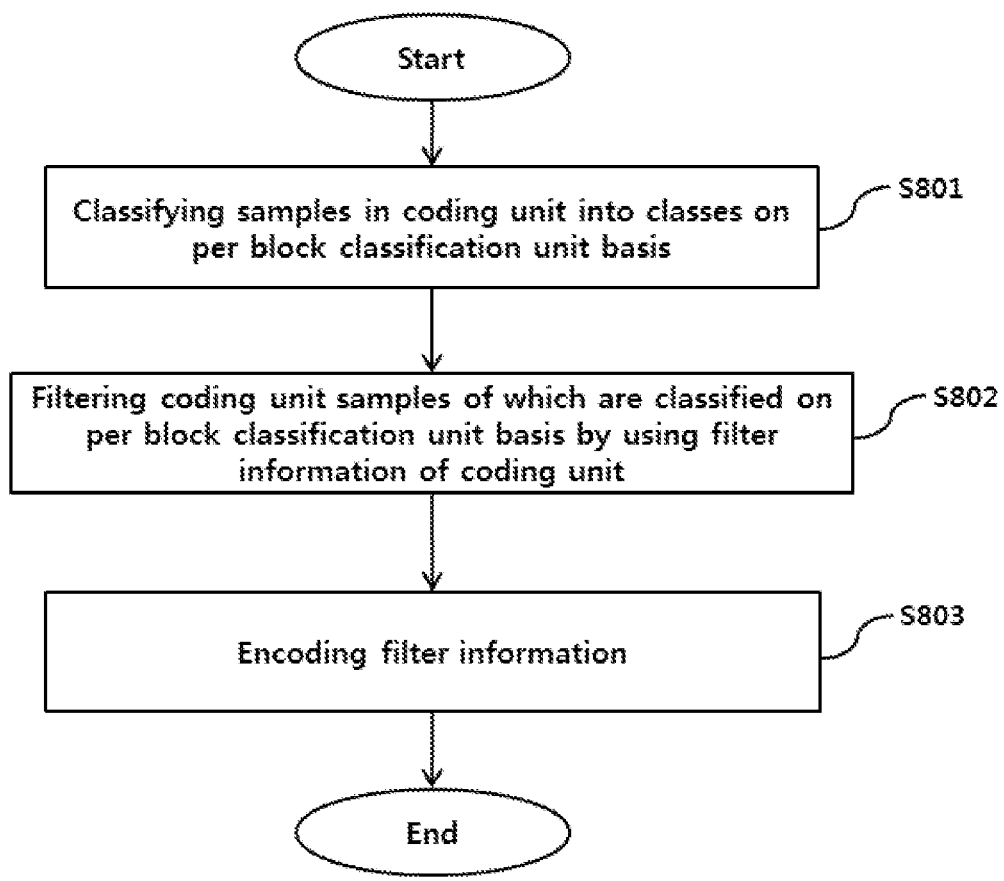
FIG. 8 is a flowchart illustrating a video encoding method according to an embodiment of the present invention.

FIG. 8 is a flowchart illustrating a video encoding method according to an embodiment of the present invention;

Referring to FIG. 8, an encoder classifies samples in a coding unit into classes on a per block classification unit basis (Step S801). In addition, the encoder allocates block class indices to the block classification units in each of the coding unit.

The basic unit for the block classification is not limited to the coding unit. That is, the block classification may be performed in units of a slice, a tile, a tile group, a picture, a sequence, a CTU, a block, a CU, a PU, or a TU.

The block class indices are determined on the basis of directionality information and activity information.

At least one of the directionality information and the activity information is determined on the basis of a gradient value with respect to at least one of vertical, horizontal, first diagonal, and second diagonal directions.

The gradient value is obtained using a one-dimensional Laplacian operation on a per block classification unit basis.

The one-dimensional Laplacian operation is preferably a one-dimensional Laplacian operation in which the operation position is a sub-sampled position.

Alternatively, the gradient value is determined according to a temporal layer identifier.

In addition, the encoder filters the coding unit the samples of which are classified on a per block classification unit basis by using the filter information of the coding unit (S802).

The basis unit for filtering is not limited to the coding unit. That is, the filtering may be performed in units of a slice, a tile, a tile group, a picture, a sequence, a CTU, a block, a CU, a PU, or a TU.

The filter information includes information on whether filtering is executed, a filter coefficient value, the number of filters, the number of filter taps (a filter length), filter shape information, filter type information, information on whether a fixed filter is used for a block class index, and/or filter symmetry type information.

Examples of the filter shape include at least one of a rhombus (diamond), a rectangle, a square, a trapezoid, a diagonal shape, a snowflake shape, a number sign shape, a clover shape, a cross shape, a triangle, a pentagon, a hexagon, an octagon, a decagon and a dodecagon.

The filter coefficient value includes filter coefficient values that are geometrically transformed on a per block classification unit basis.

Next, the encoder encodes the filter information (S803).

The filter information is not limited to filter information on a per coding unit basis. The filter information may be filter information on a per slice, tile, tile group, picture, sequence, CTU, block, CU, PU, or TU basis.

At the encoder side, the adaptive in-loop filtering process may be divided into several sub-steps such as a block classification, filtering, and filter information encoding.

More specifically, at the encoder side, the adaptive in-loop filtering may be divided into several sub-steps such as block classification, filter coefficient derivation, filtering execution determination, filter shape determination, filtering execution, and filter information encoding. The filter coefficient derivation, the filtering execution determination, and the filter shape determination do not fall within the scope of the present invention. Therefore, those sub-steps are not described in depth but are just briefly described. Therefore, at the encoder side, the in-loop filtering process is divided into block classification, filtering, filter information encoding, and the like.

In the filter coefficient derivation step, Wiener filter coefficients that can minimize the distortion between an original picture and a filtered picture are derived. In this case, the Wiener filter coefficients are derived on a per block class basis. In addition, the Wiener filter coefficients are derived according to at least one of the number of filter taps and the filter shape. When deriving the Wiener filter coefficients, it is possible to derive an autocorrelation function for reconstructed samples, a cross-correlation function for original and reconstructed samples, an autocorrelation matrix, and a cross-correlation matrix. The filter coefficients are calculated by deriving the Wiener-Hopf equation on the basis of the autocorrelation matrix and the cross-correlation matrix. In this case, the filter coefficients are obtained by computing the Wiener-Hof equation on the basis of Gaussian elimination or Cholesky decomposition.

In the filtering execution determination step, whether to perform the adaptive in-loop filtering on a per slice, picture, tile, or tile group basis, whether to perform the adaptive in-loop filtering on a per block basis, or whether not to perform the adaptive in-loop filtering is determined in terms of rate-distortion optimization. Here, the rate includes filter information to be encoded. The distortion is a difference between an original picture and a reconstructed picture or a difference between an original picture and a filtered, reconstructed picture. The distortion is represented by the mean of squared error (MSE), the sum of squared error (SSE), the sum of absolute difference), or the like. In the filtering execution determination step, whether to perform the filtering on a chrominance component as well as whether to perform the filtering on a luminance component is determined.

In the filter shape determination step, at the time of applying the in-loop adaptive filtering, it is possible to determine, in terms of the rate-distortion optimization, what kind of filter shape to use, what tap number filter to use, and the like.

Meanwhile, at the decoder side, the adaptive in-loop filtering process is divided into filter information decoding, block classification, and filtering steps.

Hereinafter, in order to avoid redundant description, the filter information encoding step and the filter information decoding step are collectively termed as the filter information encoding/decoding step.

Hereinafter, the block classification step will be described first.

Block class indices are allocated on a M×N-size block basis (or on a per block classification unit basis) within a reconstructed picture so that the blocks within a reconstructed picture can be classified into L classes. Here, the block class indices may be allocated not only to a reconstructed/decoded picture but also to at least one of a restored/decoded slice, a restored/decoded tile group, a restored/decoded tile, a restored/decoded CTU, and a restored/decoded block.

Here, N, M, and L are each positive integers. For example, N and M are each positive integers selected from among 2, 4, 8, 16, and 32, and L is a positive integer selected from among 4, 8, 16, 20, 25, and 32. When N and M are the same integer of 1, the block classification is performed on a sample basis rather than on a block basis. On the other hand, when N and M are different positive integers, a N×M-size block has a non-square shape. Alternatively, N and M may be the same positive integer.

For example, a total of 25 block class indices can be allocated to a reconstructed picture on a per 2×2-size block basis. For example, a total of 25 block class indices can be allocated to a reconstructed picture on a per 4×4-size block basis.

The block class index has a value within a range of from 0 to L−1, or may have a value within a range of from 1 to L.

The block class indices C are determined on the basis of at least one of a directionality value D and a quantized activity value $A_q$ of an activity value A and is represented by Equation 1.

$$C = 5D + A_q \quad \text{[Equation 1]}$$

In Equation 1, 5 is an exemplary constant value. The constant value may be represented by J. In this case, J is a positive integer having a value smaller than L.

For example, in one embodiment in which the block classification is performed on a per 2×2-size block basis, the sum of one-dimensional Laplacian gradient values for the vertical direction is represented by $g_v$, and the sums of one-dimensional Laplacian gradient values for the horizontal direction, the first diagonal direction (an angle of 135°), and the second diagonal direction (an angle of 45°) are respectively represented by $g_h$, $g_{d1}$, and $g_{d2}$. The Laplacian operations for the vertical direction, the horizontal direction, the first directional direction, and the second diagonal direction are respectively represented by Expressions 2, 3, 4, and 5. The directionality value D and the activity value A are derived by using the sum of the gradient values. In one embodiment, the sum of the gradient values is used. Alternatively, an arbitrary statistical value of the gradient values can be used instead of the sum of the gradient values.

$$g_v = \sum_{k=i-2}^{i+3} \sum_{l=j-2}^{j+3} V_{k,l}, \quad \text{[Equation 2]}$$

$$V_{k,l} = |2R(k,l) - R(k, l-1) - R(k, l+1)|$$

$$g_h = \sum_{k=i-2}^{i+3} \sum_{l=j-2}^{j+3} H_{k,l}, \quad \text{[Equation 3]}$$

$$H_{k,l} = |2R(k,l) - R(k-1, l) - R(k+1, l)|$$

$$g_{d1} = \sum_{k=i-2}^{i+3} \sum_{l=j-2}^{j+3} D1_{k,l}, \quad \text{[Equation 4]}$$

$$D1_{k,l} = |2R(k,l) - R(k-1, l-1) - R(k+1, l+1)|$$

$$g_{d2} = \sum_{k=i-2}^{i+3} \sum_{l=j-2}^{j+3} D2_{k,l}, \quad \text{[Equation 5]}$$

$$D2_{k,l} = |2R(k,l) - R(k-1, l+1) - R(k+1, l-1)|$$

In Equations 2 through 5, i and j represent the coordinates of the upper left position in the horizontal direction and in the vertical direction, respectively, and R(i,j) represents a reconstructed sample value at a position (i,j).

In Equations 2 through 5, k and l respectively represent horizontal and vertical operation ranges to produce the sum of the results $V_{k,l}$, $H_{k,l}$, $D1_{k,l}$, $D2_{k,l}$ of the sample-based one-dimensional Laplacian operations for the respective directions. The result of the sample-based one-dimensional Laplacian operation for one direction means a sample-based gradient value for the corresponding direction. That is, the result of the one-dimensional Laplacian operation means a gradient value. The one-dimensional Laplacian operation is performed on each of the vertical, horizontal, first diagonal, and second diagonal directions, and indicates a gradient value for the corresponding direction. In addition, the results of the one-dimensional Laplacian operations for the vertical, horizontal, first diagonal, and second diagonal directions are respectively represented by $V_{k,l}$, $H_{k,l}$, $D1_{k,l}$, $D2_{k,l}$.

For example, k and l may be the same range. That is, the horizontal length and the vertical length of the operation range in which the one-dimensional Laplacian sum is calculated may be the same.

Alternatively, k and l may be different ranges. That is, the horizontal length and the vertical length of the operation range in which the one-dimensional Laplacian sum is calculated may be different.

As an example, k is a range of from i−2 to i+3 and l is a range of from j−2 to j+3. In this case, the range in which the one-dimensional Laplacian sum is calculated is a 6×6 size. In this case, the operation range in which the one-dimensional Laplacian sum is calculated is larger than the size of the block classification unit.

As another example, k is a range of from i−1 to i+2 and l is a range of from j−1 to j+2. In this case, the operation range in which the one-dimensional Laplacian sum is calculated is a 4×4 size. In this case, the operation range in which the one-dimensional Laplacian sum is calculated is larger than the size of the block classification unit.

As a further example, k is a range of from i to i+1 and l is a range of from j to j+1. In this case, the operation range in which the one-dimensional Laplacian sum is calculated is a 2×2 size. In this case, the operation range in which the one-dimensional Laplacian sum is calculated is equal to the size of the block classification unit.

For example, the operation range in which the sum of the results of the one-dimensional Laplacian operations is calculated has a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

For example, the block classification unit has a two-dimensional geometric shape selected from among a rhombus/diamond, a rectangle, a square, a trapezoid, a diagonal shape, a snowflake shape, a number sign shape, a clover shape, a cross shape, a triangle, a pentagon, a hexagon, an octagon, a decagon, and a dodecagon.

For example, the range in which the sum of the one-dimensional Laplacian operations is calculated has a S×T size. In this case, S and T are each zero or positive integers.

Meanwhile, D1 representing the first diagonal and D2 representing the second diagonal may mean D0 representing the first diagonal and D1 representing the second diagonal, respectively.

For example, in one embodiment in which block classification is performed on a per 4×4-size block, the sums $g_v$, $g_h$, $g_{d1}$, $g_{d2}$ of the gradient values for the horizontal direction, the vertical direction, the first diagonal direction, and the second diagonal direction are calculated by Equations 6, 7, 8, 9 based on the one-dimensional Laplacian operation. The directionality value D and the activity value A are derived by using the sum of the gradient values. In one the embodiment, the sum of the gradient values is used. Alternatively, an arbitrary statistical value of the gradient values may be used instead of the sum of the gradient values.

$$g_v = \sum_{k=i-2}^{i+5} \sum_{l=j-2}^{j+5} V_{k,l},$$ [Equation 6]

$$V_{k,l} = |2R(k, l) - R(k, l-1) - R(k, l+1)|$$

$$g_h = \sum_{k=i-2}^{i+5} \sum_{l=j-2}^{j+5} H_{k,l},$$ [Equation 7]

$$H_{k,l} = |2R(k, l) - R(k-1, l) - R(k+1, l)|$$

$$g_{d1} = \sum_{k=i-2}^{i+5} \sum_{l=j-2}^{j+5} D1_{k,l},$$ [Equation 8]

$$D1_{k,l} = |2R(k, l) - R(k-1, l-1) - R(k+1, l+1)|$$

$$g_{d2} = \sum_{k=i-2}^{i+5} \sum_{l=j-2}^{j+5} D2_{k,l},$$ [Equation 9]

$$D2_{k,l} = |2R(k, l) - R(k-1, l+1) - R(k+1, l-1)|$$

In Equations 6 through 9, i and j represent the coordinates of the upper left position in the horizontal direction and the vertical direction, respectively, and R(i,j) represents a reconstructed sample value at a position (i,j).

In Equations 6 through 9, k and l respectively represent horizontal and vertical operation ranges for calculation of the sum of the results $V_{k,l}$, $H_{k,l}$, $D1_{k,l}$, $D2_{k,l}$ of the sample-based one-dimensional Laplacian operations for the respective directions. The result of the sample-based one-dimensional Laplacian operation for one direction means a sample-based gradient value for the corresponding direction. That is, the result of the one-dimensional Laplacian operation means a gradient value. The one-dimensional Laplacian operation is performed for each of the vertical, horizontal, first diagonal, and second diagonal directions, and indicates a gradient value for the corresponding direction. In addition, the results of the one-dimensional Laplacian operations for the vertical, horizontal, first diagonal, and second diagonal directions are represented as $V_{k,l}$, $H_{k,l}$, $D1_{k,l}$, $D2_{k,l}$, respectively.

For example, k and l may be the same range. That is, the horizontal length and the vertical length of the operation range in which the sum of one-dimensional Laplacian operations is calculated may be the same.

Alternatively, k and l may be different ranges. That is, the horizontal length and the vertical length of the operation range in which the sum of one-dimensional Laplacian operations is calculated may be different.

As an example, k is a range of from i−2 to i+5 and l is a range of from j−2 to j+5. In this case, the operation range in which the sum of the one-dimensional Laplacian operations is calculated is a 8×8 size. In this case, the operation range in which the sum of one-dimensional Laplacian operations is calculated is larger than the size of the block classification unit.

As another example, k is a range of from i to i+3 and l is a range of from j to j+3. In this case, the operation range in which the sum of the one-dimensional Laplacian operations is calculated is a 4×4 size. In this case, the operation range in which the sum of one-dimensional Laplacian operations is calculated is equal to the size of the block classification unit.

For example, the operation range in which the sum of the results of one-dimensional Laplacian operations is calculated has a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

For example, the operation range in which the sum of the one-dimensional Laplacian operations is calculated has a S×T size. In this case, S and T are each zero or positive integers.

For example, the block classification unit has a two-dimensional geometric shape selected from among a rhombus/diamond, a rectangle, a square, a trapezoid, a diagonal shape, a snowflake shape, a number sign shape, a clover shape, a cross shape, a triangle, a pentagon, a hexagon, an octagon, a decagon, and a dodecagon.

FIG. 9 is a diagram illustrating an exemplary method of determining gradient values for horizontal, vertical, first diagonal, and second diagonal directions, respectively;

As illustrated in FIG. 9, when the block classification is performed on a per 4×4-size block basis, at least one of the sums $g_v$, $g_h$, $g_{d1}$, $g_{d2}$ of the gradient values for the vertical, horizontal, first diagonal, and second diagonal directions may be calculated. Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed for the vertical, horizontal, first diagonal, and second diagonal directions at positions V, H, D1, and D2, respectively. In FIG. 9, the block class indices C are allocated to 4×4-size blocks that are shaded. In this case, the operation range in which the one-dimensional Laplacian sum is calculated is larger than the size of the block classification unit. Here, a thin solid-line rectangle represents a reconstructed sample position, and a thick solid-line rectangle represents the operation range in which the one-dimensional Laplacian sum is calculated.

For example, in one embodiment in the block classification is performed on a per 4×4-size block basis, the one-dimensional Laplacian sums $g_v$, $g_h$, $g_{d1}$, $g_{d2}$ of gradient values with respect to the horizontal, vertical direction, first diagonal, and second diagonal directions are calculated by Equations 10 to 13, respectively. The gradient values are represented on a sub-sample basis to reduce the computational complexity for the block classification. The directionality value D and the activity value A are derived by using the sum of the gradient values. In one the embodiment, the sum of the gradient values is used. Alternatively, an arbitrary statistical value of the gradient values can be used instead of the sum of the gradient values.

$$g_v = \sum_k \sum_l V_{k,l}, \qquad \text{[Equation 10]}$$

$$V_{k,l} = |2R(k, l) - R(k, l-1) - R(k, l+1)|,$$

$$k = i-2, i, i+2, i+4,$$

$$l = j-2, \ldots, j+5$$

$$g_h = \sum_k \sum_l H_{k,l}, \qquad \text{[Equation 11]}$$

$$H_{k,l} = |2R(k, l) - R(k-1, l) - R(k+1, l)|,$$

$$k = i-2, \ldots, i+5,$$

$$l = j-2, j, j+2, j+4$$

$$g_{d1} = \sum_k \sum_l m_{k,l} D1_{k,l}, \qquad \text{[Equation 12]}$$

$$D1_{k,l} = |2R(k, l) - R(k-1, l-1) - R(k+1, l+1)|,$$

$$k = i-2, \ldots, i+5,$$

$$l = j-2, \ldots, j+5$$

$$m_{k,l} = \begin{cases} 1 & \text{if both } k \text{ and } l \text{ are even} \\ 1 & \text{if both } k \text{ and } l \text{ are odd} \\ 0 & \text{otherwise} \end{cases}$$

$$g_{d2} = \sum_k \sum_l n_{k,l} D2_{k,l}, \qquad \text{[Equation 13]}$$

$$D2_{k,l} = |2R(k, l) - R(k-1, l+1) - R(k+1, l-1)|,$$

$$k = i-2, \ldots, i+5,$$

$$l = j-2, \ldots, j+5$$

$$n_{k,l} = \begin{cases} 1 & \text{if } k \text{ is even and } l \text{ is odd} \\ 1 & \text{if } k \text{ is odd and } l \text{ is even} \\ 0 & \text{otherwise} \end{cases}$$

In Equations 10 to 13, i and j represent the coordinates of the upper left position in the horizontal direction and in the vertical direction, respectively, and R(i,j) represents a reconstructed sample value at a position (i,j).

In Equations 10 to 13, k and l respectively represent horizontal and vertical operation ranges in which the sum of the results $V_{k,l}$, $H_{k,l}$, $D1_{k,l}$, $D2_{k,l}$ of the sample-based one-dimensional Laplacian operations is calculated. The result of the sample-based one-dimensional Laplacian operation for one direction means a sample-based gradient value for the corresponding direction. That is, the result of the one-dimensional Laplacian operation means a gradient value. The one-dimensional Laplacian operation is performed for each of the vertical, horizontal, first diagonal, and second diagonal directions, and indicates a gradient value for the corresponding direction. In addition, the results of the one-dimensional Laplacian operations for the vertical, horizontal, first diagonal, and second diagonal directions are denoted as $V_{k,1}$, $H_{k,l}$, $D1_{k,l}$, $D2_{k,l}$, respectively.

For example, k and l may be the same range. That is, the horizontal length and the vertical length of the operation range in which the sum of the one-dimensional Laplacian operation is calculated are the same.

Alternatively, k and l may be different ranges. That is, the horizontal length and the vertical length of the operation range in which the sum of the one-dimensional Laplacian operations is calculated may be different.

As an example, k is a range of from i−2 to i+5 and l is a range of from j−2 to j+5. In this case, the operation range in which the sum of the one-dimensional Laplacian operations is calculated is an 8×8 size. In this case, the operation range in which the one-dimensional Laplacian sum is calculated is larger than the size of the block classification unit.

As another example, k is a range of from i to i+3 and l is a range of from j to j+3. In this case, the operation range in which the sum of the one-dimensional Laplacian operations is calculated is a 4×4 size. In this case, the operation range in which the sum of one-dimensional Laplacian operations is calculated is equal to the size of the block classification unit.

For example, the operation range in which the sum of the results of the one-dimensional Laplacian operations is calculated has a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

For example, the operation range in which the sum of the one-dimensional Laplacian operations is calculated has a S×T size. In this case, S and T are zero or positive integers.

For example, the block classification unit has a two-dimensional geometric shape selected from among a rhombus/diamond, a rectangle, a square, a trapezoid, a diagonal shape, a snowflake shape, a number sign shape, a clover shape, a cross shape, a triangle, a pentagon, a hexagon, an octagon, a decagon, and a dodecagon.

According to an embodiment of the present invention, a sample-based gradient value calculation method can calculate a gradient value by performing the one-dimensional Laplacian operation on the samples within the operation range along the corresponding direction. Here, the statistical value of the gradient values can be calculated by calculating a statistical value of the results of the one-dimensional Laplacian operations performed on at least one of the samples within the operation range in which the sum of one-dimensional Laplacian operations is calculated. In this case, the statistical value is any one of a sum, a weighted sum, and an average value.

For example, for calculation of a gradient value for the horizontal direction, the one-dimensional Laplacian operation is performed at every sample position within the operation range in which the sum of the one-dimensional Laplacian operations is calculated. In this case, the gradient value for the horizontal direction can be calculated at an interval of P rows within the operation range in which the sum of the one-dimensional Laplacian operations is calculated. Here, P is a positive integer.

Alternatively, for the calculation of the gradient value for the vertical direction, the one-dimensional Laplacian operation is performed at every sample position within the operation range, on a column, in which the sum of the one-dimensional Laplacian operations is calculated. In this case, the gradient value for the vertical direction can be calculated at an interval of P columns within the operation range in which the sum of the one-dimensional Laplacian operations is calculated. Here, P is a positive integer.

Further alternatively, for calculation of a gradient value for the first diagonal direction, within the operation range in which the sum of the one-dimensional Laplacian operations is calculated, the one-dimensional Laplacian operations are performed on the sample positions at an interval of P rows or Q columns in at least one of the horizontal direction and the vertical direction, thereby obtaining the gradient value for the first diagonal direction. Here, P and Q are zero or positive integers.

Further alternatively, for calculation of the gradient value for the second diagonal direction, within the operation range in which the sum of the one-dimensional Laplacian operations is calculated, the one-dimensional Laplacian operations are performed on the sample positions at an interval of P rows or Q columns in at least one of the horizontal direction and the vertical direction, thereby obtaining the gradient value for the second diagonal direction. Here, P and Q are zero or positive integers.

According to an embodiment of the present invention, a sample-based gradient value calculation method can calculate a gradient value by performing the one-dimensional Laplacian operation on at least one sample within the operation range in which the sum of the one-dimensional Laplacian operations is calculated. Here, the statistical value of the gradient values can be calculated by calculating a statistical value of the results of the one-dimensional Laplacian operations performed on at least one sample among the samples within the operation range in which the sum of the one-dimensional Laplacian operations is calculated. In this case, the statistical value is any one of a sum, a weighted sum, and an average value.

For example, for calculation of a gradient value, the one-dimensional Laplacian operation is performed at every sample position within the operation range in which the sum of the one-dimensional Laplacian operations is calculated. In this case, the gradient value can be calculated at an interval of P rows within the operation range in which the sum of the one-dimensional Laplacian operations is calculated. Here, P is a positive integer.

Alternatively, for the calculation of the gradient value, the one-dimensional Laplacian operation is performed at every sample position within the operation range on a column in which the sum of the one-dimensional Laplacian operations is calculated. In this case, the gradient value can be calculated at an interval of P rows within the operation range in which the sum of the one-dimensional Laplacian operations is calculated. Here, P is a positive integer.

Further alternatively, for calculation of the gradient value, within the operation range in which the sum of the one-dimensional Laplacian operations is calculated, the one-dimensional Laplacian operation is performed on the sample positions at an interval of P rows or Q columns in at least one of the horizontal direction and the vertical direction, thereby obtaining the gradient value. Here, P and Q are zero or positive integers.

Further alternatively, for calculation of the gradient value, within the operation range in which the sum of the one-dimensional Laplacian operations is calculated, the one-dimensional Laplacian operation is performed on the sample positions at an interval of P rows and Q columns in the horizontal direction and the vertical direction, thereby obtaining the gradient value. Here, P and Q are zero or positive integers.

On the other hand, the gradient refers to at least one of a gradient with respect to a horizontal direction, a gradient with respect to a vertical direction, a gradient with respect to a first diagonal direction, and a gradient with respect to a second diagonal direction.

Figure 10:
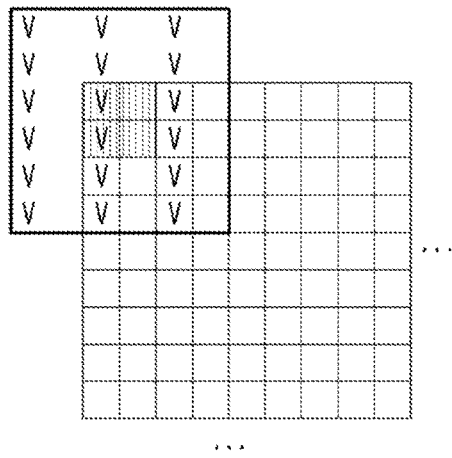
FIGS. 10 to 12 are diagrams illustrating exemplary subsampling-based methods of determining gradient values for horizontal, vertical, first diagonal, and second diagonal directions.
Figure 10:
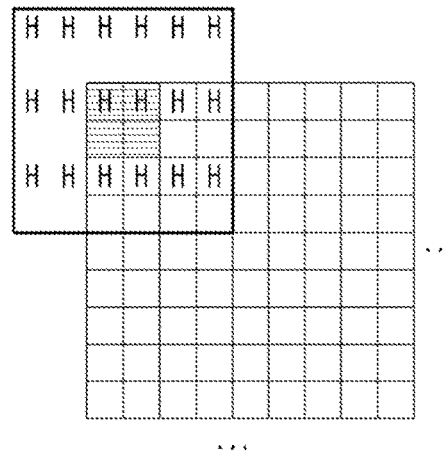
Figure 10:
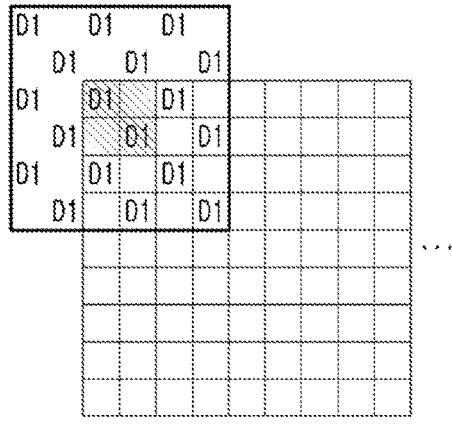
Figure 10:
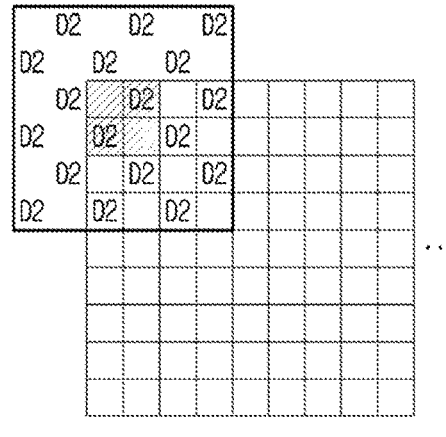
Figure 11:
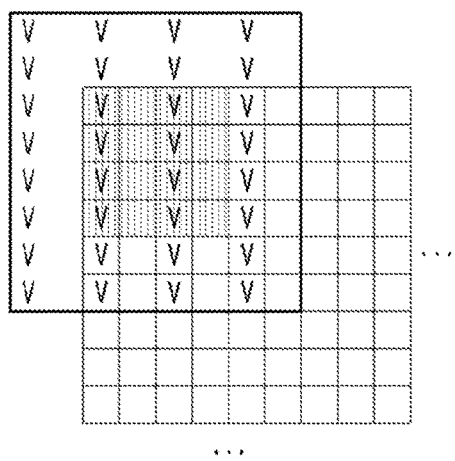
Figure 11:
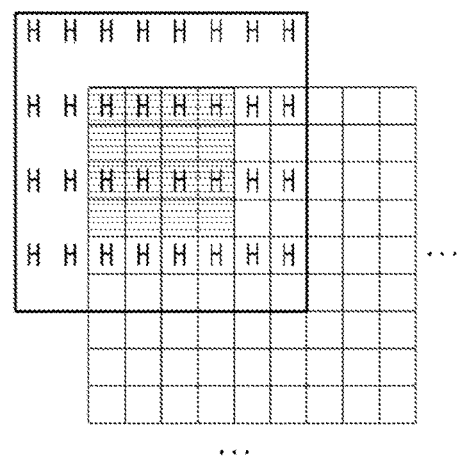
Figure 11:
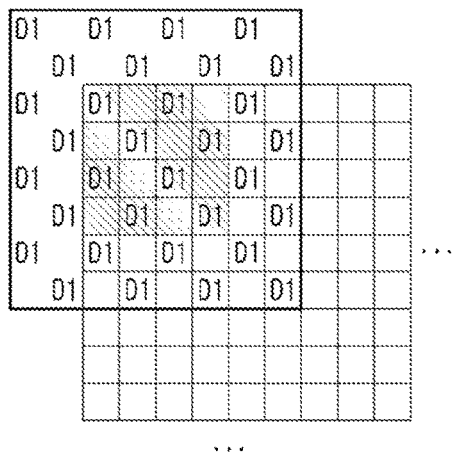
Figure 11:
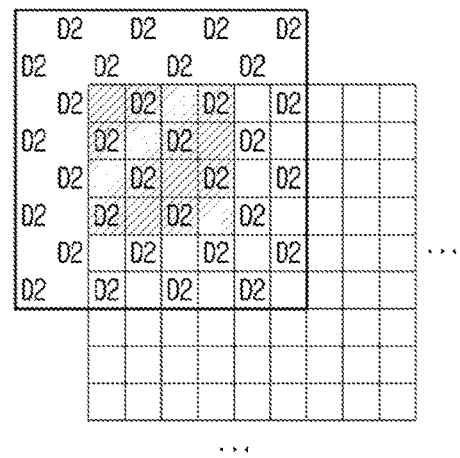
Figure 12:
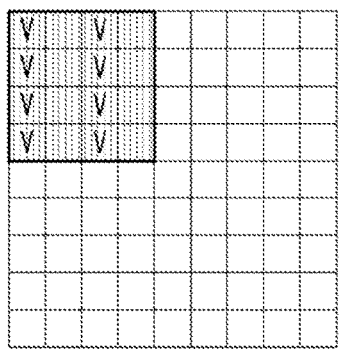
Figure 12:
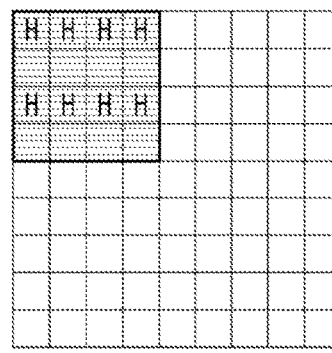
Figure 12:
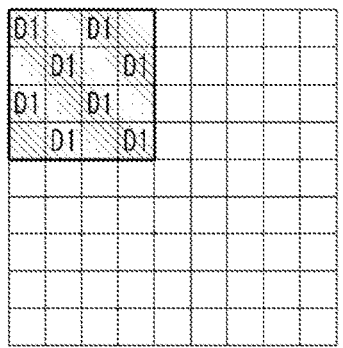
Figure 12:
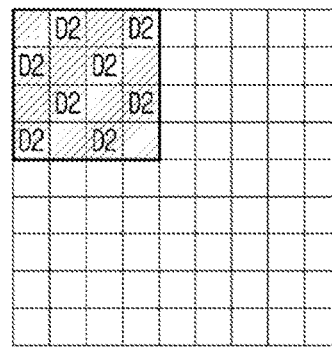

FIGS. 10 to 12 are diagrams illustrating subsampling-based methods of determining gradient values for horizontal, vertical, first diagonal, and second diagonal directions.

As illustrated in FIG. 10, when the block classification is performed on a per 2×2-size block basis, at least one of the sums $g_v$, $g_h$, $g_{d1}$, $g_{d20}$f the gradient values for the vertical, horizontal, first diagonal, and second diagonal directions can be calculated on the basis of subsampling. Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed for the vertical, horizontal, first diagonal, and second diagonal directions at positions V, H, D1, and D2, respectively. In addition, the position at which the one-dimensional Laplacian operation is performed are sub-sampled positions. In FIG. 10, the block class indices C are allocated to 2×2-size blocks that are shaded. In this case, the operation range in which the one-dimensional Laplacian sum is calculated is larger than the size of the block classification unit. Here, a thin solid-line rectangle represents a reconstructed sample position, and a thick solid-line rectangle represents the operation range in which the one-dimensional Laplacian sum is calculated.

In the drawings of the present invention, positions that are not denoted by V, H, D1, or D2 are sample positions at which the one-dimensional Laplacian operation along a direction is not performed. That is, the one-dimensional Laplacian operation along each direction is performed only at the sample positions denoted by V, H, D1, or D2. When the one-dimensional Laplacian operation is not performed, the result of the one-dimensional Laplacian operation on the corresponding sample position is determined as a specific value, for example, H. Here, H may be at least one of a negative integer, 0, and a positive integer.

As illustrated in FIG. 11, when the block classification is performed on a 4×4-size block basis, at least one of the sums $g_v$, $g_h$, $g_{d1}$, $g_{d2}$ of the gradient values for the vertical, horizontal, first diagonal, and second diagonal directions can be calculated on the basis of subsampling. Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the vertical, horizontal, first diagonal, and second diagonal directions at positions V, H, D1, and D2, respectively. In addition, the positions at which the one-dimensional Laplacian operation is performed are sub-sampled positions. In FIG. 11, the block class indices C are allocated to 4×4-size blocks that are shaded. In this case, the operation range in the one-dimensional Laplacian sum is calculated is larger than the size of the block classification unit. Here, a thin solid-line rectangle represents a reconstructed sample position, and a thick solid-line rectangle represents the operation range in which the one-dimensional Laplacian sum is calculated.

As illustrated in FIG. 12, when the block classification is performed on a 4×4-size block basis, at least one of the sums $g_v$, $g_h$, $g_{d1}$, $g_{d2}$ of the gradient values for the vertical, horizontal, first diagonal, and second diagonal directions can be calculated on the basis of subsampling. Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the vertical, horizontal, first diagonal, and second diagonal directions at positions V, H, D1, and D2, respectively. In addition, the positions at which the one-dimensional Laplacian operation is performed are sub-sampled positions. In FIG. 12, the block class indices C are allocated to 4×4-size blocks that are shaded. In this case, the operation range in which the sum of the one-dimensional Laplacian operations is calculated is equal to the size of the block classification unit. Here, a thin solid-line rectangle represents a reconstructed sample position, and a thick solid-line rectangle represents the operation range in which the one-dimensional Laplacian sum is calculated.

According to an embodiment of the present invention, a gradient value may be calculated by performing the one-dimensional Laplacian operation on a sample disposed at a specific position in an N×M-size block on the basis of subsampling. In this case, the specific position may be at least one of an absolute position and a relative position within a block. Here, a statistical value of the gradient values may be calculated by calculating a statistical value of the results of the one-dimensional Laplacian operations performed on at least one sample among the samples within the operation range in which the one-dimensional Laplacian sum is calculated. In this case, the statistical value is any one of a sum, a weighted sum, and an average value.

For example, the absolute position means the upper left position within an N×M block.

Alternatively, the absolute position mean the lower right position within an N×M block.

Further alternatively, the relative position means the center position within the N×M block.

According to an embodiment of the present invention, a gradient value may be calculated by performing the one-dimensional Laplacian operation on R samples within an N×M-size block on the basis of subsampling. In this case, P and Q are zero or positive integers. In addition, R is equal to or less than the product of N and M. Here, a statistical value of the gradient values may be calculated by calculating a statistical value of the results of the one-dimensional Laplacian operations performed on at least one sample among the samples within the operation range in which the one-dimensional Laplacian sum is calculated. In this case, the statistical value is any one of a sum, a weighted sum, and an average value.

For example, when R is 1, the one-dimensional Laplacian operation is performed on only one sample within an N×M block.

Alternatively, when R is 2, the one-dimensional Laplacian operation is performed on only two samples within an N×M block.

Further alternatively, when R is 4, the one-dimensional Laplacian operation is performed on only 4 samples within each N×M-size block.

According to an embodiment of the present invention, a gradient value may be calculated by performing the one-dimensional Laplacian operation on R samples within each N×M-size block on the basis of subsampling. In this case, R is a positive integer. In addition, R is equal to or less than the product of N and M. Here, a statistical value of the gradient values is obtained by calculating a statistical value of the results of the one-dimensional Laplacian operations performed on at least one sample among the samples within the operation range in which the one-dimensional Laplacian sum is calculated. In this case, the statistical value is any one of a sum, a weighted sum, and an average value.

For example, when R is 1, the one-dimensional Laplacian operation is performed on only one sample within each N×M-size block in which the one-dimensional Laplacian sum is calculated.

Alternatively, when R is 2, the one-dimensional Laplacian operation is performed on only two samples within each N×M-size block in which the one-dimensional Laplacian sum is calculated.

Further alternatively, when R is 4, the one-dimensional Laplacian operation is performed on only 4 samples within each N×M-size block in which the one-dimensional Laplacian sum is calculated.

FIGS. 13 to 18 are diagrams illustrating exemplary sub-sampling-based methods of determining gradient values along horizontal, vertical, first diagonal, and second diagonal directions.

Figure 13:
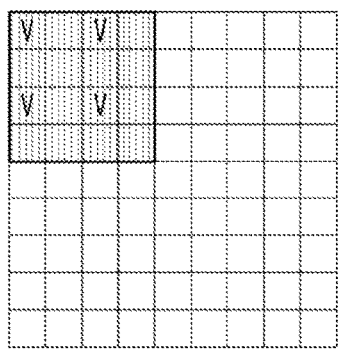
FIGS. 13 to 18 are diagrams illustrating exemplary subsampling-based methods of determining gradient values for horizontal, vertical, first diagonal, and second diagonal directions.
Figure 13:
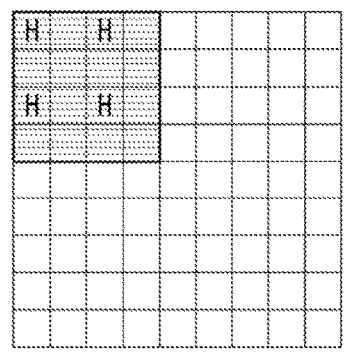
Figure 13:
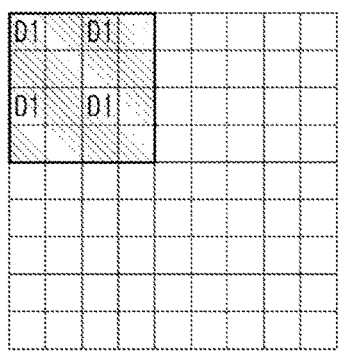
Figure 13:
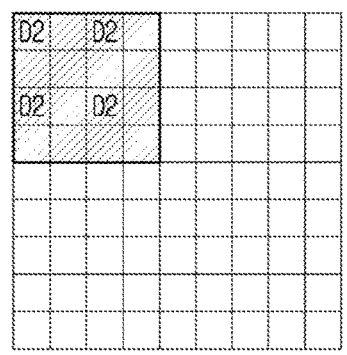

As illustrated in FIG. 13, when the block classification is performed on a per 4×4-size block basis, at least one of the sums $g_v$, $g_h$, $g_{d1}$, $g_{d2}$ of the gradient values for the vertical, horizontal, first diagonal, and second diagonal directions is be calculated by using samples at specific positions within each N×M-size block on the basis of subsampling. Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the vertical direction, the horizontal direction, the first diagonal direction, and the second diagonal direction at positions V, H, D1, and D2, respectively. In addition, the positions at which the one-dimensional Laplacian operations are performed may be sub-sampled positions. In FIG. 13, the block class indices C are allocated to 4×4-size blocks that are shaded. In this case, the operation range in which the sum of the one-dimensional Laplacian operations is calculated is equal to the size of the block classification unit. Here, a thin solid-line rectangle represents a reconstructed sample position, and a thick solid-line rectangle represents the operation range in which the sum of the one-dimensional Laplacian operation is calculated.

Figure 14:
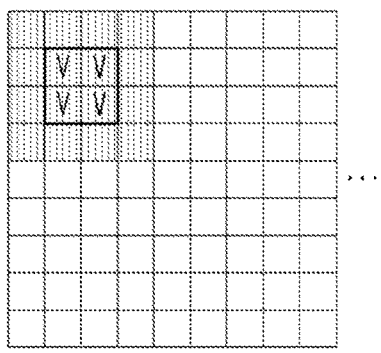
Figure 14:
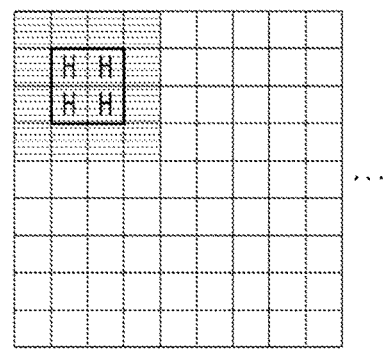
Figure 14:
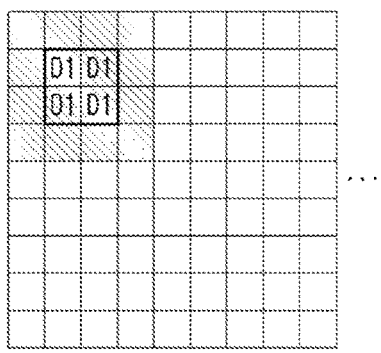
Figure 14:
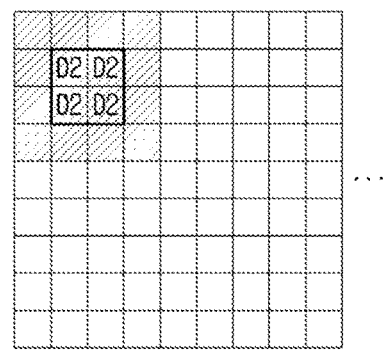

As illustrated in FIG. 14, when the block classification is performed on a per 4×4-size block basis, at least one of the sums $g_v$, $g_h$, $g_{d1}$, $g_{d2}$ of the gradient values for the vertical, horizontal, first diagonal, and second diagonal directions can be calculated by using samples at specific positions within each N×M-size block on the basis of subsampling. Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the vertical direction, the horizontal direction, the first diagonal direction, and the second diagonal direction at positions V, H, D1, and D2, respectively. In addition, the positions at which the one-dimensional Laplacian operations are performed are sub-sampled positions. In FIG. 14, the block class indices C are allocated to 4×4-size blocks that are shaded. In this case, the operation range in which the sum of the one-dimensional Laplacian operations is calculated is smaller than the size of the block classification unit. Here, a thin solid-line rectangle represents a reconstructed sample position, and a thick solid-line rectangle represents the operation range in which the sum of the one-dimensional Laplacian operation is calculated.

Figure 15:
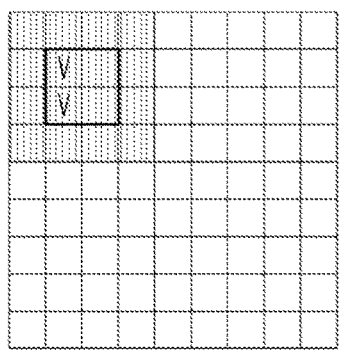
Figure 15:
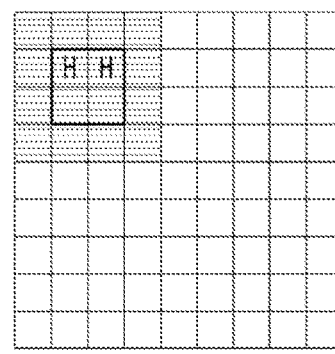
Figure 15:
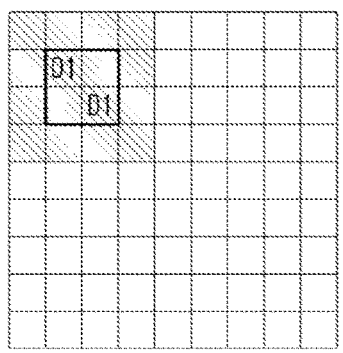
Figure 15:
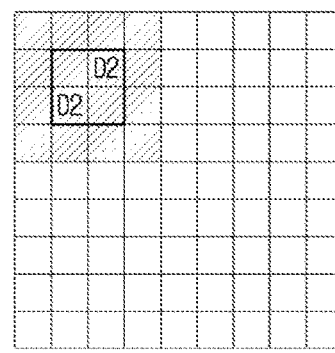

As illustrated in FIG. 15, when the block classification is performed on a per 4×4-size block basis, at least one of the sums $g_v$, $g_h$, $g_{d1}$, $g_{d2}$ of the gradient values for the vertical, horizontal, first diagonal, and second diagonal directions can be calculated by using samples at specific positions within each N×M-size block on the basis of subsampling. Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the vertical direction, the horizontal direction, the first diagonal direction, and the second diagonal direction at positions V, H, D1, and D2, respectively. In addition, the positions at which the one-dimensional Laplacian operations are performed may be sub-sampled positions. In FIG. 15, the block class indices C are allocated to 4×4-size blocks that are shaded. In this case, the operation range in the sum of the one-dimensional Laplacian operations is calculated is smaller than the size of the block classification unit. Here, a thin solid-line rectangle represents a reconstructed sample position, and a thick solid-line rectangle represents the operation range in which the one-dimensional Laplacian sum is calculated.

Figure 16:
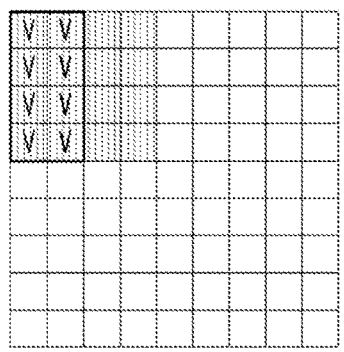
Figure 16:
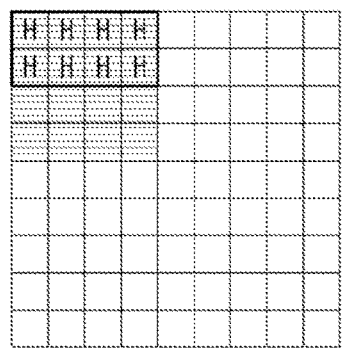
Figure 16:
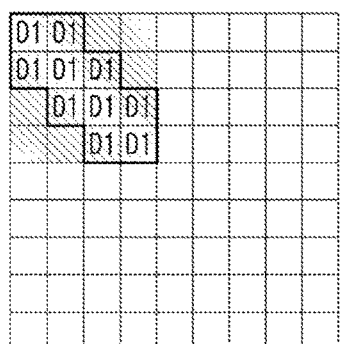
Figure 16:
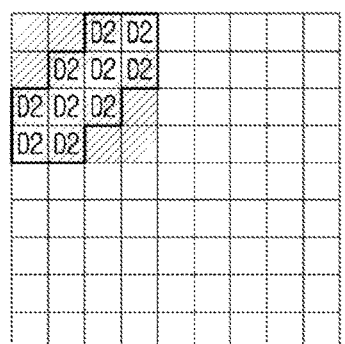

As illustrated in FIG. 16, when the block classification is performed on a per 4×4-size block basis, at least one of the sums $g_v$, $g_h$, $g_{d1}$, $g_{d2}$ of the gradient values for the vertical, horizontal, first diagonal, and second diagonal directions is calculated by using samples at specific positions within each N×M-size block on the basis of subsampling. Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the vertical direction, the horizontal direction, the first diagonal direction, and the second diagonal direction at positions V, H, D1, and D2, respectively. In addition, the positions at which the one-dimensional Laplacian operations are performed are sub-sampled positions. In FIG. 16, the block class indices C are allocated to 4×4-size blocks that are shaded. In this case, the operation range in the sum of the one-dimensional Laplacian operations is calculated is smaller than the size of the block classification unit. Here, a thin solid-line rectangle represents a reconstructed sample position, and a thick solid-line rectangle represents the operation range in which the sum of the one-dimensional Laplacian operations is calculated.

Figure 17:
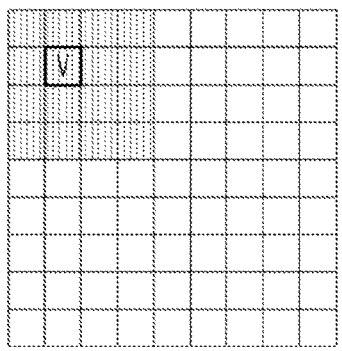
Figure 17:
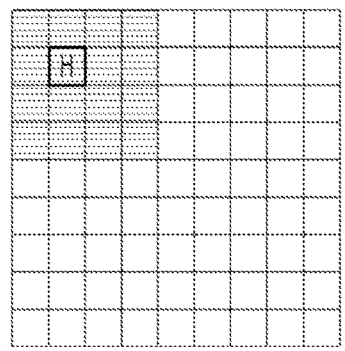
Figure 17:
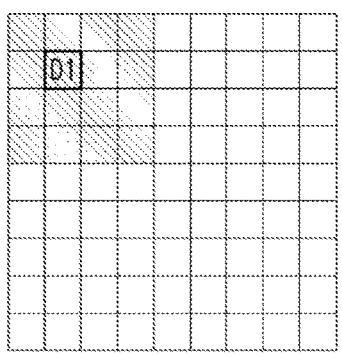
Figure 17:
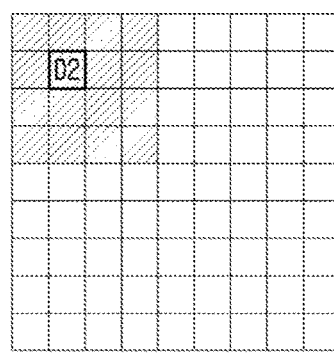

As illustrated in FIG. 17, when the block classification is performed on a 4×4-size block basis, at least one of the sums $g_v$, $g_h$, $g_{d1}$, $g_{d2}$ of the gradient values for the vertical, horizontal, first diagonal, and second diagonal directions can be calculated by using samples at specific positions within each N×M-size block on the basis of subsampling. Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the vertical direction, the horizontal direction, the first diagonal direction, and the second diagonal direction at positions V, H, D1, and D2, respectively. In addition, the positions at which one-dimensional Laplacian operations are performed may be sub-sampled positions. In FIG. 17, the block class indices C are allocated to 4×4-size blocks that are shaded. In this case, the operation range in the sum of the one-dimensional Laplacian operations is calculated may be smaller than the size of the block classification unit. Here, since the operation range in which the sum of one-dimensional Laplacian operations is calculated has a 1×1 size, the gradient value may be calculated without calculating the sum of one-dimensional Laplacian operations. Here, a thin solid-line rectangle represents a reconstructed sample position, and a thick solid-line rectangle represents an operation range in which the sum of one-dimensional Laplacian operations is calculated.

Figure 18:
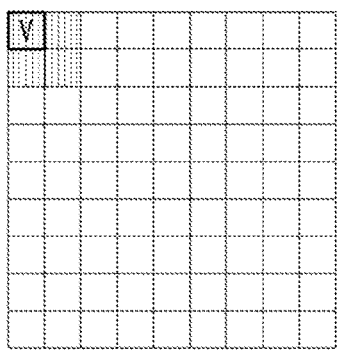
Figure 18:
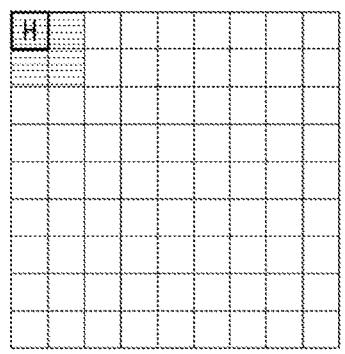
Figure 18:
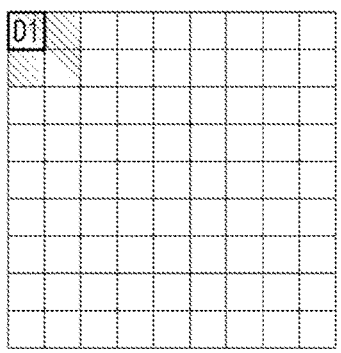
Figure 18:
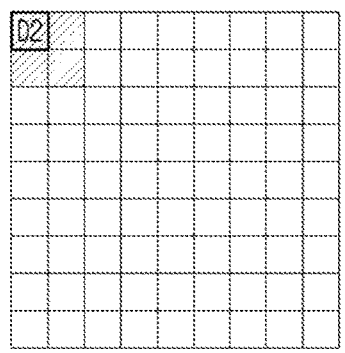

As illustrated in FIG. 18, when the block classification is performed on a 2×2-size block basis, at least one of the sums $g_v$, $g_h$, $g_{d1}$, $g_{d2}$ of the gradient values for the vertical, horizontal, first diagonal, and second diagonal directions can be calculated by using samples at specific positions within each N×M-size block on the basis of subsampling. Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the vertical direction, the horizontal direction, the first diagonal direction, and the second diagonal direction at positions V, H, D1, and D2, respectively. In addition, the positions at which one-dimensional Laplacian operations are performed may be sub-sampled positions. In FIG. 18, the block class indices C are allocated to 2×2-size blocks that are shaded. In this case, the operation range in the sum of the one-dimensional Laplacian operations is calculated may be smaller than the size of the block classification unit. Here, since the operation range in which the sum of one-dimensional Laplacian operations is calculated has a 1×1 size, the gradient value may be calculated without calculating the sum of one-dimensional Laplacian operations. Here, a thin solid-line rectangle represents a reconstructed sample position, and a thick solid-line rectangle represents an operation range in which the sum of one-dimensional Laplacian operations is calculated.

FIGS. 19 to 30 are diagrams illustrating methods of determining gradient values at specific sample positions with respect to horizontal, vertical, first diagonal, and second diagonal directions. The specific sample position may be a sub-sampled sample position within a block classification unit or may be a sub-sampled sample position within an operation range in which the sum of one-dimensional Laplacian operations is calculated. In addition, the specific sample positions are the sample positions within each block. Alternatively, the specific sample positions may vary from block to block. In addition, the specific sample positions may be the same regardless of the direction of one-dimensional Laplacian operation to be calculated. In addition, the specific sample positions may be the same for each block regardless of the direction of one-dimensional Laplacian operation.

As illustrated in FIG. 19, when the block classification is performed on a 4×4-size block basis, at least one of the sums $g_v$, $g_h$, $g_{d1}$, $g_{d2}$ of the gradient values at one or more specific sample positions. Here, V, H, D1, and D2 represent the results of the sample-based one-dimensional Laplacian operations for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, the positions at which one-dimensional Laplacian operations are performed may be sub-sampled positions. In FIG. 19, the block class indices C are allocated to 4×4-size blocks that are shaded. In this case, the operation range for calculation of one-dimensional Laplacian sum may be larger than the size of the block classification unit. Here, a thin solid-line rectangle represents a reconstructed sample position, and a thick solid-line rectangle represents an operation range in which one-dimensional Laplacian sum is calculated.

As illustrated in FIG. 19, regardless of the direction of the one-dimensional Laplacian operation, the specific sample position at which the one-dimensional Laplacian operation is performed are the same. In addition, as illustrated in FIG. 19, the pattern of the sample positions on which the one-dimensional Laplacian calculation is performed may be referred to as a checkerboard pattern or a quincunx pattern. In addition, all of the sample positions on which one-dimensional Laplacian operation is performed are even-numbered or odd-numbered sample positions, in both the horizontal direction (x-axis direction) and the vertical direction (y-axis direction), within the operation range in which the one-dimensional Laplacian sum is calculated, within the block classification unit or block unit.

As illustrated in FIG. 20, when the block classification is performed on a 4×4-size block basis, at least one of the sums $g_v$, $g_h$, $g_{d1}$, and $g_{d2}$ of the gradient values is calculated at one or more specific sample positions. Here, V, H, D1, and D2 represent the results of the sample-based one-dimensional Laplacian operations performed on a sample basis for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, the positions at which one-dimensional Laplacian operations are performed may be sub-sampled positions. In FIG. 20, the block class indices C are allocated to 4×4-size blocks that are shaded. In this case, an operation range for the one-dimensional Laplacian sum may be larger than the size of the block classification unit. Here, a thin solid-line rectangle represents a reconstructed sample position, and a thick solid-line rectangle represents an operation range in which the one-dimensional Laplacian sum is calculated.

As illustrated in FIG. 20, regardless of the one-dimension Laplacian operation direction, the specific sample position at which the one-dimensional Laplacian operation is performed are the same. In addition, as illustrated in FIG. 20, the pattern of the sample positions at which the one-dimensional Laplacian calculation is performed may be referred to as a checkerboard pattern or a quincunx pattern. In addition, the sample positions at which the one-dimensional Laplacian operation is performed are even-numbered or odd-numbered sample positions in both the horizontal direction (x-axis direction) and the vertical direction (y-axis direction) in a one-dimensional Laplacian operation range within a block classification unit or block unit.

Figure 21:
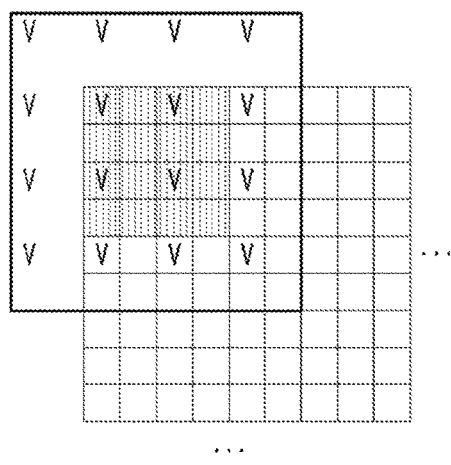
Figure 21:
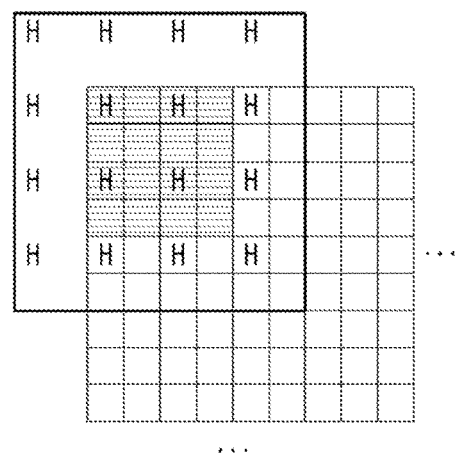
Figure 21:
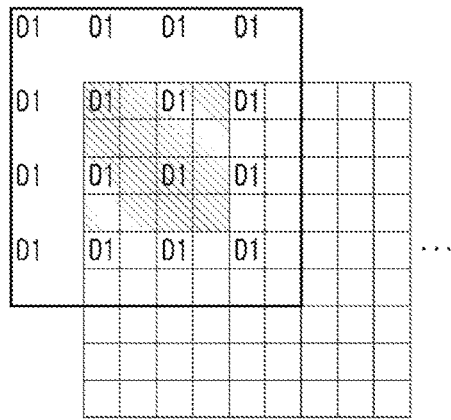
Figure 21:
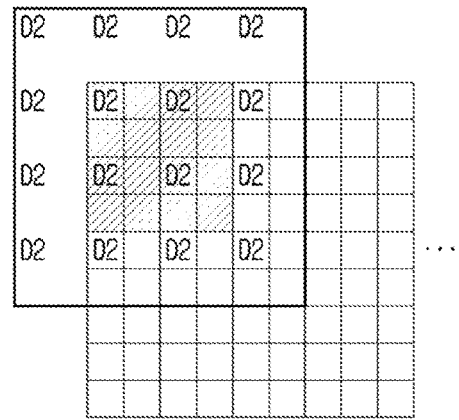

As illustrated in FIG. 21, when block classification is performed on a 4×4-size block basis, at least one of the sums $g_v$, $g_h$, $g_{d1}$, and $g_{d2}$ of the gradient values is calculated at one or more specific sample positions. Here, V, H, D1, and D2 represent the results of the sample-based one-dimensional Laplacian operations on a sample basis for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, the positions at which one-dimensional Laplacian operations are performed may be sub-sampled positions. In FIG. 21, the block class indices C are allocated to 4×4-size blocks that are shaded. In this case, an operation range in which the one-dimensional Laplacian sum is calculated may be larger than the size of the block classification unit. Here, a thin solid-line rectangle represents a reconstructed sample position, and a thick solid-line rectangle represents an operation range in which the one-dimensional Laplacian sum is calculated.

Figure 22:
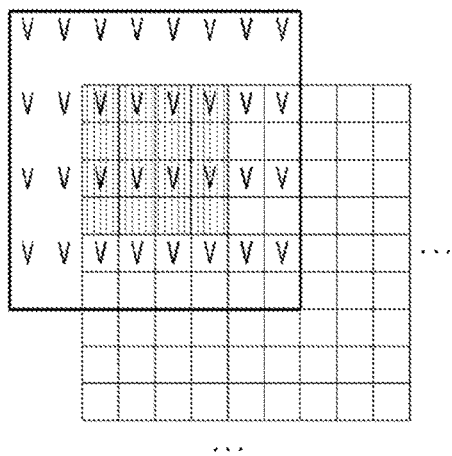
Figure 22:
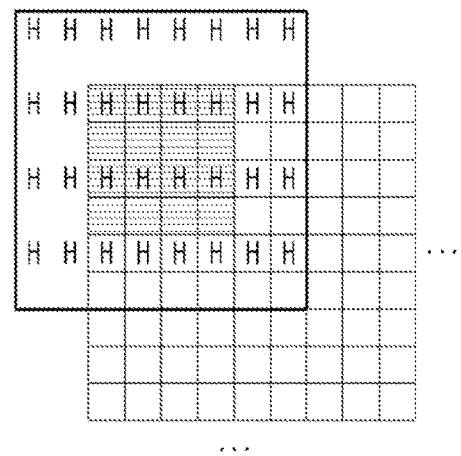
Figure 22:
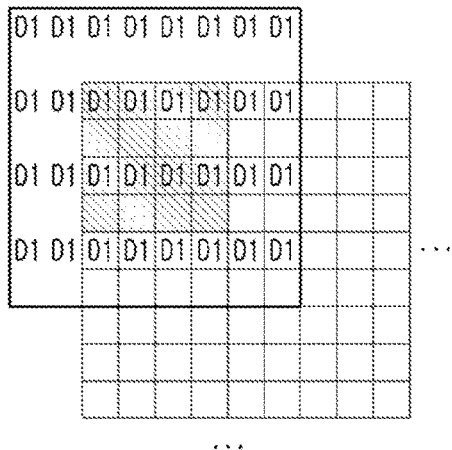
Figure 22:
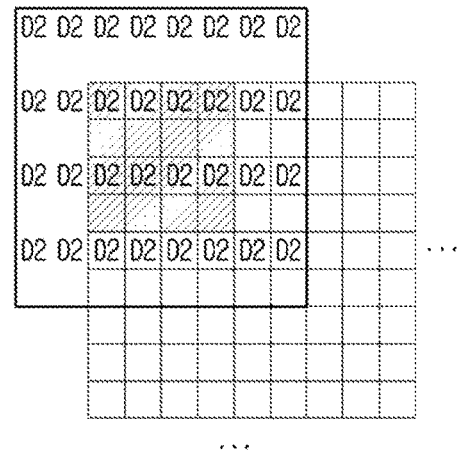

As illustrated in FIG. 22, when block classification is performed on a 4×4-size block basis, at least one of the sums $g_v$, $g_h$, $g_{d1}$, and $g_{d2}$ of the gradient values is calculated at one or more specific sample positions. Here, V, H, D1, and D2 represent the results of the sample-based one-dimensional Laplacian operations on a sample basis for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, the positions at which one-dimensional Laplacian operations are performed may be sub-sampled positions. In FIG. 22, the block class indices C are allocated to 4×4-size blocks that are shaded. In this case, an operation range in which the one-dimensional Laplacian sum is calculated may be larger than the size of the block classification unit. Here, a thin solid-line rectangle represents a reconstructed sample position, and a thick solid-line rectangle represents an operation range in which the one-dimensional Laplacian sum is calculated.

Figure 23:
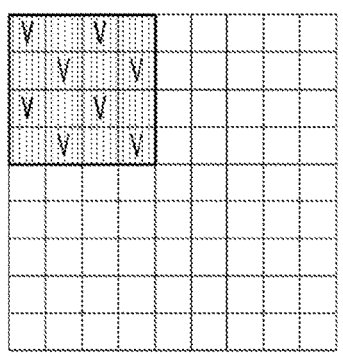
Figure 23:
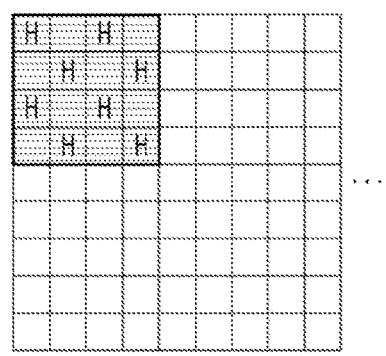
Figure 23:
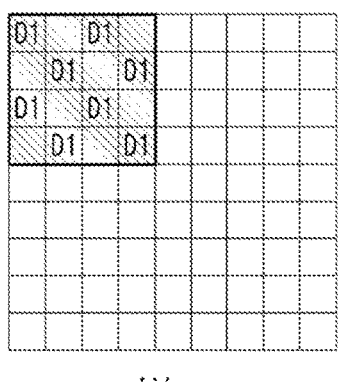
Figure 23:
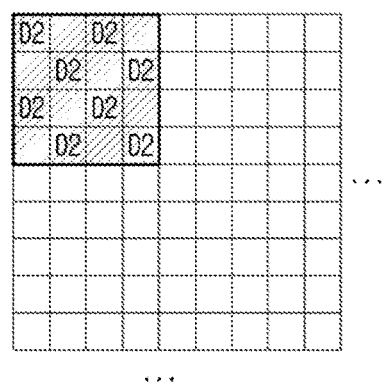

As illustrated in FIG. 23, when block classification is performed on a per 4×4-size block basis, at least one of the sums $g_v$, $g_h$, $g_{d1}$, and $g_{d2}$ of the gradient values is calculated at one or more specific sample positions. Here, V, H, D1, and D2 represent the results of the sample-based one-dimensional Laplacian operations for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, the positions at which one-dimensional Laplacian operations are performed may be sub-sampled positions. In FIG. 23, the block class indices C are allocated to 4×4-size blocks that are shaded. In this case, the operation range in which the one-dimensional Laplacian sum is calculated may be equal to the size of the block classification unit. Here, a thin solid-line rectangle represents a reconstructed sample position, and a thick solid-line rectangle represents an operation range in which the sum of one-dimensional Laplacian operations is calculated.

As illustrated in FIG. 23, regardless of the one-dimension Laplacian operation direction, the specific sample position at which the one-dimensional Laplacian operation is performed are the same. In addition, as illustrated in FIG. 23, the pattern of the sample positions at which the one-dimensional Laplacian calculation is performed may be referred to as a checkerboard pattern or a quincunx pattern. In addition, all of the sample positions at which a one-dimensional Laplacian operation is performed are even-numbered or odd-numbered sample positions, in both or either one of the horizontal direction (x-axis direction) and the vertical direction (y-axis direction) within a one-dimensional Laplacian operation range in a block classification unit or block unit.

Figure 24:
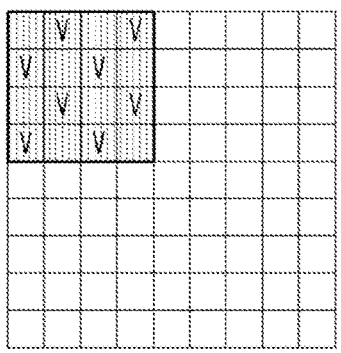
Figure 24:
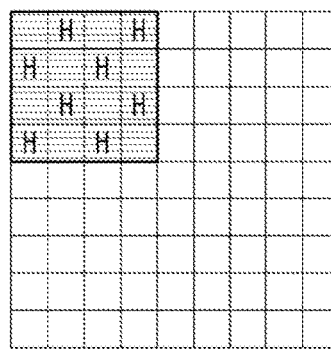
Figure 24:
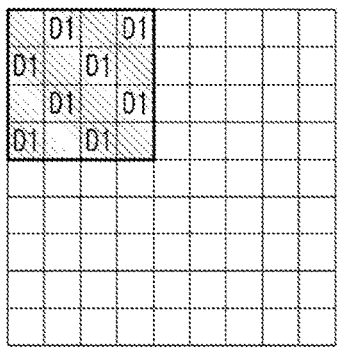
Figure 24:
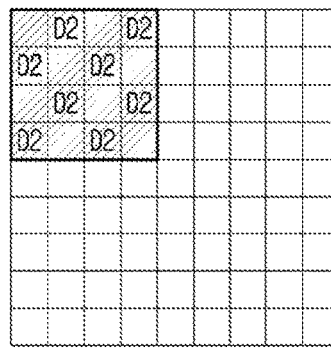

As illustrated in FIG. 24, when block classification is performed on a per 4×4-size block basis, at least one of the sums $g_v$, $g_h$, $g_{d1}$, and $g_{d2}$ of the gradient values is calculated at one or more specific sample positions. Here, V, H, D1, and D2 represent the results of the sample-based one-dimensional Laplacian operations for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, the positions at which one-dimensional Laplacian operations are performed may be sub-sampled positions. In FIG. 24, the block class indices C are allocated to 4×4-size blocks that are shaded. In this case, the operation range in which the one-dimensional Laplacian sum is calculated may be equal to the size of the block classification unit. Here, a thin solid-line rectangle represents a reconstructed sample position, and a thick solid-line rectangle represents an operation range in which the one-dimensional Laplacian sum is calculated.

As illustrated in FIG. 24, regardless of the one-dimension Laplacian operation directions, the specific sample position at which the one-dimensional Laplacian operation is performed are the same. In addition, as illustrated in FIG. 24, a pattern of sample positions at which the one-dimension Laplacian operation is performed may be referred to as a checkerboard pattern or a quincunx pattern. In addition, sample positions at which the one-dimensional Laplacian operation is performed are even-numbered or odd-numbered sample positions in both or either one of the horizontal direction (x-axis direction) and the vertical direction (y-axis direction) in a one-dimensional Laplacian operation range, a block classification unit, or a block unit.

Figure 25:
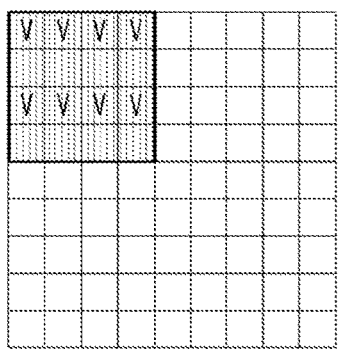
Figure 25:
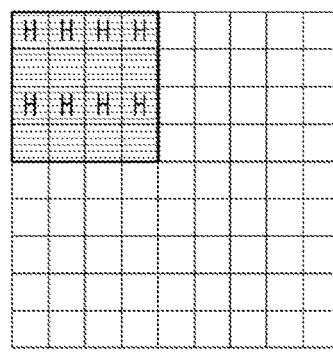
Figure 25:
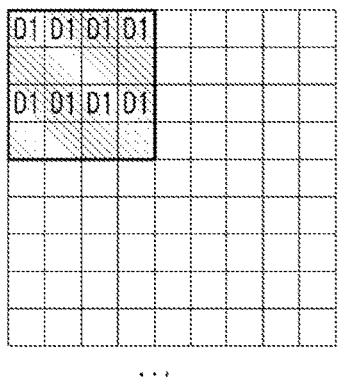
Figure 25:
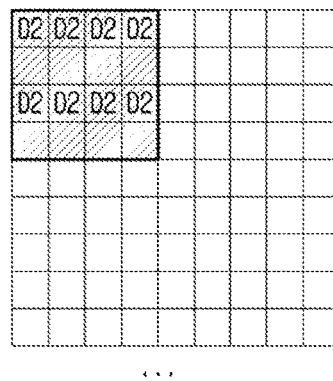

As illustrated in FIG. 25, when block classification is performed on a per 4×4-size block basis, at least one of the sums $g_v$, $g_h$, $g_{d1}$, and $g_{d2}$ of the gradient values is calculated at one or more specific sample positions. Here, V, H, D1, and D2 represent the results of the sample-based one-dimensional Laplacian operations for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, positions at which one-dimensional Laplacian operations are performed may be sub-sampled positions. In FIG. 25, the block class indices C are allocated to 4×4-size blocks that are shaded. In this case, an operation range in which the one-dimensional Laplacian sum is calculated may be equal to the size of the block classification unit. Here, a thin solid-line rectangle represents a reconstructed sample position, and a thick solid-line rectangle represents an operation range in which the one-dimensional Laplacian sum is calculated.

Figure 26:
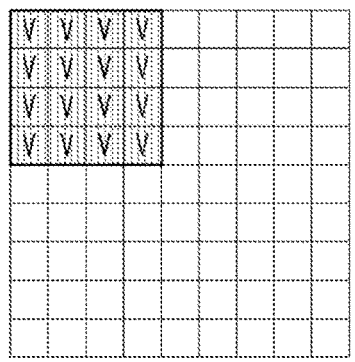
Figure 26:
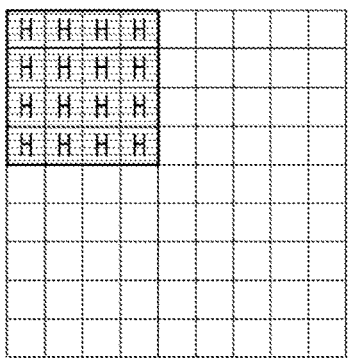
Figure 26:
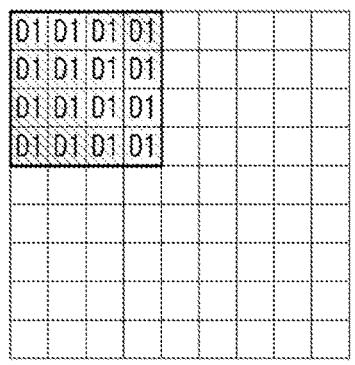
Figure 26:
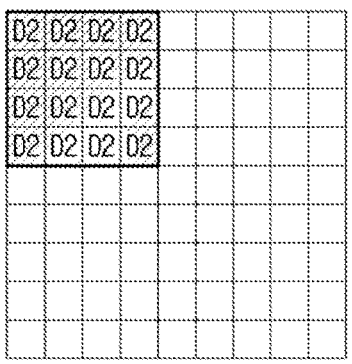

As illustrated in FIG. 26, when block classification is performed on a per 4×4-size block basis, at least one of the sums $g_v$, $g_h$, $g_{d1}$, and $g_{d2}$ of the gradient values is calculated at one or more specific sample positions. Here, V, H, D1, and D2 represent the results of the sample-based one-dimensional Laplacian operations for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In FIG. 26, the block class indices C are allocated to 4×4-size blocks that are shaded. In this case, an operation range in which the one-dimensional Laplacian sum is calculated may be equal to the size of the block classification unit. Here, a thin solid-line rectangle represents a reconstructed sample position, and a thick solid-line rectangle represents an operation range in which the one-dimensional Laplacian sum is calculated. The specific sample position may refer to every sample position within a block classification unit.

Figure 27:
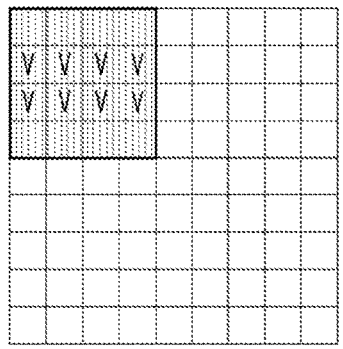
Figure 27:
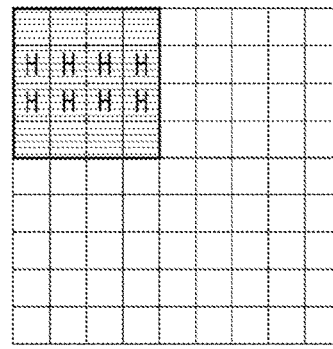
Figure 27:
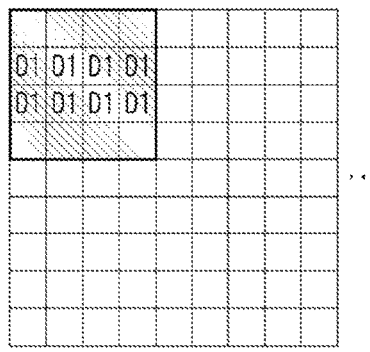
Figure 27:
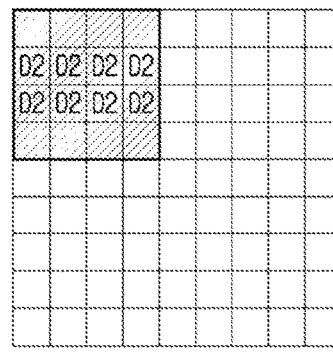

As illustrated in FIG. 27, when block classification is performed on a per 4×4-size block basis, at least one of the sums $g_v$, $g_h$, $g_{d1}$, and $g_{d2}$ of the gradient values is calculated at one or more specific sample positions. Here, V, H, D1, and D2 represent the results of the sample-based one-dimensional Laplacian operations for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, positions at which one-dimensional Laplacian operations are performed may be sub-sampled positions. In FIG. 27, the block class indices C are allocated to 4×4-size blocks that are shaded. In this case, an operation range in which the one-dimensional Laplacian sum is calculated may be equal to the size of the block classification unit. Here, a thin solid-line rectangle represents a reconstructed sample position, and a thick solid-line rectangle represents an operation range in which the one-dimensional Laplacian sum is calculated.

As illustrated in FIG. 28, when block classification is performed on a per 4×4-size block basis, at least one of the sums $g_v$, $g_h$, $g_{d1}$, and $g_{d2}$ of the gradient values is calculated at one or more specific sample positions. Here, V, H, D1, and D2 represent the results of the sample-based one-dimensional Laplacian operations for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In FIG. 28, the block class indices C are allocated to 4×4-size blocks that are shaded. In this case, an operation range in which the one-dimensional Laplacian sum is calculated may be larger than the size of the block classification unit. Here, a thin solid-line rectangle represents a reconstructed sample position, and a thick solid-line rectangle represents an operation range in which the one-dimensional Laplacian sum is calculated. The specific sample position may refer to every sample position within a block classification unit.

As illustrated in FIG. 29, when block classification is performed on a per 4×4-size block basis, at least one of the sums $g_v$, $g_h$, $g_{d1}$, and $g_{d2}$ of the gradient values is calculated at one or more specific sample positions. Here, V, H, D1, and D2 represent the results of the sample-based one-dimensional Laplacian operations for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In FIG. 29, the block class indices C are allocated to 4×4-size blocks that are shaded. In this case, an operation range in which the one-dimensional Laplacian sum is calculated may be larger than the size of the block classification unit. Here, a thin solid-line rectangle represents a reconstructed sample position, and a thick solid-line rectangle represents an operation range in which the one-dimensional Laplacian sum is calculated. The specific sample position may refer to every sample position within a block classification unit.

Figure 30:
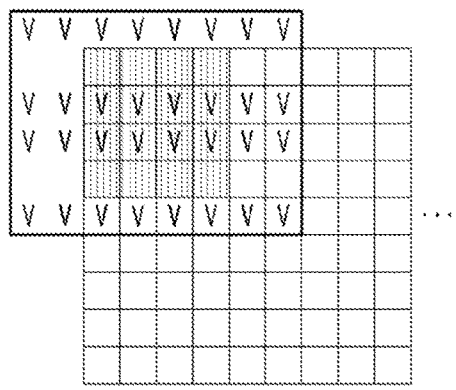
Figure 30:
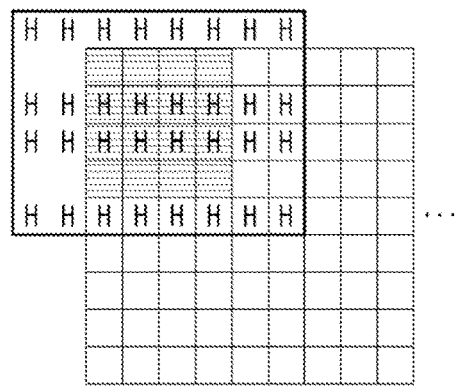
Figure 30:
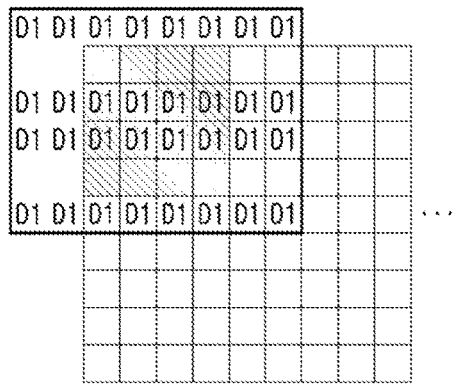
Figure 30:
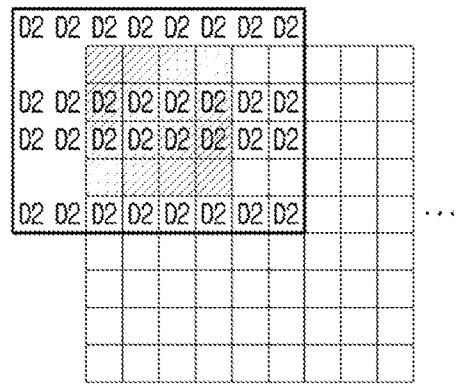

As illustrated in FIG. 30, when block classification is performed on a per 4×4-size block basis, at least one of the sums $g_v$, $g_h$, $g_{d1}$, and $g_{d2}$ of the gradient values is calculated at one or more specific sample positions. Here, V, H, D1, and D2 represent the results of the sample-based one-dimensional Laplacian operations for the vertical direction, the horizontal direction, the first diagonal direction, and the second diagonal direction, respectively. That is, one-dimensional Laplacian operations are performed along the vertical direction, the horizontal direction, the first diagonal direction, and the second diagonal direction at positions V, H, D1, and D2, respectively. In addition, positions at which one-dimensional Laplacian operations are performed may be sub-sampled positions. In FIG. 30, the block class indices C are allocated to 4×4-size blocks that are shaded. In this case, an operation range in which the one-dimensional Laplacian sum is calculated may be larger than the size of the block classification unit. Here, a thin solid-line rectangle represents a reconstructed sample position, and a thick solid-line rectangle represents an operation range in which the one-dimensional Laplacian sum is calculated.

According to an embodiment of the present invention, at least one of the methods of calculating a gradient value may be performed on the basis of a temporal layer identifier.

For example, when block classification is performed on a per 2×2-size block basis, Equations 2 to 5 can be collectively expressed by one equation as shown in Equation 14.

$$G_{2\times 2}^{dir} = \sum_{(i,j)} |g^{dir}(i,j)| \quad \text{[Equation 14]}$$

In Equation 14, dir represents a horizontal direction, a vertical direction, a first diagonal direction, and a second diagonal direction, and $g_{dir}$ represents each of the sum of the gradient values along the vertical direction, the horizontal direction, the first diagonal direction, and the second diagonal direction. In addition, i and j mean a horizontal position and a vertical position in a 2×2-size block, respectively, and $G_{dir}$ represents each of the results of the one-direction Laplacian operations along the vertical direction, the horizontal direction, the first diagonal direction, and the second diagonal direction.

In this case, when the temporal layer identifier of the current picture (or reconstructed picture) indicates the top layer, Equation 14 can be expressed as Equation 15 in the case where block classification is performed on a per 2×2-size block basis within the current picture (or reconstructed picture).

$$G_{2\times 2}^{dir} = |g^{dir}(i_0, j_0)| \quad \text{[Equation 15]}$$

In Equation 15, $G_{dir}(i_0, j_0)$ denotes a gradient value at the upper left position within a 2×2-size block along the vertical direction, the horizontal direction, the first diagonal direction, and the second diagonal direction.

Figure 31:
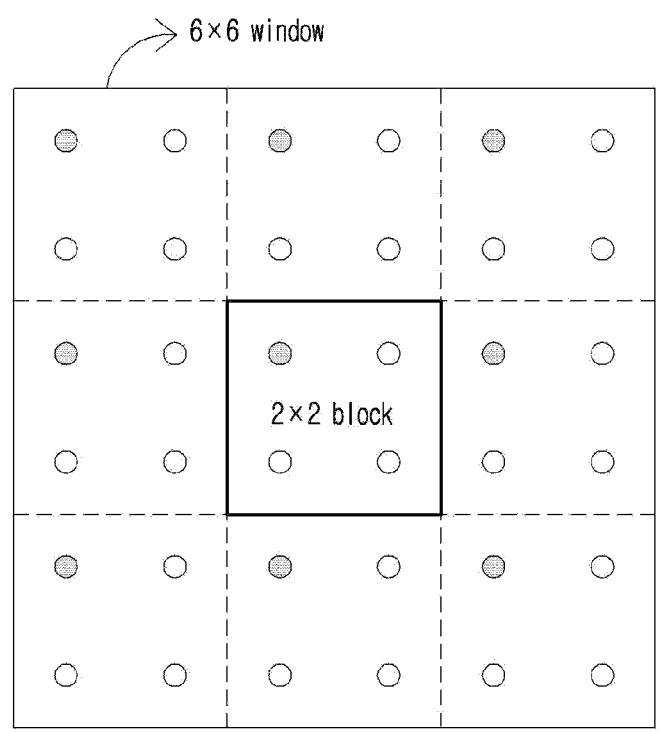
FIG. 31 is a diagram illustrating an exemplary method of determining gradient values for horizontal, vertical, first diagonal, and second diagonal directions when a temporal layer identifier indicates a top layer.

FIG. 31 is a diagram illustrating an exemplary method of determining gradient values along horizontal, vertical, first diagonal, and second diagonal directions for a case where a temporal layer identifier indicates a top layer;

Referring to FIG. 31, calculation of the sums $g_v$, $g_h$, $g_{d1}$, and $g_{d2}$ of the gradient values along the vertical direction, the horizontal direction, the first diagonal direction, and the second diagonal direction can be simplified by calculating the gradient only at the upper left sample position (i.e., the shaded sample position) within each 2×2-size block.

According to an embodiment of the present invention, a statistic value of gradient values is calculated by calculating the weighted sum while applying weights to the results of the one-dimensional Laplacian operation performed on one or more samples within a range in which the one-dimensional Laplacian operation sample is calculated. In this case, at least one of the weighted average value, the median value, the minimum value, the maximum value, and the mode value may be used instead of the weighted sum.

Applying weights or calculating the weighted sum may be determined on the basis of various conditions or coding parameters associated with the current block and with neighboring blocks.

For example, the weighted sum may be calculated in units of at least one of a sample, a sample group, a line, and a block. In this case, the weighted sum can be calculated by varying weights in units of at least one of a sample, a sample group, a line, and a block.

For example, the weights may vary according to at least one of the size of the current block, the shape of the current block, and the position of the sample.

For example, the weighted sum may be calculated according to a condition that is preset in an encoder and a decoder.

For example, weights are adaptively determined on the basis of at least one of coding parameters such as a block size, a block shape, and an intra prediction mode of at least one of the current block and the neighboring blocks.

For example, whether to calculate the weighted sum is adaptively determined on the basis of at least one of coding parameters such as a block size, a block shape, and an intra prediction mode of at least one of the current block and the neighboring blocks.

For example, when an operation range in which the sum of one-dimensional Laplacian operations is calculated is larger than the size of a block classification unit, at least one weight of the weights applied to samples within the block classification unit may be larger than at least one weight of the weights applies to samples outside the block classification unit.

Alternatively, for example, when an operation range in which the sum of one-dimensional Laplacian operations is calculated is equal to the size of the block classification unit, the weights applied to the samples within the block classification unit are all the same.

The weights and/or information of whether the weighted sum calculation is performed may be entropy-encoded in the encoder and then signaled to the decoder.

According to an embodiment of the present invention, at the time of calculating each of the sums $g_v$, $g_h$, $g_{d1}$, and $g_{d2}$ of the gradient values along the vertical direction, the horizontal direction, the first diagonal direction, and the second diagonal direction, when there is one or more unavailable samples around the current sample, padding is performed on the unavailable sample and the gradient value can be calculated using the padded sample. The padding refers to a method of copying the sample value of an adjacent available sample to the unavailable sample. Alternatively, sample values or statistical values that are obtained on the basis of the available sample values adjacent to the unavailable samples may be used. The padding may be repeatedly performed for P columns and R rows. Here, M and L are each positive integers.

Here, the unavailable sample refers to a sample disposed outside the boundary of a CTU, a CTB, a slice, a tile, a tile group, or a picture. Alternatively, the unavailable sample may refer to a sample belonging to at least one of a CTU, a CTB, a slice, a tile, a tile group, and a picture that is different from at least one of a CTU, a CTB, a slice, a tile, a tile group, and a picture to which the current sample belongs.

According to an embodiment of the present invention, at the time of calculating at least of the sums $g_v$, $g_h$, $g_{d1}$, and $g_{d2}$ of the gradient values along the vertical direction, the horizontal direction, the first diagonal direction, and the second diagonal direction, respectively.

For example, at the time of calculating at least one of the sums $g_v$, $g_h$, $g_{d1}$, and $g_{d2}$ of the gradient values along the vertical direction, the horizontal direction, the first diagonal direction, and the second diagonal direction, the padded samples may not be used.

Alternatively, for example, at the time of calculating each of the sums $g_v$, $g_h$, $g_{d1}$, and $g_{d2}$ of the gradient values along the vertical direction, the horizontal direction, the first diagonal direction, and the second diagonal direction, when there is one or more unavailable samples around the current sample, the unavailable samples may not be used for calculation of the gradient values.

Further alternatively, for example, at the time of calculating at least one of the sums $g_v$, $g_h$, $g_{d1}$, and $g_{d2}$ of the gradient values along the vertical direction, the horizontal direction, the first diagonal direction, and the second diagonal direction, when a sample around the current sample is located outside a CTU or CTB, the neighboring samples adjacent to the current sample may not be used.

According to an embodiment of the present invention, at the time of calculating at least one of one-dimensional Laplacian operation values, when there is one or more unavailable samples around the current sample, padding is performed such that sample values of available samples adjacent to the unavailable samples are copied to the unavailable samples, and the one-dimensional Laplacian operation is performed using the padded samples.

According to an embodiment of the present invention, in one-dimensional Laplacian calculation, a predetermined sample may not be used.

For example, in the one-dimensional Laplacian calculation, the padded samples may not be used.

Alternatively, for example, at the time of calculating at least one of the one-dimensional Laplacian operation values, when there is one or more unavailable samples around the current sample, the one or more unavailable samples may not be used for the one-dimensional Laplacian operation.

Further alternatively, for example, at the time of calculating at least one of the one-dimensional Laplacian operation values, when a sample around the current sample is located outside a CTU or CTB, the neighboring sample may not be used for the one-dimensional Laplacian operation.

According to an embodiment of the present invention, at the time of calculating each of the sums $g_v$, $g_h$, $g_{d1}$, and $g_{d2}$ of the gradient values along the vertical direction, the horizontal direction, the first diagonal direction, and the second diagonal direction, or at the time of calculating at least one of the one-dimensional Laplacian operation values, at least one of the samples that have undergone at least one of deblocking filtering, adaptive sample offset (SAO), and adaptive in-loop filtering may be used.

According to an embodiment of the present invention, at the time of calculating at least one of the sums $g_v$, $g_h$, $g_{d1}$, and $g_{d2}$ of the gradient values along the vertical direction, the horizontal direction, the first diagonal direction, and the second diagonal direction, or at the time of calculating at least one of the one-dimensional Laplacian operation values, when a sample around the current block is disposed outside a CTU or CTB, at least one of the deblocking filtering, the adaptive sample offset (SAO), and the adaptive in-loop filtering may be applied to the corresponding sample.

Alternatively, at the time of calculating at least one of the sums $g_v$, $g_h$, $g_{d1}$, and $g_{d2}$ of the gradient values along the vertical direction, the horizontal direction, the first diagonal direction, and the second diagonal direction, or at the time of calculating at least one of the one-dimensional Laplacian operation values, when a sample around the current block is disposed outside a CTU or CTB, at least one of the deblocking filtering, the adaptive sample offset (SAO), and the adaptive in-loop filtering may not be applied to the corresponding sample.

According to an embodiment of the present invention, when there is an unavailable sample disposed within the operation range for the one-dimensional Laplacian sum and disposed outside a CTU or CTB, the unavailable sample may be used for calculation of the one-dimensional Laplacian operation without applying at least one of the deblocking filtering, the adaptive sample offset, and the adaptive in-loop filtering.

According to an embodiment of the present invention, when there is an unavailable sample within a block classification unit or outside a CTU or CTB, the one-dimensional Laplacian operation may be performed without applying at least one of the deblocking filtering, the adaptive sample offset, and the adaptive in-loop filtering to the unavailable sample.

On the other hand, at the time of calculating a gradient value on the basis of sub-sampling, the one-dimensional Laplacian operation is performed on not all of the samples within the operation range in which the one-dimensional Laplacian operation is calculated but on sub-samples within the operation range. Accordingly, the number of operations such as multiplication, shift operation, addition, and absolute value operation, required for block classification may be reduced. In addition, the memory access bandwidth needed for use of reconstructed samples can also be reduced. Therefore, the complexity of the encoder and the decoder is also reduced. Specifically, performing the one-dimensional Laplacian operation on the sub-sampled samples is advantageous in terms of hardware complexity of the encoder and the decoder because it is possible to reduce the time required for the block classification.

In addition, when the operation range in which the sum of one-dimensional Laplacian operations is calculated is equal to or smaller than the size of the block classification unit, the number of additions required for the block classification can be reduced. In addition, the memory access bandwidth needed for use of reconstructed samples can also be reduced. Therefore, the complexity of the encoder and the decoder can also be reduced.

On the other hand, in the subsampling-based gradient value calculation method, at least one of the sums $g_v$, $G_h$, $g_{d1}$, and $g_{d2}$ of the gradient values for the vertical direction, the horizontal direction, the first diagonal direction, and the second diagonal direction is calculated by varying at least one of sample positions, the number of samples, and the direction of sample positions of samples at which the one-dimensional Laplacian operation is performed according to the gradient values for with respect to the vertical, horizontal, first diagonal, and second diagonal directions.

In addition, in the subsampling-based gradient value calculation method, at least one of the sums $g_v$, $G_h$, $g_{d1}$, and $g_{d2}$ of the gradient values for the vertical direction, the horizontal direction, the first diagonal direction, and the second diagonal direction is calculated by using at least one same factor among the sample positions, the number of samples, and the direction of sample positions at which the one-dimensional Laplacian operation is performed, regardless of the gradient values for the vertical, horizontal, first diagonal, and second diagonal directions.

In addition, by using any combination of one or more gradient value calculations described above, it is possible to perform the one-dimensional Laplacian operations for the vertical direction, the horizontal direction, the first diagonal direction, and the second diagonal direction, and it is possible to calculate at least one of the sums $g_v$, $G_h$, $g_{d1}$, and $g_{d2}$ of the gradient values for the vertical direction, the horizontal direction, the first diagonal direction, and the second diagonal direction.

According to an embodiment of the present invention, two or more values of the sums $g_v$, $g_h$, $g_{d1}$, and $g_{d2}$ of the gradient values along the vertical direction, the horizontal direction, the first diagonal direction, and the second diagonal direction are compared with each other.

For example, after calculating the sums of the gradient values, the sum $g_v$ of the gradient values for the vertical direction and the sum $g_h$ of the gradient value for the horizontal direction are compared, and the maximum value and the minimum value of the sum of the gradient values for the vertical direction and the sum of the gradient values for the horizontal direction are derived according to Equation 16.

$$g_{h,v}^{max} \times = \max(g_h, g_v), g_{h,v}^{min} = \min(g_h, g_v),\quad \text{[Equation 16]}$$

In this case, in order to compare the sum $g_v$ of the gradient values for the vertical direction and the sum $g_h$ of the gradient values for the horizontal direction, the values of the sums are compared according to Equation 17.

$$g_{h,v}^{max} = \begin{cases} g_h & \text{if } g_h \geq g_v \\ g_v & \text{if } g_v > g_h \end{cases},\quad \text{[Equation 17]}$$

$$g_{h,v}^{min} = \begin{cases} g_h & \text{if } g_h \leq g_v \\ g_v & \text{if } g_v < g_h \end{cases},$$

Alternatively, for example, the sum $g_{d1}$ of the gradient values for the first diagonal direction and the sum $g_{d2}$ of the gradient values for the second diagonal direction are compared, and the maximum value $g_{d0,d1}^{max}$ and the minimum value $g_{d0,d1}^{min}$ of the sum of the gradient values for the first diagonal direction and the sum of the gradient values for the second diagonal direction are derived according to Equation 18.

$$g_{d0,d1}^{max} = \max(g_{d0}, g_{d1}), g_{d0,d1}^{min} = \min(g_{d0}, g_{d1}),\quad \text{[Equation 18]}$$

In this case, in order to compare the sum $g_{d1}$ of the gradient values for the first diagonal direction and the sum $g_{d2}$ of the gradient values for the second diagonal direction, the values of the sums are compared according to Equation 19.

$$g_{d0,d1}^{max} = \begin{cases} g_{d0} & \text{if } g_{d0} \geq g_{d1} \\ g_{d1} & \text{if } g_{d1} > g_{d0} \end{cases},\quad \text{[Equation 19]}$$

$$g_{d0,d1}^{min} = \begin{cases} g_{d0} & \text{if } g_{d0} \leq g_{d1} \\ g_{d1} & \text{if } g_{d1} < g_{d0} \end{cases},$$

According to one embodiment of the present invention, in order to calculate the directionality value D, the maximum values and the minimum values are compared with two threshold values $t_1$ and $t_2$ as described below.

The directionality value D is a positive integer or zero. For example, the directionality value D may have a value within a range of from 0 and 4. For example, the directionality value D may have a value within a range of from 0 and 2.

In addition, the directionality value D may be determined according to the characteristics of a region. For example, the directionality value Ds 0 to 4 represent the following: 0 represents a texture region; 1 represents a strong horizontal/vertical directionality; 2 represents a weak horizontal/vertical directionality; 3 represents a strong first/second diagonal directionality; and 4 represents a weal first/second diagonal directionality. The directionality value D is determined by steps described below.

Step 1: when $g_{h,v}^{max} \leq t_1 \cdot g_{h,v}^{min}$ and $g_{d0,d1}^{max} \leq t_1 \cdot g_{d0,d1}^{min}$ are satisfied, the value D is set to 0

Step 2: the process proceeds to step 3 when $g_{h,v}^{max}/g_{h,v}^{min} > g_{d0,d1}^{max}/g_{d0,d1}^{min}$ is satisfied, but proceeds to step 4 when not satisfied.

Step 3: the value D is set to 2 when $g_{h,v}^{max} > t_2 \cdot g_{h,v}^{min}$ is satisfied, but set to 1 when not satisfied.

Step 4: the value D is set to 4 when $g_{d0,d1}^{max} > t_2 \cdot g_{d0,d1}^{min}$, is satisfied, but set to 3 when not satisfied.

Where, the threshold values $t_1$ and $t_2$ are positive integers, and $t_1$ and $t_2$ may have the same value or different values. For example, $t_1$ and $t_2$ are 2 and 9, respectively. In another example, $t_1$ and $t_2$ are both 1. In a further example, $t_1$ and $t_2$ are 1 and 9, respectively.

The activity value A can be expressed as Expression 20 when block classification is performed on a 2×2-size block basis.

$$A = \sum_{k=i-2}^{i+3} \sum_{l=j-2}^{j+3} (V_{k,l} + H_{k,l}).\quad \text{[Equation 20]}$$

For example, k and l are the same range. That is, a horizontal length and a vertical length of the operation range in which the sum of the one-dimensional Laplacian operations is calculated are equal.

Alternatively, for example, k and l are different ranges from each other. That is, the horizontal length and the vertical length of the operation range in which the sum of the one-dimensional Laplacian operations is calculated are different.

Further alternatively, for example, k is a range of from i−2 to i+3 and l is a range of from j−2 to j+3. In this case, the operation range in which the sum of the one-dimensional Laplacian operations is calculated is a 6×6 size.

Further alternatively, for example, k is a range of from i−1 to i+2 and l is a range of from j−1 to j+2. In this case, the operation range in which the sum of the one-dimensional Laplacian operations is calculated is a 4×4 size.

Further alternatively, for example, k is a range of from i to i+1 and l is a range of from j to j+1. In this case, the operation range in which the sum of the one-dimensional Laplacian operations is calculated is a 2×2 size. In this case, the operation range in which the sum of one-dimensional Laplacian operations is calculated may be equal to the size of the block classification unit.

For example, the operation range in which the sum of the results of the one-dimensional Laplacian operations is calculated may have a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

In addition, the activity value A can be expressed as Expression 21 when block classification is performed on a 4×4-size block basis.

$$A = \sum_{k=i-2}^{i+5} \sum_{l=j-2}^{j+5} (V_{k,l} + H_{k,l}). \qquad [\text{Equation 21}]$$

For example, k and l are the same range. That is, a horizontal length and a vertical length of the operation range in which the sum of the one-dimensional Laplacian operations is calculated are equal.

Alternatively, for example, k and l are different ranges from each other. That is, the horizontal length and the vertical length of the operation range in which the sum of the one-dimensional Laplacian operations is calculated are different.

Further alternatively, for example, k is a range of from i−2 to i+5 and l is a range of from j−2 to j+5. In this case, the operation range in which the sum of the one-dimensional Laplacian operations is calculated is an 8×8 size.

Further alternatively, for example, k is a range of from i to i+3 and l is a range of from j to j+3. In this case, the operation range in which the sum of the one-dimensional Laplacian operations is calculated is a 4×4 size. In this case, the operation range in which the sum of one-dimensional Laplacian operations is calculated may be equal to the size of the block classification unit.

For example, the operation range in which the sum of the results of the one-dimensional Laplacian operations is calculated may have a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

In addition, the activity value A can be expressed as Expression 22 when block classification is performed on a 2×2-size block basis. Here, at least one of the one-dimensional Laplacian operation values for the first diagonal direction and the second diagonal direction may be additionally used in calculation of the activity value A.

$$A = \sum_{k=i-2}^{i+3} \sum_{l=j-2}^{j+3} (V_{k,l} + H_{k,l} + D1_{k,l} + D2_{k,l}). \qquad [\text{Equation 22}]$$

For example, k and l are the same range. That is, a horizontal length and a vertical length of the operation range in which the sum of the one-dimensional Laplacian operations is calculated are equal.

Alternatively, for example, k and l are different ranges from each other. That is, the horizontal length and the vertical length of the operation range in which the sum of the one-dimensional Laplacian operations is calculated are different.

Further alternatively, for example, k is a range of from i−2 to i+3 and l is a range of from j−2 to j+3. In this case, the operation range in which the sum of the one-dimensional Laplacian operations is calculated is a 6×6 size.

Further alternatively, for example, k is a range of from i−1 to i+2 and l is a range of from j−1 to j+2. In this case, the operation range in which the sum of the one-dimensional Laplacian operations is calculated is a 4×4 size.

Further alternatively, for example, k is a range of from i to i+1 and l is a range of from j to j+1. In this case, the operation range in which the sum of the one-dimensional Laplacian operations is calculated is a 2×2 size. In this case, the operation range in which the sum of one-dimensional Laplacian operations is calculated may be equal to the size of the block classification unit.

For example, the operation range in which the sum of the results of the one-dimensional Laplacian operations is calculated may have a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

In addition, the activity value A can be expressed as Expression 23 when block classification is performed on a 4×4-size block basis. Here, at least one of the one-dimensional Laplacian operation values for the first diagonal direction and the second diagonal direction may be additionally used in calculation of the activity value A.

$$A = \sum_{k=i-2}^{i+5} \sum_{l=j-2}^{j+5} (V_{k,l} + H_{k,l} + D1_{k,l} + D2_{k,l}). \qquad [\text{Equation 23}]$$

For example, k and l are the same range. That is, a horizontal length and a vertical length of the operation range in which the sum of the one-dimensional Laplacian operations is calculated are equal.

Alternatively, for example, k and l are different ranges from each other. That is, the horizontal length and the vertical length of the operation range in which the sum of the one-dimensional Laplacian operations is calculated are different.

Further alternatively, for example, k is a range of from i−2 to i+5 and l is a range of from j−2 to j+5. In this case, the operation range in which the sum of the one-dimensional Laplacian operations is calculated is an 8×8 size.

Further alternatively, for example, k is a range of from i to i+3 and l is a range of from j to j+3. In this case, the operation range in which the sum of the one-dimensional Laplacian operations is calculated is a 4×4 size. In this case, the operation range in which the sum of one-dimensional Laplacian operations is calculated may be equal to the size of the block classification unit.

For example, the operation range in which the sum of the results of the one-dimensional Laplacian operations is calculated may have a two-dimensional geometric shape selected from among a rhombus, a rectangle, a square, a trapezoid, a diagonal shape, a snowflake shape, a number sign shape, a clover shape, a cross shape, a triangle, a pentagon, a hexagon, a decagon, and a dodecagon.

On the other hand, the activity value A is quantized to produce a quantized activity value $A_q$ that is within a range of from I to J. Here, I and J are each positive integers or zero. For example, I and J are 0 and 4, respectively.

The quantized activity value $A_q$ can be determined using a predetermined method.

For example, the quantized activity value $A_q$ can by Equation 24. In this case, the quantized activity value $A_q$ may be included within the range of from a specific minimum value X and a specific maximum value Y.

$$A_q = (WA) \gg R = \frac{WA}{2^R} \qquad [\text{Equation 24}]$$

In Equation 24, the quantized activity value $A_q$ is calculated by multiplying the activity value A by a specific constant W and performing a right shift operation by R on the product of A and W. In this case, X, Y, W, and R are each positive integers or zero. For example, W is 24, and R is 13. Alternatively, for example, W is 64 and R is 3+N (bits). For example, N is a positive integer and is specifically 8 or 10. In another example, W is 32 and R is 3+N (bits). Alternatively, for example, N is a positive integer and is specifically 8 or 10.

Further alternatively, for example, the quantized activity value $A_q$ is calculated using a look-up table (LUT), and a mapping relationship between the activity value A and the quantized activity value $A_q$ is set. That is, an operation is performed on the activity value A, and the quantized activity value $A_q$ is calculated using the look-up table. In this case, the operation may include at least one of multiplication, division, right shift operation, left shift operation, addition, and subtraction.

On the other hand, in the case of a chrominance component, filtering is performed for each chrominance component with K filters without performing a block classification process. Here, K is a positive integer or zero. For example, K is 1. In addition, in the case of a chrominance component, the block classification may not be performed on the chrominance component and filtering may be performed using a block class index derived from a luminance component at the corresponding position of the chrominance component. In addition, in the case of a chrominance component, filter information for the chrominance component may not be signaled, and a fixed type filter may be used.

FIG. 32 is a diagram illustrating various computation methods that can be used instead of one-dimensional Laplacian operation according to an embodiment of the present invention.

According to an embodiment of the present invention, at least one of the computation methods illustrated in FIG. 32 can be used instead of one-dimensional Laplacian operation. Referring to FIG. 32, the computation methods include two-dimensional (two-dimensional) Laplacian, two-dimensional Sobel, two-dimensional edge extraction, and two-dimensional Laplacian of Gaussian (LoG) operations. Here, the LoG operation means that a combination of a Gaussian filter and a Laplacian filter is applied to a reconstructed sample. Other than these operation methods, at least one of one-dimensional and two-dimensional edge extraction filters may be used in place of the one-dimensional Laplacian operation. Alternatively, a Difference of Gaussian (DoG) operation may be used. Here, the LoG operation means that a combination of Gaussian filters having different internal parameters is applied to a reconstructed sample.

In addition, in order to calculate the directionality value D or the activity value A, an N×M-size LoG operation may be used. Here, M and L are each positive integers. For example, at least one of the 5×5 two-dimensional LoG illustrated in (i) of FIG. 32 and the 9×9 two-dimensional LoG operation illustrated in (j) of FIG. 32 are used. Alternatively, for example, the one-dimensional LoG operation may be used instead of the two-dimensional LoG operation.

According to an embodiment of the present invention, each 2×2-size block of luminance blocks can be classified on the basis of the directionality and two-dimensional Laplacian activity. For example, the horizontal/vertical gradient characteristics can be obtained by using a Sobel filter. The directionality value D can be obtained using Equations 25 to 26.

The representative vector may be calculated such that the condition of Equation 25 is satisfied for the gradient vector within a predetermined window size (e.g., 6×6-size block). Direction and deformation can be identified according to θ.

[Equation 25]
$$\operatorname*{argmax}_{\theta} J(\theta) = \operatorname*{argmax}_{\theta} \sum_i \langle \vec{e(\theta)}, \vec{t_i} \rangle = \operatorname*{argmax}_{\theta} \sum_i |t_i|^2 \cos(\theta - \phi_i)^2$$

The similarity between the representative vector and each gradient vector within the window can be calculated using an inner product as shown in Equation 26.

[Equation 26]
$$S = \sum_i \langle \vec{e(\theta)}, \vec{t_i} \rangle$$

The directionality value D can be determined using the S value calculated by Equation 26.
Step 1: when $S > th_1$ is satisfied, the D value is set to 0.
Step 2: the D value is set to 2 when $\theta \in (D0\ or\ D1)$ and $S < th_2$ are satisfied but set to 1 when not satisfied.
Step 3: the D value is set to 4 when $\theta \in (V\ or\ H)$ and $S < th_2$ are satisfied, but set to 3 when not satisfied.

Here, the number of block class indices may be 25 in total.

According to an embodiment of the present invention, block classification of reconstructed samples s'(i,j) can be expressed by Equation 27.

$$C_k^D = \{(i,j) \in I : D(i,j) = k\} \text{ for } k = 0, \ldots, K-1 \qquad \text{[Equation 27]}$$

In Equation 27, I represents a set of samples positions of all the reconstructed samples s'(i,j). D is a classifier that allocates class indices $k \in \{0, \ldots, K-1\}$ to sample positions (i,j). In addition, $C_k^D$ is a set of all samples to which the class indices are allocated by the classifier D. The class supports four different classifiers, and each classifier can provide K=25 or 27 classes. The classifier used in the decoder can be specified by a syntax element classification_idx signaled at the slice level. The class $C_k^D$ with the class index $k \in \{0, \ldots, K-1\}$ is given, the following steps are performed.

When classification_idx=0, the block classifier $D_G$ based on the directionality and the activity is used. The classifier may provide K=25 classes.

When classification_idx=1, the sample-based feature classifier $D_S$ is used as a classifier. $D_S(i,j)$ uses quantized sample values of each of the samples s'(i,j) according to Equation 28.

[Equation 28]
$$D_S(i,j) = \left\lfloor \frac{K-1}{2^B} \cdot s'(i,j) \right\rfloor$$

Where B is a sample bit depth, the class number K is set to 27 (K=27), an operator $\lfloor \cdot \rfloor$ specifies an operation that rounds off to the nearest integer.

When classification_idx=2, the sample-based feature classifier $D_R^1$ based on ranking may be used as a classifier. $D_R^1$ is represented by Equation 30. $r_8(i,j)$ is a classifier that compares s'(i,j) with adjacent 8 samples and arranges the samples in the order of values.

[Equation 29]
$$r_8(i,j) = \sum_{k=i-1}^{i+1} \sum_{\ell=j-1}^{j+1} (s'(i,j) < s'(k,\ell) ? 1 : 0).$$

Classifier $r_8(i,j)$ has a value in a range of from 0 to 8. When a sample $s'(i,j)$ is the largest sample within a 3×3-size block centered on $(i,j)$, the $s'(i,j)$ has a value of zero. When $s'(i,j)$ is the second largest sample, the $r_8(i,j)$ has a value of 1.

$$D_R^1(i,j) = \begin{cases} r_8(i,j), & s'(i,j) \le T_1 \\ r_8(i,j)+9, & T_1 < s'(i,j) \le T_2 \\ r_8(i,j)+18, & s'(i,j) > T_2 \end{cases} \quad \text{[Equation 30]}$$

In Equation 30, $T_1$ and $T_2$ are predefined thresholds. That is, a sample dynamic range is divided into three bands, and the rank of local samples in each band is used as additional criteria. The rank-based, sample-based feature classifier provides 27 classes (K=27).

When classification_idx=3, a classifier $D_R^2$ based on ranking and regional variation is used. $D_R^2$ can be represented by Equation 31.

$$D_R^2(i,j) = \begin{cases} r_8(i,j), & |v(i,j)| \le T_3 \\ r_8(i,j)+9, & T_3 < |v(i,j)| \le T_4 \\ r_8(i,j)+18, & |v(i,j)| > T_4 \end{cases} \quad \text{[Equation 31]}$$

In Equation 31, $T_3$ or $T_4$ is a predefined threshold value. The local variation $v(i,j)$ at each sample position $(i,j)$ can be represented by Equation 32.

$$v(i,j) = 4*s'(i,j) - (s'(i-1,j) + s'(i+1,j) + s'(i,j+1) + s'(i,j-1)) \quad \text{[Equation 32]}$$

It is the same classifier as R except that each sample is first classified as one of three classes on the basis of a local variable $|v(i,j)|$. Next, within each class, the rank of local samples in the vicinity can be used as an additional criterion to provide 27 classes.

According to an embodiment of the present invention, at the slice level, a filter set including a maximum number of 16 filters using three pixel classification methods such as an intensity classifier, a histogram classifier, and a directional activity classifier are used for the current slice. At the CTU level, three modes including new filter mode, spatial filter mode, and slice filter mode are used on a per CTU basis, on the basis of a control flag in a slice header that is signaled.

Here, the intensity classifier is similar to the band offset of SAO. The sample intensity range is divided into 32 groups, and group indices for each sample are determined on the basis of the intensity of a sample to be processed.

In addition, in the case of the similarity classifier, neighboring samples in a 5×5 rhombic filter are compared with a filtering target sample that is a sample to be filtered. The group index of the sample to be filtered may be initialized to 0. When the difference between the neighboring sample and the filtering target sample is greater than a predefined threshold value, the group index is increased by one. In addition, when the difference between the neighboring sample and the filtering target sample is two times greater than the predefined threshold value, an additional one is added as the group index. In this case, the similarity classifier has 25 groups.

In addition, in the case of the Rot BA Classifier, the operation range in which the sum of one-dimensional Laplacian operations for one 2×2 block is calculated is reduced from a 6×6 size to a 4×4 size. This classifier has a maximum number of 25 groups. There may be a maximum number of 25 or 32 groups in multiple classifiers. However, the number of filters in a slice filter set is limited to a maximum number of 16 groups. That is, the encoder merges consecutive groups such that the number of merged groups is maintained to be 16 or less.

According to an embodiment of the present invention, when determining a block class index, the block class index is determined on the basis of at least one coding parameter of coding parameters of the current block and the neighboring block. The block class index varies according to at least one of the coding parameters. In this case, the coding parameters includes at least one of a prediction mode (i.e., whether the prediction is an intra prediction or an inter prediction), an inter prediction mode, an intra prediction mode, an intra prediction indicator, a motion vector, a reference picture index, a quantization parameter, a block size of a current block, a block shape of a current block, the size of a block classification unit, and a coding block flag/pattern.

In one example, the block classification is determined according to a quantization parameter. For example, when the quantization parameter is less than a threshold value of T, J block class indices are used. When the quantization parameter is greater than a threshold value of R, H block class indices are used. For the other cases, G block class indices are used. Here, T, R, J, H, and G are positive integers or zero. In addition, J is greater than or equal to H. Here, the larger the quantization parameter value, the smaller number of block class indices used.

In another example, the number of the block classes is determined according to the size of a current block. For example, when the size of the current block is less than a threshold value of T, J block class indices are used. When the size of the current block is greater than a threshold value of R, H block class indices are used. For the other cases, G block class indices are used. Here, T, R, J, H, and G are positive integers or zero. In addition, J is greater than or equal to H. Here, the larger the block size, the smaller number of block class indices used.

In a further example, the number of the block classes is determined according to the size of a block classification unit. For example, when the size of the block classification unit is less than a threshold value of T, J block class indices are used. When the size of the block classification unit is greater than a threshold value of R, H block class indices are used. For the other cases, G block class indices are used. Here, T, R, J, H, and G are positive integers or zero. In addition, J is greater than or equal to H. Here, the larger the size of the block classification unit, the smaller number of block class indices used.

According to an embodiment of the present invention, at least one of the sum of the gradient values of the co-location within a previous picture, the sum of the gradient values of the neighboring blocks around the current block, and the sum of the gradient values of the neighboring block classification units around the current block classification unit is determined as at least one of the sum of the gradient values of the current block and the sum of gradient values of the current block classification unit. Here, the co-located sample within the previous picture is a spatial position of a reconstructed sample in a current picture within the previous picture or a neighboring position.

For example, a difference between at least one of the sums $g_v$ and $g_h$ of the gradient values for the vertical direction and the horizontal direction of the current block unit and at least one of the sums of the gradient values for the vertical direction and the horizontal direction of the neighboring block classification units around the current block classification unit is equal to or less than a threshold value of E, at least one of the sums $g_{d1}$ and $g_{d2}$ of the gradient values for the first diagonal direction and the second diagonal direction of the neighboring block classification units of the current block classification unit is determined as at least one of the gradient values of the current block unit. Here, the threshold value of E is a positive integer or zero.

In another example, a difference between the sum of the sums $g_v$ and $g_h$ of the gradient values for the vertical direction and the horizontal direction of the current block unit and the sum of the sums of the gradient values for the vertical direction and the horizontal direction of the neighboring block classification unit around the current block classification unit is equal to or less than a threshold value of E, at least one of the sums of the gradient values of the neighboring block classification units of the current block classification unit is determined as at least one of the sums of the gradient values of the current block unit. Here, the threshold value of E is a positive integer or zero.

In a further example, when the difference between at least one statistical value of the reconstructed samples within the current block unit and at least one statistical value of the reconstructed samples within the neighboring block classification unit around the current block classification unit is equal to or less than the threshold value of E, at least one of the sums of the gradient values of the neighboring block classification units around the current block unit is determined as at least one of the sums of the gradient values of the current block unit. Here, the threshold value E is a positive integer or zero. The threshold value of E is derived from the spatial neighboring block and/or the temporal neighboring block of the current block. In addition, the threshold value of E is a value predefined in the encoder and decoder.

According to an embodiment of the present invention, at least one of the block class index of the co-located sample within of the previous picture, the block class indices of the neighboring blocks of the current block, and the block class indices of the neighboring block classification units of the current block classification unit is determined as at least one of the block class index of the current block and the block class index of the current block classification unit.

For example, a difference between at least one of the sums $g_v$ and $g_h$ of the gradient values for the vertical direction and the horizontal direction of the current block unit and at least one of the sums of the gradient values for the vertical direction and the horizontal direction of the neighboring block classification units around the current block classification unit is equal to or less than the threshold value of E, the block class index of the neighboring block classification units around the current block classification unit is determined as the block class index of the current block unit. Here, the threshold value E is a positive integer or zero.

Alternatively, for example, a difference between the sum of the sums $g_v$ and $g_h$ of the gradient values for the vertical direction and the horizontal direction of the current block unit and the sum of the sums of the gradient values for the vertical direction and the horizontal direction of the neighboring block classification unit around the current block classification unit is equal to or less than the threshold value of E, the block class index of the neighboring block classification unit around the current block classification unit is determined as the block classification unit of the current block unit. Here, the threshold value E is a positive integer or zero.

Further alternatively, for example, when the difference between at least one statistical value of the reconstructed samples within the current block unit and at least one statistical value of the reconstructed samples within the neighboring block classification unit around the current block classification unit is equal to or less than the threshold value of E, the block class index of the neighboring block classification unit around the current block unit is determined as the block class index of the current block unit. Here, the threshold value of E is a positive integer or zero.

Further alternatively, for example, the block class indices may be determined using at least one of the combinations of the block class index determination methods described above.

Hereinafter, the filtering execution sub-step will be described.

According to an exemplary embodiment of the present invention, a filter corresponding to the determined block class index is used to perform filtering on samples or blocks in a reconstructed/decoded picture. When performing the filtering, one of L filters is selected. The L is a positive integer or zero.

For example, one of the L filters is selected on a per block classification unit basis, and the filtering is performed on a reconstructed/decoded picture on a per reconstructed/decoded sample basis.

Alternatively, for example, one of the L filters is selected on a per block classification unit basis and the filtering is performed on a reconstructed/decoded picture on a per block classification unit basis.

Further alternatively, for example, one of the L filters is selected on a per block classification unit basis and the filtering is performed on a reconstructed/decoded picture on a per CU basis.

Further alternatively, for example, one of the L filters is selected on a per block classification unit basis and the filtering is performed on a reconstructed/decoded picture on a per block basis.

Further alternatively, for example, U filters of the L filters are selected on a per block classification unit basis and the filtering is performed on are constructed/decoded picture on a per reconstructed/decoded sample basis. Here, U is a positive integer.

Further alternatively, for example, U filters of the L filters are selected on a per block classification unit basis and the filtering is performed on a reconstructed/decoded picture on a per block classification unit basis. Here, U is a positive integer.

Further alternatively, for example, U filters of the L filters are selected on a per block classification unit basis and the filtering is performed on a reconstructed/decoded picture on a per CU basis. Here, U is a positive integer.

Further alternatively, for example, U filters of the L filters are selected on a per block classification unit basis and the filtering is performed on a reconstructed/decoded picture on a per block basis. Here, U is a positive integer.

Here, the L filters are referred to as a filter set.

According to an embodiment of the present invention, the L filters differ from each other in terms of at least one of a filter coefficient, the number of filter taps (i.e., a filter length), a filter shape, and a filter type.

For example, the L filters are common in terms of at least one of a filter coefficient, the number of filter taps (filter length), a filter coefficient, a filter shape, and a filter type in units of a block, a CU, a PU, a TU, a CTU, a slice, a tile, a tile group, a picture, and a sequence.

Alternatively, for example, the L filters are common in terms of at least one of a filter coefficient, the number of filter taps (a filter length), a filter shape, and a filter type in units of a CU, a PU, a TU, a CTU, a slice, a tile, a tile group, a picture, and a sequence.

The filtering may be performed using the same filter or different filters in units of a CU, a PU, a TU, a CTU, a slice, a tile, a tile group, a picture, and a sequence.

The filtering may be performed or may not be performed on the basis of filtering execution information of whether filtering is executed or not in units of a sample, a block, a CU, a PU, a TU, a CTU, a slice, a tile, a tile group, a picture, and a sequence. The filter execution information of whether to perform the filtering is information signaled from the encoder to the decoder in units of a sample, a block, a CU, a PU, a TU, a CTU, a slice, a tile, a tile group, a picture, and a sequence.

According to an embodiment of the present invention, N filters that differ in the number of filter taps and have the same filter shape (i.e., a diamond or rhombic filter shape) are used. Here, M is a positive integer. For example, the rhombic filters having 5×5, 7×7, or 9×9 filter taps are shown in FIG. 33.

Figure 33:
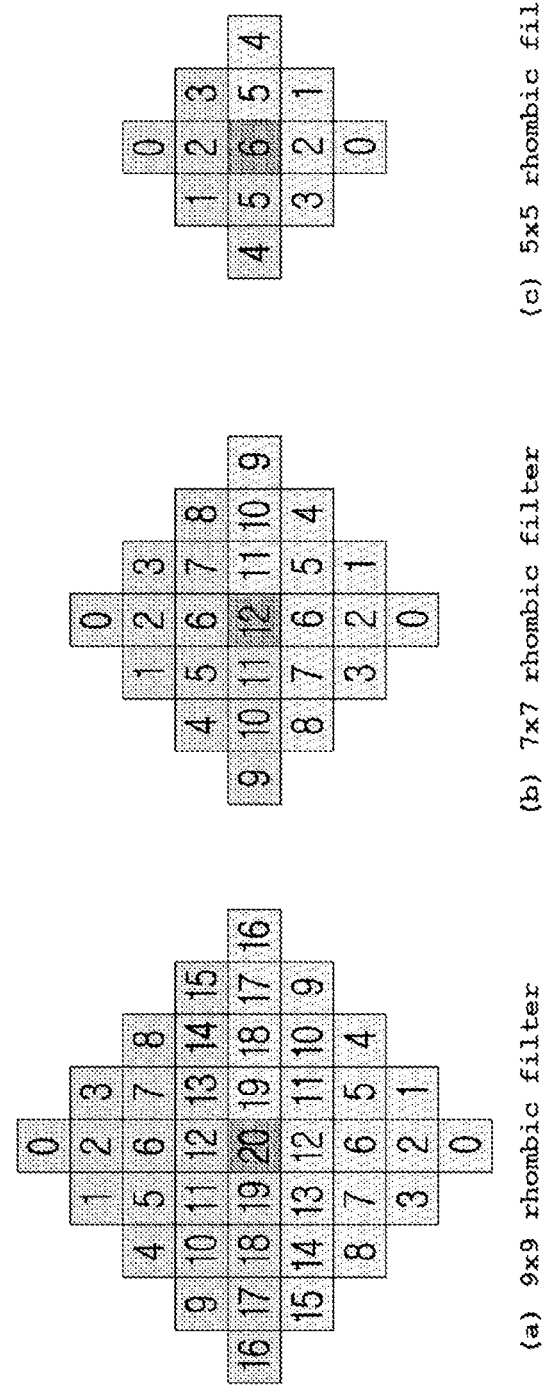
FIG. 33 is a diagram illustrating a rhombic filter according to an embodiment of the present invention.

FIG. 33 is a diagram illustrating rhombic filters according to an embodiment of the present invention.

Referring to FIG. 33, in order to signal information on which filter among the three rhombic filters having the number of filter taps of 5×5, 7×7, or 9×9 from the encoder to the decoder, the filter index is entropy-encoded/decoder on a per picture/tile/tile group/slice/sequence basis. That is, the filter index is entropy-encoded/decoded in a sequence parameter set, a picture parameter set, a slice header, a slice data, a tile header, a tile group header, header, and the like in a bitstream.

According to an embodiment of the present invention, when the number of filter taps is fixed to 1 in the encoder/decoder, the encoder/decoder performs filtering using the filter index without entropy-encoding/decoding the filter index. Here, a rhombic filter having 7×7 filter taps is used for a luminance component and a rhombic filter having 5×5 filter taps is used for a chrominance component.

According to an embodiment of the present invention, at least one of the three rhombic filters is used to filter at least one reconstructed/decoded sample of at least one of a luminance component and a chrominance component.

For example, at least one of the three rhombus type filters illustrated in FIG. 33 is used to filter a reconstructed/decoded luminance sample.

Alternatively, for example, a 5×5 rhombus-shaped filter illustrated in FIG. 33 is used to filter reconstructed/decoded chrominance samples.

Further alternatively, for example, a filter used to filter a luminance sample is used to filter a reconstructed/decoded chrominance sample corresponding to the luminance sample.

Meanwhile, the numbers in each filter shape illustrated in FIG. 33 represent filter coefficient indices, and the filter coefficient indices are symmetric with respect to the filter center. That is, the filters illustrated in FIG. 33 are point symmetric filters.

On the other hand, a total of 21 filter coefficients are entropy-encoded/decoded in the case of a 9×9 rhombic filter illustrated in (a) of FIG. 33, a total of 13 filter coefficients are entropy-encoded/decoded in the case of a 7×7 rhombic filter illustrated in (b) of FIG. 33, and a total of seven filter coefficients are entropy-encoded/decoded in the case of a 5×5 rhombic filter illustrated in (c) of FIG. 33. That is, a maximum number of 21 filter coefficients need to be entropy-encoded/decoded.

In addition, a total of 21 multiplications per sample are needed for a 9×9 rhombic filter illustrated in (a) of FIG. 33, a total of 13 multiplications per sample are needed for a 7×7 rhombic filter as illustrated in (b) of FIG. 33, a total of 7 multiplications per sample are needed for a 5×5 for a rhombic filter illustrated in (c) of FIG. 33. That is, filtering is performed using a maximum number of 21 multiplications per sample.

In addition, as shown in (a) of FIG. 33, since a 9×9 rhombic filter has a size of 9×9, a hardware implementation requires four line buffers that are half the vertical filter length. That is, a maximum of four line buffers are required.

According to an embodiment of the present invention, the filters have the same filter length which means 5×5 filter taps but may have different filter shapes selected from among a rhombus, a rectangle, a square, a trapezoid, a diagonal shape, a snowflake shape, a number sign shape, a clover shape, a cross shape, a triangle, a pentagon, a hexagon, an octagon, a decagon, and a dodecagon. For example, square-shaped, octagon-shaped, snowflake-shaped, rhombic filters having 5×5 filter taps are illustrated in FIG. 34.

The number of filter taps is not limited to 5×5. A filter having H×V filter taps selected from among 3×3, 4×4, 5×5, 6×6, 7×7, 8×8, 9×9, 5×3, 7×3, 9×3, 7×5, 9×5, 9×7, and 11×7 may be used. Here, H and V are positive integers and have the same value or different values. In addition, at least one of H and V is a value predefined in the encoder/decoder and a value signaled to the decoder from the encoder. In addition, one of H and V is defined using the other one of H and V. In addition, the final value of H or V can be defined using the values of H and V.

Figure 34:
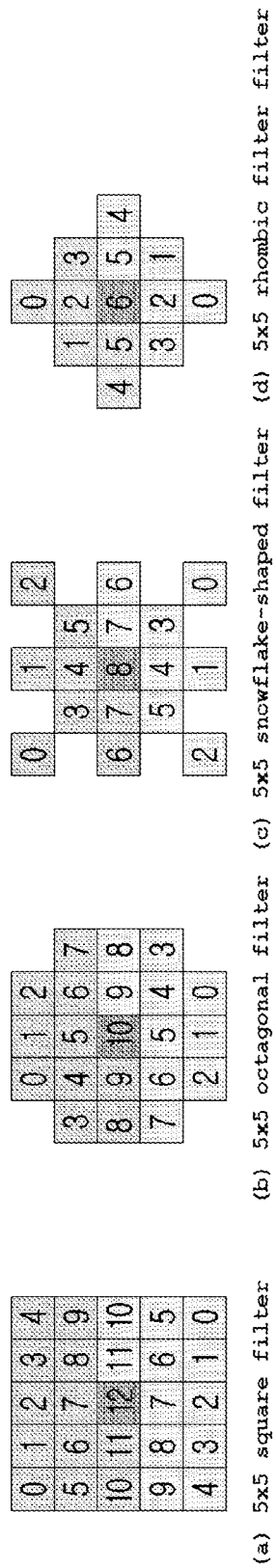
FIG. 34 is a diagram illustrating a 5×5-tap filter according to an embodiment of the present invention.

On the other hand, in order to signal information of which filter is to be used among the filters illustrated in FIG. 34 to the decoder from the encoder, the filter index may be entropy-encoded/decoded on a per picture/tile/tile group/slice/sequence basis. That is, a filter index is entropy-encoded/decoded into a sequence parameter set, a picture parameter set, a slice header, a slice data, a tile header, and a tile group header within a bitstream.

On the other hand, at least one of the filters among square-shaped, octagon-shaped, snowflake-shaped, rhombic filters illustrated in FIG. 34 is used to filter at least one reconstructed/decoded sample of at least one of a luminance component and a chrominance component.

On the other hand, the numbers in each filter shape illustrated in FIG. 34 represent filter coefficient indices, and the filter coefficient indices are symmetric with respect to the filter center. That is, the filters illustrated in FIG. 34 are point symmetric filters.

According to an embodiment of the present invention, when a reconstructed picture is filtered on a per sample basis, it is possible to determine which filter shape to use for each picture, slice, tile, or tile group in terms of rate-distortion optimization in the encoder. In addition, filtering is performed using the determined filter shape. It is necessary to determine an optimal filter shape for each picture, slice, tile, or tile group because the degree of improvement in coding efficiency and the amount of filter information (number of filter coefficients) vary according to the filter shape as illustrated in FIG. 34. That is, an optimal filter shape among the filter shapes illustrated in FIG. 34 is determined differently according to a video resolution, video characteristics, a bit rate, etc.

According to an embodiment of the present invention, the use of the filters as illustrated in FIG. 34 has an advantage of reducing the computation complexity of the encoder/decoder over the use of the filters as illustrated in FIG. 33.

For example, a total of 13 filter coefficients are entropy-encoded/decoded in the case of a 5×5 square filter illustrated in HG. (a) of 34, a total of 11 filter coefficients are entropy-encoded/decoded in the case of a 5×5 octagonal filter illustrated in (b) of FIG. 34, a total of 9 filter coefficients are entropy-encoded/decoded in the case of a 5×5 snowflake-shaped filter illustrated in (c) of FIG. 34, and a total of 7 filter coefficients are entropy-encoded/decoded in the case of a 5×5 rhombic filter illustrated in HG. (c) of 34. That is, the number of filter coefficients to be entropy-encoded/decoded varies according to the filter shape. Here, the maximum number (i.e., 13) of the filter coefficients of the filters in the example of FIG. 34 is less than the maximum number (i.e., 21) of the filter coefficients of the filters in the example of HG 33. Therefore, when the filters in the example of FIG. 34 are used, the number of filter coefficients to be entropy-encoded/decoded is reduced. Therefore, in this case, the computational complexity of the encoder/decoder can be reduced.

Alternatively, for example, a total of 13 multiplications per sample are needed for a 5×5 square filter illustrated in FIG. 34(a), a total of 11 multiplications per sample are needed for a 5×5 octagonal filter as illustrated in (b) of FIG. 34, a total of 9 multiplications per sample are needed for a 5×5 snowflake-shaped filter illustrated in (c) of FIG. 34, and a total of 7 multiplications per sample are needed for a 5×5 rhombic filter illustrated in (d) of FIG. 34. The maximum number (i.e., 13) of the filter coefficients of the filters in the example of FIG. 34 is less than the maximum number (i.e., 21) of the filter coefficients of the filters in the example of FIG. 33. Therefore, when the filters in the example of FIG. 34 are used, the number of multiplications per sample is reduced. Therefore, in this case, the computational complexity of the encoder/decoder can be reduced.

Further alternatively, for example, since all of the filters in the examples of FIG. 34 have a 5×5 size, a hardware implementation requires two line buffers which are half the vertical filter length. Here, the number of line buffers (i.e., two line buffers) needed to use the filters as in the examples of FIG. 34 is smaller than the number of line buffers (i.e., four line buffers) needed to use the filters as in the examples of FIG. 33. Therefore, when the filters in the examples of FIG. 34 are used, the size of the line buffer, the hardware complexity of the encoder/decoder, the memory capacity requirement, and the memory access bandwidth can be reduced.

According to an embodiment of the present invention, as filters used in the filtering process described above, filters having at least one shape selected from among a rhombus, a rectangle, a square, a trapezoid, a diagonal shape, a snowflake shape, a number sign shape, a clover shape, a cross shape, a triangle, a pentagon, a hexagon, an octagon, a decagon, and a dodecagon are used. For example, as illustrated in FIGS. 35A and/or 35B, the filter may have a shape selected from among a square, an octagon, a snowflake shape, a rhombus, a hexagon, a rectangle, a cross shape, a number sign shape, a clover shape, and a diagonal.

Figure 35A:
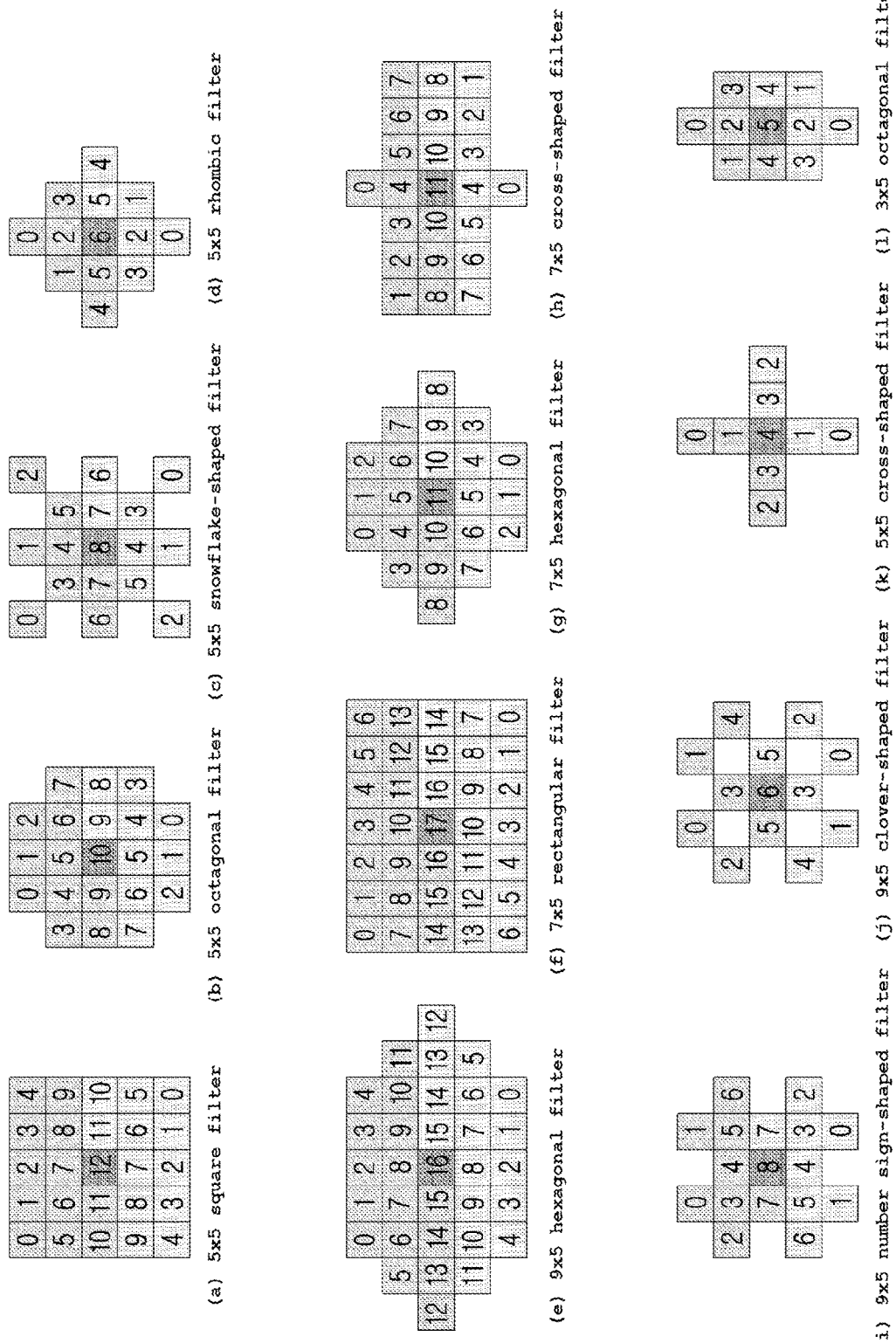

For example, a filter set is constructed using at least one of the filters having a vertical length of 5 among the filters shown in FIGS. 35A and/or 35B, and then filtering is performed using the filter set.

Figure 35B:
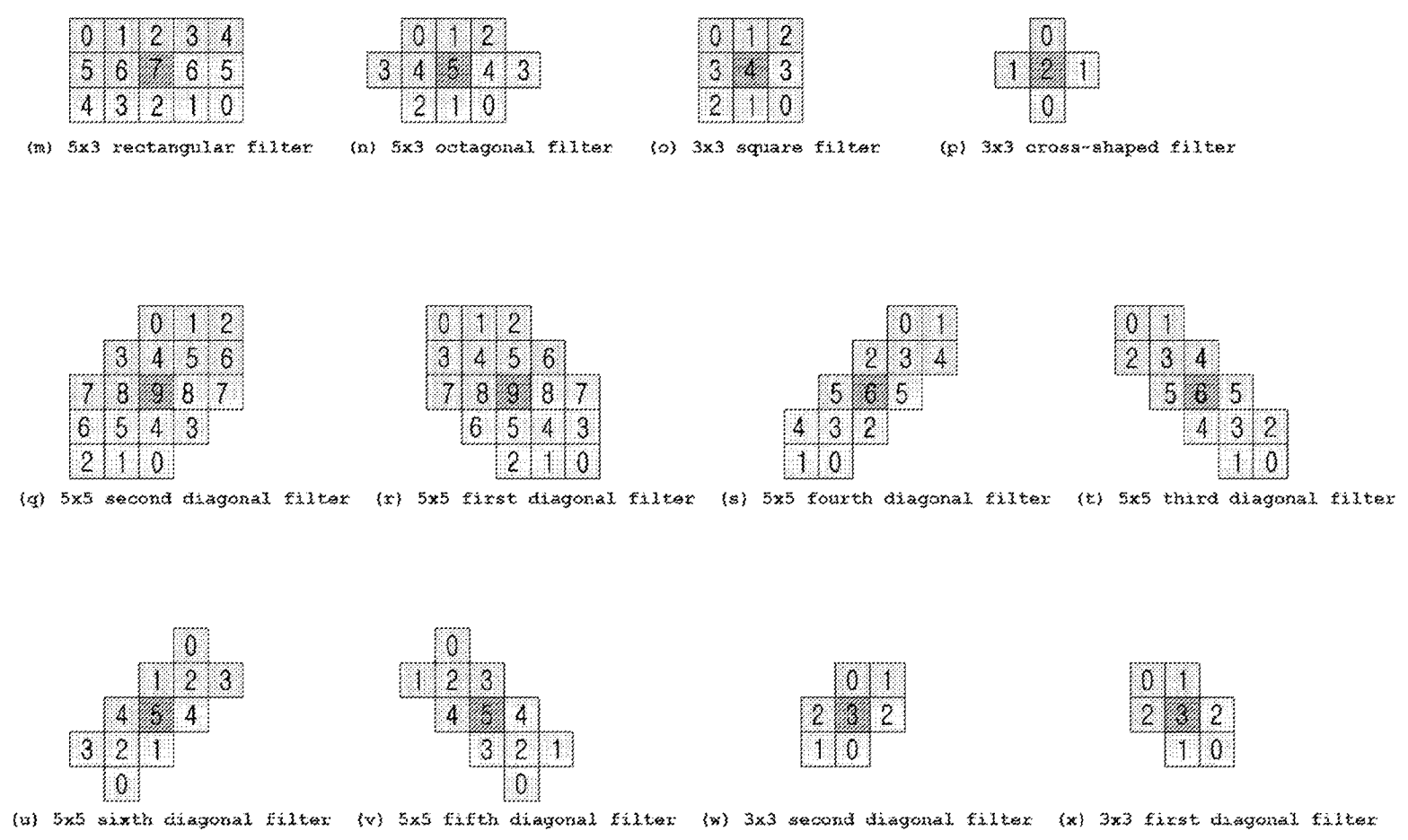

Alternatively, for example, a filter set is constructed using at least one filter of the filters having a vertical filter length of 3 among the filters shown in FIGS. 35A and 35B, and then filtering is performed using the filter set.

Further alternatively, for example, a filter set is constructed using at least one of the filters having a vertical filter length of 3 or 5 shown in FIGS. 35A and/or 35B, and filtering is performed using the filter set.

The filters shown in FIGS. 35A and 35B are designed to have a vertical filter length of 3 or 5. However, the filter shape used in the embodiments of the present invention is not limited thereto. Filters can be designed to have an arbitrary vertical filter length of M. Here, M is a positive integer.

On the other hand, H filter sets are prepared using the filters shown in FIG. 35A and/or FIG. 35B, information of which filter to use is signaled to the decoder from the encoder. In this case, filter indices are entropy-encoded/decoded on a per picture, tile, tile group, slice, or sequence basis. Here, H is a positive integer. That is, the filter index is entropy-encoded/decoded into a sequence parameter set, a picture parameter set, a slice header, a slice data, a tile header, and a tile group header within a bitstream.

At least one of the rhombic, rectangular, square, trapezoidal, diagonal, snowflake-shaped, number sign-shaped, clover-shaped, cross-shaped, triangular, pentagonal, hexagonal, octagonal, and decagonal filters is used to filter a reconstructed/decoded sample of at least one of a luminance component and a chrominance component.

On the other hand, the numbers in each filter shape illustrated in FIGS. 35A and/or 35B represent filter coefficient indices, and the filter coefficient indices are symmetric with respect to the filter center. That is, the filter shapes illustrated in FIG. 35A and/or FIG. 35B are point symmetric filters.

According to an embodiment of the present invention, the use of the filters as in the examples of FIG. 35A and/or FIG. 35B have an advantage of reducing the computational complexity of the encoder/decoder over the use of the filters as in the examples of FIG. 33.

For example, when at least one of the filters illustrated in FIG. 35A and/or FIG. 35B is used, the number of filter coefficients to be entropy-encoded/decoded is reduced as compared with the case where one of the 9×9 rhombic filters shown in FIG. 33 is used. Therefore, the computational complexity of the encoder/decoder can be reduced.

Alternatively, for example, when at least one of the filters shown in FIG. 35A and/or FIG. 35B is used, the number of multiplications required for filtering of filter coefficients is reduced as compared with the case where one of the 9×9 rhombic filters shown in FIG. 33 is used. Therefore, the computational complexity of the encoder/decoder can be reduced.

Further alternatively, for example, when at least one of the filters illustrated in FIG. 35A and/or FIG. 35B is used, the number of lines of the line buffer needed for filtering of the filter coefficients is reduced as compared with the case where one of the 9×9 rhombic filters shown in FIG. 33 is used. In addition, the hardware complexity, the memory requirement, and the memory access bandwidth can also be reduced.

Figure 36:
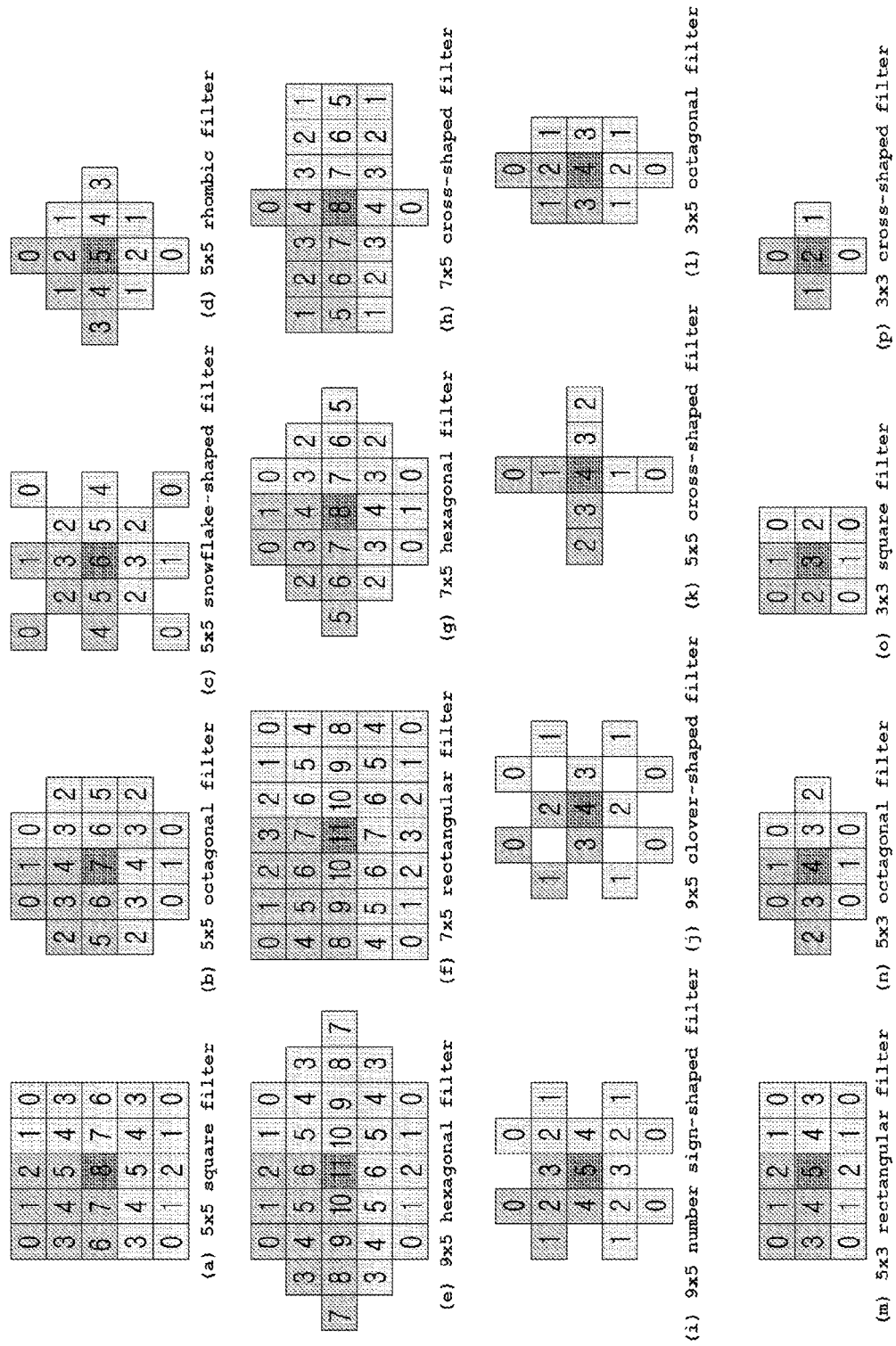
FIG. 36 is a diagram illustrating horizontal and vertical symmetric filters according to an embodiment of the present invention.
Figure 38:
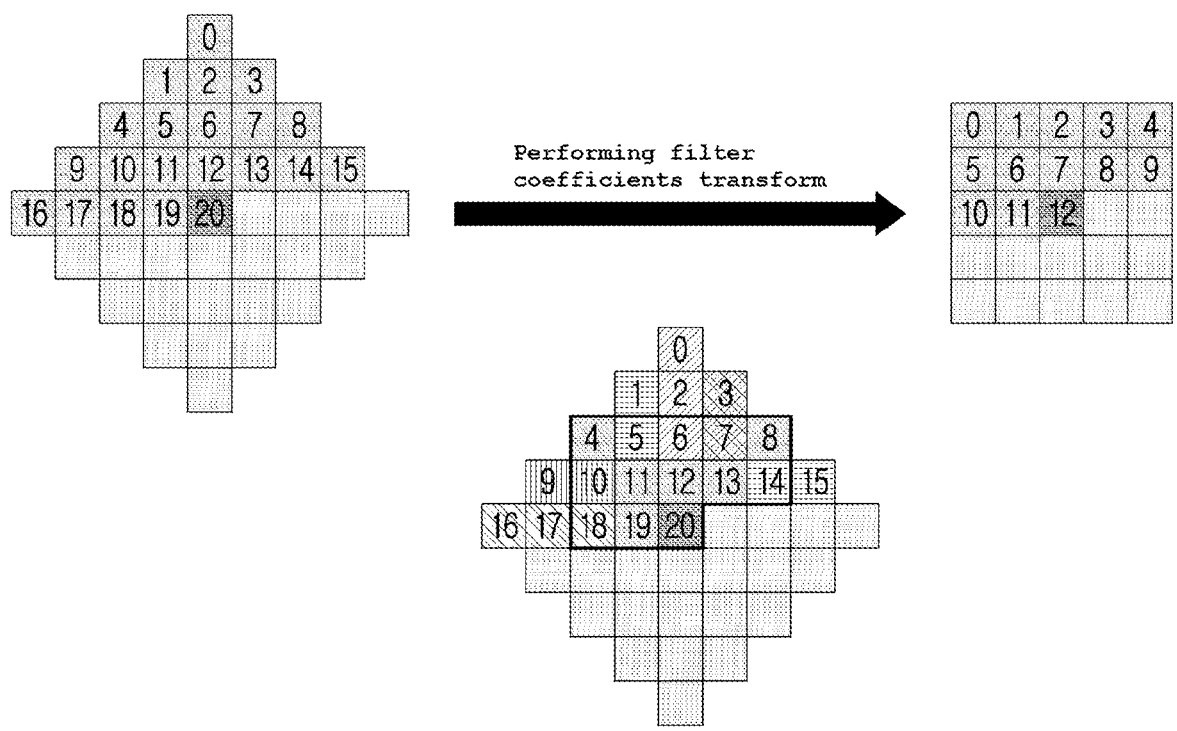
FIG. 38 is a diagram illustrating a process of transforming a rhombic filter including 9×9 coefficients to a square filter including 5×5 coefficients.

According to an embodiment of the present invention, at least one filter selected from among horizontal/vertical symmetric filters shown in FIG. 36 may be used for filtering instead of the point symmetric filters. Alternatively, diagonal symmetric filters can be used aside from the point symmetric filters and the horizontal/vertical symmetric filter. In FIG. 36, the numbers in each filter shape represent filter coefficient indices.

For example, a filter set is constructed using at least one of the filters having a vertical filter length of 5 among the filters shown in FIG. 36, and then filtering is performed using the filter set.

Alternatively, for example, a filter set is constructed using at least one filter of the filters having a vertical filter length of 3 among the filters shown in FIG. 36, and then filtering is performed using the filter set.

Further alternatively, for example, a filter set is constructed using at least one of the filters having a vertical filter length of 3 or 5 shown in FIG. 36, and filtering is performed using the filter set.

The filter shapes shown in FIG. 36 are designed to have a vertical filter length of 3 or 5. However, the filter shape used in the embodiments of the present invention is not limited thereto. Filters can be designed to have an arbitrary vertical filter length of M. Here, M is a positive integer.

In order to prepare a filter set including H filters of the filters shown in FIG. 36 and signal information of which filter to be used among the filters of the filter set to the decoder from the encoder, the filter indices are entropy-encoded/decoded on a per picture, tile, tile group, slice, or sequence basis. Here, H is a positive integer. That is, the filter index is entropy-encoded/decoded into a sequence parameter set, a picture parameter set, a slice header, a slice data, a tile header, and a tile group header within a bitstream.

At least one of the rhombic, rectangular, square, trapezoidal, diagonal, snowflake-shaped, number sign-shaped, clover-shaped, cross-shaped, triangular, pentagonal, hexagonal, octagonal, and decagonal filters is used to filter a reconstructed/decoded sample of at least one of a luminance component and a chrominance component.

According to an embodiment of the present invention, the use of the filters as illustrated in FIG. 36 has an advantage of reducing the computation complexity of the encoder/decoder over the use of the filters as illustrated in FIG. 33.

For example, when at least one of the filters illustrated in FIG. 36 is used, the number of filter coefficients to be entropy-encoded/decoded is reduced as compared with the case where one of the 9×9 rhombic filters shown in FIG. 33 is used. Therefore, the computational complexity of the encoder/decoder can be reduced.

Alternatively, for example, when at least one of the filters shown in FIG. 36 is used, the number of multiplications required for filtering of filter coefficients is reduced as compared with the case where one of the 9×9 rhombic filters shown in FIG. 33 is used. Therefore, the computational complexity of the encoder/decoder can be reduced.

Further alternatively, for example, when at least one of the filters illustrated in FIG. 36 is used, the number of lines of the line buffer needed for filtering of the filter coefficients is reduced as compared with the case where one of the 9×9 rhombic filters shown in FIG. 33 is used. In addition, the hardware complexity, the memory requirement, and the memory access bandwidth can also be reduced.

According to an embodiment of the present invention, geometric transform is performed on filter coefficients f(k,l) according to at last one of the sums of the gradient values (i.e., the sums $g_v$, $g_h$, $g_{d1}$, and $g_{d2}$ of the gradient values for the vertical direction, the horizontal direction, the first diagonal direction, and the second diagonal direction) that are calculated on a per block classification unit basis, before performing filtering on a per block classification unit basis. In this case, the geometric transform on the filter coefficients is achieved by performing 90° rotation, 180° rotation, 270° rotation, second diagonal flipping, first diagonal flipping, vertical flipping, horizontal flipping, vertical and horizontal flipping, or zooming-in/out on a filter, thereby producing a geometrically transformed filter.

On the other hand, after the geometric transform is performed on the filter coefficients, reconstructed/decoded samples are filtered using the geometrically transformed filter coefficients. In this case, the geometrical transform is performed on at least one of the reconstructed/decoded samples that are filtering targets, and then the reconstructed/decoded samples are filtered using the filter coefficients.

According to an embodiment of the present invention, geometrical transform are performed according to Equations 33 to 35.

$$f_D(k,l)=f(l,k) \quad \text{[Equation 33]}$$

$$f_V(k,l)=f(k,K-l-1) \quad \text{[Equation 34]}$$

$$f_R(k,l)=f(K-l-1,k) \quad \text{[Equation 35]}$$

Here, Equation 33 is an example showing a formula for the second diagonal flipping, Equation 34 is an example showing vertical flipping, and Equation 35 is an example showing 900 rotation. In Equations 34 to 35, K is the number of filter taps (filter length) in the horizontal direction and the vertical direction, and "0≤K and 1≤K−1" represent the coordinates of the filter coefficients. For example, (0, 0) represents the upper left corner and (K−1, K−1) represents the lower right corner.

Table 1 shows an example of geometric transform applied to the filter coefficients f(k,l) according to the sum of the gradient values.

TABLE 1

| Sum of gradient values | Type of geometrical transformation |
|---|---|
| $g_{d2} < g_{d1}$ and $g_h < g_v$ | transform is not performed |
| $g_{d2} < g_{d1}$ and $g_v < g_h$ | second diagonal flipping |
| $g_{d1} < g_{d2}$ and $g_h < g_v$ | vertical flipping |
| $g_{d1} < g_{d2}$ and $g_v < g_h$ | 90° rotation |

Figure 37:
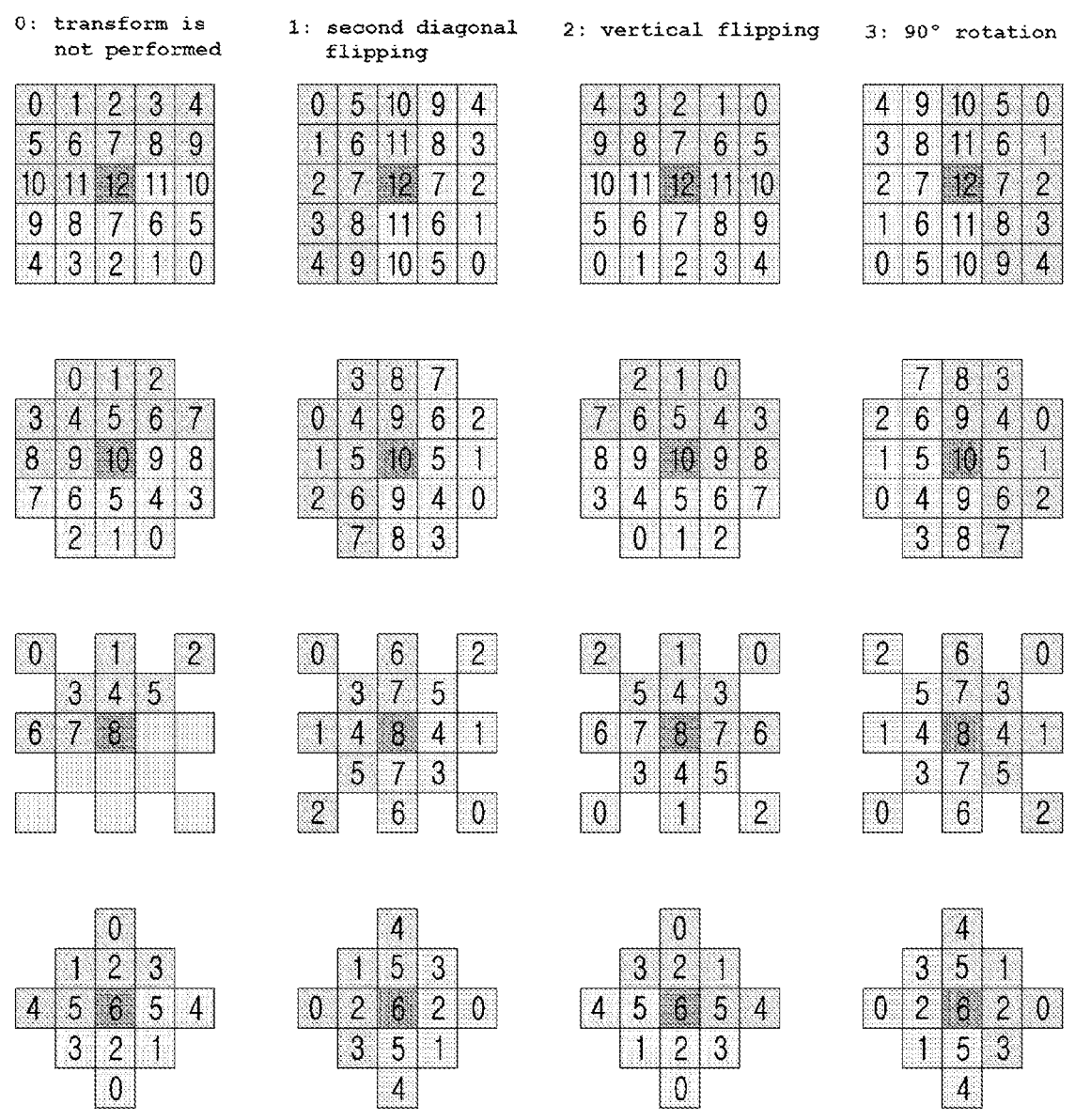

FIG. 37 is a diagram illustrating filters obtained by performing geometrical transform on a square filter, an octagonal filter, a snowflake-shaped filter, and a rhombic filter according to an embodiment of the present invention.

Referring to FIG. 37, at least one geometric transform among the second diagonal flipping, the vertical flipping, and 90° rotation is performed on the filter coefficients of a square filter, an octagonal filter, a snowflake-shaped filter, and a rhombic filter. Then, the filter coefficients obtained through the geometric transform can be used for filtering. On the other hand, after the geometric transform is performed on the filter coefficients, reconstructed/decoded samples are filtered using the geometrically transformed filter coefficients. In this case, the geometrical transform is performed on at least one of the reconstructed/decoded samples that are filtering targets, and then the reconstructed/decoded samples are filtered using the filter coefficients.

According to one embodiment of the present invention, the filtering is performed on the reconstructed/decoded sample R(i,j) to produce the filtered decoded samples R'(i,j). The filtered decoded sample may be represented by Equation 36.

$$R'(i,j) = \sum_{k=-L/2}^{L/2} \sum_{l=-L/2}^{L/2} f(k,l) \times R(i+k, j+l) \quad \text{[Equation 36]}$$

In Equation 36, L is the number of filter taps (filter length) in the horizontal or vertical direction, and f(k,l) is the filter coefficient.

On the other hand, when performing filtering, an offset value Y may be added to the filtered decoded sample R'(i,j). The offset value Y may be entropy-encoded/decoded. Also, the offset value Y is calculated using at least one statistic value of the current reconstructed/decoded sample value and the neighboring reconstructed/decoded sample values. In addition, the offset value Y is determined on the basis of at least one coding parameter of the current reconstructed/decoded sample and the neighboring reconstructed/decoded samples. Here, the threshold value E is a positive integer or zero.

Meanwhile, the filtered decoded samples may be clipped to be represented in N bits. Here, H is a positive integer. For example, when the filtered decoded sample generated by performing filtering on the reconstructed/decoded sample is clipped by 10 bits, the final decoded sample value may have a value within a range of from 0 to 1023.

According to an embodiment of the present invention, filtering on a chrominance component is performed on the basis of filter information of a luminance component.

For example, the filtering on a reconstructed picture of a chrominance component can be performed only when the filtering on a reconstructed picture of a luminance component is performed in a previous stage. Here, the reconstructed picture filtering of the chrominance components may be performed on U (Cr), V (Cb), or both components.

Alternatively, for example, in the case of a chrominance component, filtering is performed using at least one of the filter coefficients of the corresponding luminance component, the number of filter taps, the filter shape, and information of whether filtering is performed.

According to an exemplary embodiment of the present invention, when filtering is performed, when there is an unavailable sample in the vicinity of the current sample, padding is performed and filtering is then performed using the padded sample. The padding refers to a method of copying the sample value of an adjacent available sample to the unavailable sample. Alternatively, sample values or statistical values that are obtained on the basis of the available sample values adjacent to the unavailable sample are used. The padding may be repeatedly performed for P columns and R rows. Here, M and L are each positive integers.

Here, the unavailable sample refers to a sample disposed outside the boundary of a CTU, a CTB, a slice, a tile, a tile group, or a picture. Alternatively, the unavailable sample refers to a sample belonging to at least one of a CTU, a CTB, a slice, a tile, a tile group, and a picture that is different from at least one of a CTU, a CTB, a slice, a tile, a tile group, and a picture to which the current sample belongs.

In addition, when filtering is performed, a predetermined sample may not be used.

For example, when filtering is performed, the padded samples may not be used.

Alternatively, for example, when filtering is performed, when there is an unavailable in the vicinity of the current sample, the unavailable sample may not be used in the filtering.

Further alternatively, for example, when filtering is performed, when a sample in the vicinity of the current sample is located outside a CTU or CTB, the neighboring sample in the vicinity of the current sample may not be used in the filtering.

In addition, when filtering is performed, a sample to which at least one of deblocking filtering, adaptive sample offset, and adaptive in-loop filtering is applied may be used.

In addition, when the filtering is performed, when at least one of the samples existing in the vicinity of the current sample is located outside the CTU or CTB boundaries, at least one of deblocking filtering, adaptive sample offset, and adaptive in-loop filtering may not be applied.

In addition, filtering target samples include an unavailable sample located outside the CTU or CTB boundaries, at least one of the deblocking filtering, the adaptive sample offset, and the adaptive in-loop filtering is not performed on the unavailable sample and the unavailable sample is used as it is for the filtering.

According to an embodiment of the present invention, when filtering is performed, filtering is performed on at least one sample of the samples located in the vicinity of the boundaries of at least one of a CU, a PU, a TU, a block, a block classification unit, a CTU and a CTB. In this case, the boundaries include at least one of a vertical boundary, a horizontal boundary, and a diagonal boundary. In addition, the samples located in the vicinity of the boundaries may be at least one of U rows, U columns, and U samples located adjacent to the boundaries. Here, U is a positive integer.

According to an embodiment of the present invention, when filtering is performed, filtering is performed on at least one sample of the samples located within a block and is not performed on the sample located outside the boundaries of at least one of a CU, a PU, a TU, a block, a block classification unit, a CTU and a CTB. In this case, the boundaries include at least one of a vertical boundary, a horizontal boundary, and a diagonal boundary. In addition, the samples located in the vicinity of the boundaries may be at least one of U rows, U columns, and U samples located adjacent to the boundaries. Here, U is a positive integer.

According to an embodiment of the present invention, when filtering is performed, whether filtering is performed is determined on the basis of at least one coding parameter of coding parameters of the current block and the neighboring blocks. In this case, the coding parameters includes at least one of a prediction mode (i.e., whether the prediction is an intra prediction or an inter prediction), an inter prediction mode, an intra prediction mode, an intra prediction indicator, a motion vector, a reference picture index, a quantization parameter, a block size of a current block, a block shape of a current block, the size of a block classification unit, and a coding block flag/pattern.

In addition, when filtering is performed, at least one of a filter coefficient, the number of filter taps (filter length), a filter shape, and a filter type is determined on the basis of at least one coding parameter of the coding parameters of the current block and the neighboring blocks. At least one of the filter coefficient, the number of filter taps (filter length), the filter shape, and the filter type vary depending on at least one of the coding parameters.

For example, the number of filter used for the filtering is determined according to a quantization parameter. For example, when the quantization parameter is less than a threshold value T, J filters are used. When the quantization parameter is greater than a threshold value R, H filters are used. In the other cases, G filters are used. Here, T, R, J, H, and G are positive integers or zero. In addition, J is greater than or equal to H. Here, the larger the quantization parameter value, the smaller number of filters used.

Alternatively, for example, the number of filters used for the filtering is determined according to the size of the current block. For example, when the size of the current block is less than a threshold value T, J filters are used. When the size of the current block is greater than a threshold value R, H filters are used. In the other cases, G filters are used. Here, T, R, J, H, and G are positive integers or zero. In addition, J is greater than or equal to H. Here, the larger the block size, the smaller number of block filters used.

Alternatively, for example, the number of filters used for the filtering is determined according to the size of the block classification unit. For example, when the size of the block classification unit is less than a threshold value T, J filters are used. When the size of the block classification unit is greater than a threshold value R, H filters are used. In the other cases, G filters are used. Here, T, R, J, H, and G are positive integers or zero. In addition, J is greater than or equal to H. Here, the larger the size of the block classification unit, the smaller number of block filters used.

Further alternatively, for example, the filtering is performed by using any combination of the filtering methods described above.

Hereinafter, the filter information encoding/decoding step will be described.

According to an embodiment of the present invention, the filter information is entropy encoded/decoded to be disposed between a slice header and a first CTU syntax element of slice data, within a bitstream.

In addition, the filter information is entropy-encoded/decoded the to be disposed in a sequence parameter set, a picture parameter set, a slice header, slice data, a tile header, a tile group header, a CTU, or a CTB within a bitstream.

On the other hand, the filter information include at least one piece of information selected from among information on whether luminance component filtering is performed, information of whether chrominance component filtering is performed, a filter coefficient value; the number of filters, the number of filter taps (filter length), filter shape information, filter type information, information of whether filtering is performed on a per slice, tile, tile group, picture, CTU, CTB, block, or CU basis, information of the number of times that CU-based filtering is performed, CU maximum depth filtering information, information on whether CU-based filtering is performed, information on whether a filter of a previous reference picture is used, a filter index of a previous reference picture, information on whether a fixed filter is used for a block class index, index information for a fixed filter, filter merging information, information on whether different filters are used for a luminance component and a chrominance component, respectively, and filter symmetry shape information.

Here, the number of filter taps refers to at least one of a horizontal length of the filter, a vertical length of the filter, a first diagonal length of the filter, a second diagonal length of the filter, horizontal and vertical lengths of the filter, and the number of filter coefficients within a filter.

On the other hand, the filter information includes a maximum of L luminance filters. Here, L is a positive integer and is specifically 25. In addition, the filter information includes a maximum of L color difference filters. Here, L is a positive integer and is specifically 1.

On the other hand, one filter includes a maximum of K luminance filter coefficients. Here, K is a positive integer and is specifically 13. In addition, the filter information includes a maximum of K chrominance filter coefficients. Here, K is a positive integer and is specifically 7.

For example, the information on a filter symmetry shape is information on filter shapes, such as a point symmetric shape, a horizontal symmetric shape, a vertically symmetric shape, or a combination thereof.

On the other hand, only some of the filter coefficients are signaled. For example, when the filter has a symmetric form, information on the filter symmetry shape and only one filter coefficient set of the symmetric filter coefficient sets are signaled. Alternatively, for example, the filter coefficient at the filter center is not signaled because they can be implicitly derived.

According to an embodiment of the present invention, the filter coefficient value among the filter information is quantized in the encoder, and the resulting quantized filter coefficient value is entropy-encoded. Likewise, the filter coefficient values quantized in the decoder are entropy-decoded, and the quantized filter coefficient values are dequantized to be restored to the original filter coefficient values. The filter coefficient values are quantized into a range of values that can be represented by fixed M bits and then dequantized. In addition, at least one of the filter coefficients is quantized into different bits and dequantized. Conversely, at least one of the filter coefficients may be quantized into the same bits and dequantized. The M bits are determined according to a quantization parameter. In addition, M in the M bits is a constant predefined in the encoder and the decoder. Here, M may be a positive integer and may be specifically 8 or 10. The M bits may be less than or equal to the number of bits needed to represent samples in the encoder/decoder. For example, when the number of bits needed to represent the sample is 10, then M may be 8. A first filter coefficient of the filter coefficients within a filter may have a value in a range of from $-2^M$ to $2^M-1$, and a second filter coefficient may have a value in a range of from 0 to $2^M-1$. Here, the first filter coefficient refers to filter coefficients except for the center filter coefficient among the filter coefficients, and the second filter coefficient refers to the center filter coefficient among the filter coefficients.

The filter coefficient value among the filter information may be clipped by at least one of the encoder and the decoder, and at least one of a minimum value and a maximum value related to the clipping may be entropy-encoded/decoded. The filter coefficient value may be clipped to fall within a range of from the minimum value and the maximum value. At least one of the minimum value and the maximum value may have different values for each filter coefficient. On the other hand, at least one of the minimum value and the maximum value may have the same value for each filter coefficient. At least one of the minimum value and the maximum value may be determined according to the quantization parameter. At least one of the minimum value and the maximum value may be a constant value predefined in the encoder and the decoder.

According to an embodiment of the present invention, at least one pieced of the filter information is entropy-encoded/decoded on the basis of at least one coding parameter of the coding parameters of the current block and the neighboring blocks. In this case, the coding parameters includes at least one of a prediction mode (i.e., whether the prediction is an intra prediction or an inter prediction), an inter prediction mode, an intra prediction mode, an intra prediction indicator, a motion vector, a reference picture index, a quantization parameter, a block size of a current block, a block shape of a current block, the size of a block classification unit, and a coding block flag/pattern.

For example, the number of filters among the pieces of the filter information is determined according to a quantization parameter of a picture, slice, tile group, tile, CTU, CTB, or block. Specifically, when the quantization parameter is less than a threshold value T, J filters are entropy-encoded/decoded. When the quantization parameter is greater than a threshold value R, H filters are entropy-encoded/decoded. In the other cases, G filters are entropy-encoded/decoded. Here, T, R, J, H, and G are positive integers or zero. In addition, J is greater than or equal to H. Here, the larger the quantization parameter value, the smaller number of filters entropy-encoded.

According to an exemplary embodiment of the present invention, whether to perform filtering on at least one of a luminance component and a chrominance component is indicated by using filtering execution information (flag).

For example, whether or not to perform filtering on at least one of the luminance component and the chrominance component is indicated by using filtering execution information (flag) on a per CTU, CTB, CU, or block basis. For example, filtering is performed on a per CTB basis when the filtering execution information has a first value, and filtering is not performed on the corresponding CTB when the filtering execution information has a second value. In this case, information on whether filtering is performed for each CTB can be entropy-encoded/decoded. Alternatively, for example, information on the maximum depth or minimum size of a CU (maximum depth filtering information of a CU) is additionally entropy-encoded/decoded, and the CU-based filtering execution information on CUs having the maximum depth or on CUs having the minimum size may be entropy-encoded/decoded.

For example, when a block can be partitioned into smaller square sub-blocks and non-square sub-blocks according to a block structure, CU-based flags are entropy-encoded/decoded up to the partition depth at which the block has a block structure that can be partitioned into smaller square sub-blocks. In addition, the CU-based flags may be entropy-encoded/decoded up to the partition depth at which the block has a block structure that can partitioned into smaller non-square sub-blocks.

Alternatively, for example, the information on whether to perform filtering on at least one of a luminance component and a chrominance component may be block-based flags (i.e., flags on a per block basis). For example, filtering is performed on a block when the block-based flag of the corresponding block has a first value and the filtering is not performed when the block-based flag of the corresponding block has a second value. The size of the block is N×M in which N and M are positive integers.

Further alternatively, for example, the information on whether to perform filtering on at least one of a luminance component and a chrominance component may be CTU-based flags (i.e., flags on a per CTU basis). For example, filtering is performed on a CTU when the CTU-based flag of the corresponding CTU has the first value and the filtering is not performed when the CTU-based flag of the corresponding CTU has the second value. The size of the CTU is N×M in which N and M are positive integers.

Further alternatively, for example, whether to perform filtering on at least one of a luminance and a chrominance component is determined according to a picture, slice, tile group, or tile type. The information on whether to perform filtering on at least one of a luminance component and a chrominance component may be a flag on a per picture, slice, tile group, or tile basis.

According to an embodiment of the present invention, filter coefficients belonging to different block classes may be merged to reduce the amount of filter coefficients to be entropy-encoded/decoded. In this case, the filter merging information on whether filter coefficients are merged or not is entropy-encoded/decoded.

In addition, in order to reduce the amount of filter coefficients to be entropy-encoded/decoded, filter coefficients of a reference picture can be used as filter coefficients of a current picture. In this case, the method using the filter coefficients of the reference picture is referred to as temporal filter coefficient prediction. For example, the temporal filter coefficient prediction is used for an inter prediction picture (B/P-picture, slice, tile group, or tile). On the other hand, filter coefficients of the reference picture are stored in a memory. In addition, when the filter coefficients of the reference picture are used for the current picture, entropy-encoding/decoding of the filter coefficients of the current image is omitted. In this case, a previous reference picture filter index indicating which reference picture's filter coefficients are used is entropy-encoded/decoded.

For example, when the temporal filter coefficient prediction is used, a filter set candidate list is constructed. The filter set candidate list is empty before decoding a new sequence. However, the filter coefficient of a picture is added to the filter set candidate list each time one picture is decoded. When the number of filters in the filter set candidate list reaches a maximum number G of filters, a new filter can replace the oldest filter in decoding order. That is, the filter set candidate list is updated in a first-in-first-out (FIFO) manner. Here, G is a positive integer and is specifically 6. To prevent duplication of filters in the filter set candidate list, filter coefficients of pictures that do not use temporal filter coefficient prediction may be added to the filter set candidate list.

Alternatively, for example, when temporal filter coefficient prediction is used, filter set candidate lists for multiple temporal layer indices are constructed to support temporal scalability. That is, the filter set candidate lists is constructed for the respective temporal layers. For example, the filter set candidate lists for the respective temporal layers include a filter set for a decoded picture having a temporal layer index is equal to or smaller than the temporal hierarchical index of the previous decoded picture. In addition, after decoding each picture, the filter coefficient for a current pictures is added to a filter set candidate list having a temporal layer index equal to or greater than the temporal layer index of the current picture.

According to an embodiment of the present invention, the filtering is performed using a fixed filter set.

Although the temporal filter coefficient prediction cannot be used in the intra prediction picture (I picture, slice, tile group, or tile), at least one filter of a maximum of 16 kinds of fixed filters within a filter set can be used for filtering according to the block class index. In order to signal information on whether to use a fixed filter set to the decoder from the encoder, the information on whether to use a fixed filter on each of the block class indices is entropy-encoded/decoded. When a fixed filter is used, the index information on the fixed filter is also entropy-encoded/decoded. Even when a fixed filter is used for a specific block class index, the filter coefficient is also entropy-encoded/decoded, and a reconstructed picture is filtered using the entropy-encoded/decoded filter coefficient and the fixed filter coefficient.

In addition, the fixed filter set is also used in an inter prediction picture (a B/P picture, slice, tile group, or tile).

In addition, the adaptive in-loop filtering can be performed with a fixed filter without entropy-encoding/decoding of the filter coefficients. Here, the fixed filter may mean a filter set predefined in the encoder and the decoder. In this case, without entropy-encoding/decoding the filter coefficients, the encoder and the decoder entropy-encodes/decodes fixed filter index information indicating which filter of a filter set or which filter set of the filter sets predefined in the encoder and the decoder is used. In this case, the filtering is performed with fixed filers that differ in terms of at least one of a filter coefficient value, a filter tap (i.e., the number of filter taps or a filter length), and a filter shape, on at least one of a block class basis, a block basis, a CU basis, a slice basis, a tile basis, a tile group basis, and a picture basis.

On the other hand, at least one filter within the fixed filter set may be transformed in terms of a filter tap and/or a filter shape. For example, as in illustrated in FIG. 38, coefficients in a 9×9 rhombic filter are transformed into coefficients in a 5×5 square filter. Specifically, coefficients in a 9×9 rhombic filter may be transformed into coefficients in a 5×5 square filter.

For example, the sum of the filter coefficients corresponding to the filter coefficient indices 0, 2, and 6 in the 9×9 rhombus shape is assigned to the filter coefficient index 2 in the 5×5 square shape.

Alternatively, for example, the sum of the filter coefficients corresponding to the filter coefficient indices 1 and 5 in the 9×9 rhombus shape is assigned to the filter coefficient index 1 in the 5×5 square shape.

Further alternatively, for example, the sum of the filter coefficients corresponding to the filter coefficient indices 3 and 7 in the 9×9 rhombus shape is assigned to the filter coefficient index 3 in the 5×5 square shape.

Further alternatively, for example, the filter coefficient corresponding to the filter coefficient index 4 in the 9×9 rhombus shape is assigned to the filter coefficient index 0 in the 5×5 square shape.

Further alternatively, for example, the filter coefficient corresponding to the filter coefficient index 8 in the 9×9 rhombus shape is assigned to the filter coefficient index 4 in the 5×5 square shape.

Further alternatively, for example, the sum of the filter coefficients corresponding to the filter coefficient indices 9 and 10 in the 9×9 rhombus shape is assigned to the filter coefficient index 5 in the 5×5 square shape.

Further alternatively, for example, the filter coefficient corresponding to the filter coefficient index 11 in the 9×9 rhombus shape is assigned to the filter coefficient index 6 in the 5×5 square shape.

Further alternatively, for example, the filter coefficient corresponding to the filter coefficient index 12 in the 9×9 rhombus shape is assigned to the filter coefficient index 7 in the 5×5 square shape.

Further alternatively, for example, the filter coefficient corresponding to the filter coefficient index 13 in the 9×9 rhombus shape is assigned to the filter coefficient index 8 in the 5×5 square shape.

Further alternatively, for example, the sum of the filter coefficients corresponding to the filter coefficient indices 14 and 15 in the 9×9 rhombus shape is assigned to the filter coefficient index 9 in the 5×5 square shape.

Further alternatively, for example, the sum of the filter coefficients corresponding to the filter coefficient indices 16, 17, and 18 in the 9×9 rhombus shape is assigned to the filter coefficient index 10 in the 5×5 square shape.

Further alternatively, for example, the filter coefficient corresponding to the filter coefficient index 19 in the 9×9 rhombus shape is assigned to the filter coefficient index 11 in the 5×5 square shape.

Further alternatively, for example, the filter coefficient corresponding to the filter coefficient index 20 in the 9×9 rhombus shape is assigned to the filter coefficient index 12 in the 5×5 square shape.

Table 2 shows an exemplary method of generating filter coefficients by transforming a 9×9 rhombic filter coefficient into a 5×5 square filter coefficient.

TABLE 2

| Filter coefficient Index (9 × 9 rhombic filter) | | | | | | | | | | | | | | | | | | | | | Sum of |
|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | Coe~ |
| 0 | −6 | 3 | −6 | −8 | −2 | 7 | 0 | −5 | −10 | −1 | 28 | 64 | 36 | 4 | −2 | −1 | 7 | 15 | 68 | 130 | 321 |
| −6 | −5 | 6 | −4 | −5 | 1 | 10 | 4 | 3 | −7 | 4 | 24 | 53 | 34 | 1 | 2 | −9 | 8 | 20 | 61 | 102 | 307 |
| −8 | −10 | 13 | −4 | −13 | 12 | 19 | 14 | 0 | −11 | 15 | 24 | 38 | 31 | 20 | 7 | −9 | 19 | 27 | 42 | 60 | 286 |
| 4 | 8 | −21 | 11 | 0 | −18 | −1 | −21 | −1 | 9 | −14 | 32 | 83 | 37 | −12 | 12 | 8 | −28 | −3 | 86 | 170 | 341 |
| −13 | −6 | 19 | 0 | −7 | 16 | 16 | 19 | 14 | −8 | 17 | 16 | 23 | 25 | 25 | 18 | −11 | 25 | 25 | 27 | 32 | 272 |
| −17 | 1 | 17 | 13 | 5 | 13 | 9 | 10 | 40 | −3 | 19 | 15 | 13 | 14 | 17 | 37 | −14 | 18 | 18 | 21 | 20 | 266 |
| −13 | −7 | −1 | −1 | 22 | −24 | −2 | −32 | 28 | −5 | −26 | 7 | 88 | 9 | −34 | 2 | 18 | −3 | −5 | 94 | 230 | 371 |
| −2 | −11 | 21 | −10 | −19 | 8 | 17 | 14 | −15 | −19 | 7 | 19 | 44 | 34 | 18 | −1 | −3 | 29 | 28 | 52 | 90 | 301 |
| −12 | −9 | 9 | −13 | 0 | 10 | 19 | 17 | −3 | −12 | 13 | 20 | 46 | 31 | 19 | −9 | −19 | 14 | 28 | 52 | 110 | 311 |
| −5 | 0 | 2 | −9 | 8 | −5 | −8 | −9 | 28 | −3 | −4 | 12 | 58 | 46 | 7 | −7 | −8 | −1 | 2 | 71 | 162 | 337 |
| −23 | −9 | 23 | −15 | −6 | 20 | 27 | 28 | −5 | −11 | 23 | 21 | 30 | 32 | 33 | −4 | −34 | 31 | 36 | 36 | 46 | 279 |
| −27 | −8 | 28 | −10 | −2 | 25 | 25 | 31 | 3 | −13 | 29 | 17 | 19 | 30 | 37 | 2 | −34 | 33 | 37 | 25 | 18 | 265 |
| −72 | 20 | 38 | 2 | 25 | 19 | 28 | 31 | 50 | 6 | 23 | 0 | 3 | 12 | 38 | 18 | −84 | 54 | 33 | 8 | 8 | 260 |
| −7 | 3 | 12 | 3 | −4 | −10 | −2 | −13 | 5 | 2 | −8 | 17 | 64 | 28 | −3 | 4 | −6 | 4 | 9 | 81 | 154 | 333 |
| −5 | −5 | 12 | −5 | 2 | 1 | −9 | 0 | 3 | −8 | 3 | 1 | 55 | 12 | 4 | −3 | −5 | 14 | −12 | 71 | 260 | 386 |
| −7 | 0 | 7 | −2 | 5 | −7 | 8 | 0 | 3 | −5 | 0 | 20 | 56 | 29 | 7 | 4 | −8 | 6 | 21 | 67 | 124 | 318 |

| Filter coefficient Index (5 × 5 Square filter) | | | | | | | | | | | | | |
|---|---|---|---|---|---|---|---|---|---|---|---|---|---|
| 0 | 1 | 2 | 3 | 4 | 5 | 6 | 7 | 8 | 9 | 10 | 11 | 12 | Sum |
| −8 | −8 | 10 | −6 | −5 | −11 | 28 | 64 | 36 | 2 | 21 | 68 | 130 | 321 |
| −5 | −4 | 10 | 0 | 3 | −3 | 24 | 53 | 34 | 13 | 19 | 61 | 102 | 307 |
| −13 | 2 | 24 | 10 | 0 | 4 | 24 | 38 | 31 | 27 | 37 | 42 | 60 | 286 |
| 0 | −10 | −18 | −10 | −1 | −5 | 32 | 83 | 37 | 0 | −23 | 86 | 170 | 341 |
| −7 | 10 | 22 | 19 | 14 | 9 | 16 | 23 | 25 | 43 | 39 | 27 | 32 | 272 |
| 5 | 14 | 9 | 23 | 40 | 16 | 15 | 13 | 14 | 54 | 22 | 21 | 20 | 266 |
| 22 | −31 | 10 | −33 | 28 | −31 | 7 | 88 | 9 | −32 | 10 | 94 | 230 | 371 |
| −19 | −3 | 36 | 4 | −15 | −12 | 19 | 44 | 34 | 17 | 54 | 52 | 90 | 301 |
| 0 | 1 | 16 | 4 | −3 | 1 | 20 | 46 | 31 | 10 | 23 | 52 | 110 | 311 |
| 8 | −5 | −11 | −18 | 28 | −7 | 12 | 58 | 46 | 0 | −7 | 71 | 162 | 337 |
| −6 | 11 | 27 | 13 | −5 | 12 | 21 | 30 | 32 | 29 | 33 | 36 | 46 | 279 |
| −2 | 17 | 26 | 21 | 3 | 16 | 17 | 19 | 30 | 39 | 36 | 25 | 18 | 265 |
| 25 | 39 | −6 | 33 | 50 | 29 | 0 | 3 | 12 | 56 | 3 | 8 | 8 | 260 |

TABLE 2-continued

| | | | | | | | | | | | | | |
|---|---|---|---|---|---|---|---|---|---|---|---|---|---|
| -4 | -7 | 3 | -10 | 5 | -6 | 17 | 64 | 28 | 1 | 7 | 81 | 154 | 333 |
| 2 | -4 | -2 | -5 | 3 | -5 | 1 | 55 | 12 | 1 | -3 | 71 | 260 | 386 |
| -5 | -7 | 8 | -2 | 3 | -5 | 20 | 56 | 29 | 11 | 19 | 67 | 124 | 318 |

In Table 2, the sum of at least one of the filter coefficients of the 9×9 rhombic filter is equal to the sum of at least one of the filter coefficients of the corresponding 5×5 square filter.

On the other hand, when using a maximum of 16 fixed filter sets for 9×9 rhombic filter coefficients, data of a maximum of 21 filter coefficients×25 filters×16 filter types needs to be stored in a memory. When a maximum of 16 fixed filter sets are used for filter coefficients of a 5×5 square filter, data of a maximum of 13 filter coefficients×25 filters×16 filter types needs to be stored in a memory. Here, since the size of the memory needed to store the fixed filter coefficients in a 5×5 square filter is smaller than the size of the memory needed to store the fixed filter coefficients in a 9×9 rhombic filter, the memory capacity requirement and the memory access bandwidth are reduced.

On the other hand, the filtering may be performed on the reconstructed/decoded chrominance component using a filter obtained by transforming the filter used for the co-located luminance component in terms of the filter tap and/or the filter shape.

According to an embodiment of the present invention, prediction of filter coefficients from filter coefficients of a predefined fixed filter is prohibited.

According to an embodiment of the present invention, the multiplication operation is replaced by a shift operation. First, filter coefficients used to perform filtering on the luminance and/or chrominance block are divided into two groups. For example, the filter coefficients are divided into a first group including coefficients of {L0, L, L2, L3, L4, L5, L7, L8, L9, L10, L14, L15, L16, and L17} and a second group including the remaining coefficients. The first group is restricted to include only coefficient values of {-64, -32, -16, -8, -4, 0, 4, 8, 16, 32, and 64}. In this case, the multiplication of the filter coefficients included in the first group and the reconstructed/decoded samples can be performed by a single bit shift operation. Accordingly, the filter coefficients included in the first group are mapped to pre-binarized bit-shifted values to reduce signaling overhead.

According to an embodiment of the present invention, as the result of the determination of whether to perform block classification and/or filtering on a chrominance component, the result of the determination of whether to perform block classification and/or filtering on the corresponding luminance component is used as it is. In addition, as the filter coefficients for the chrominance component, the filter coefficients that have been used for the corresponding luminance component are used. For example, a predetermined 5×5 rhombic filter is used.

As an example, the filter coefficients in a 9×9 filter used for the luminance component may be transformed into the filter coefficients in a 5×5 filter for the chrominance component. In this case, the outermost filter coefficient is set to zero.

As another example, when the filter coefficients in a 5×5 filter form is used for the luminance component, the filter coefficients for the luminance component are the same as the filter coefficients for the chrominance component. That is, the filter coefficients used for the luminance component can be used as the filter coefficients for the chrominance component as they are.

As a further example, in order to maintain the 5×5 filter shape used for filtering the chrominance components, the filter coefficients outside the 5×5 rhombic filter are replaced by the coefficients disposed at the boundaries of the 5×5 rhombic filter.

On the other hand, the in-loop filtering for the luminance block and the in-loop filtering for the chrominance block may be separately performed. A control flag is signaled at the picture, slice, tile group, tile, CTU, or CTB level to inform whether the adaptive in-loop filtering for the chrominance component is separately supported. It is possible to signal a flag indicating a mode in which the adaptive in-loop filtering is collectively performed on a luminance block and a chrominance block or a mode in which the adaptive in-loop filtering for a luminance block and the adaptive in-loop filtering for a chrominance block are separately performed.

According to an embodiment of the present invention, when at least one piece of the filter information is entropy-encoded/decoded, at least one of the following binarization methods may be used:

Truncated rice binarization method;
K-thorder Exp_Golomb binarization method;
Limited K-th order Exp_Golomb binarization method;
Fixed-length binarization method;
Unary binarization method; and
Truncated unary binarization method.

As an example, the filter coefficient values of the luminance filter and the filter coefficient values of the chrominance filter are entropy-encoded/decoded using different binarization methods for the luminance filter and the chrominance filter.

As another example, the filter coefficient values of the luminance filter are entropy-encoded/decoded using different binarization methods. As a further example, the filter coefficient values of one luminance filter are entropy-encoded/decoded using the same binarization method.

As a further example, the filter coefficient values of one chrominance filter are entropy-encoded/decoded using different binarization methods. As a further example, the filter coefficient values of one chrominance filter are entropy-encoded/decoded using the same binarization method.

When at least one piece of the filter information is entropy-encoded/decoded, as an example, at least one piece of the filter information of at least one of the neighboring blocks, or at least piece of the previously encoded/decoded filter information, or the encoded/decoded filter information within the previous picture is used to determine a context model.

As another example, when at least one piece of the filter information is entropy-encoded/decoded, the context model is determined using at least one piece of filter information of different components.

As a further example, when the filter coefficients are entropy-encoded/decoded, the context model is determined using at least one of the filter coefficient in the filter.

As a further example, when at least one piece of the filter information is entropy-encoded/decoded, at least one piece of the filter information of at least one of the neighboring blocks, or at least piece of the previously encoded/decoded filter information, or the encoded/decoded filter information within the previous picture is used to determine the context model.

As a further example, when at least one piece of the filter information is entropy-encoded/decoded, entropy-encoding/decoding is performed using at least one piece of the filter information of the different components as a prediction value of the filter information.

As a further example, when the filter coefficients are entropy-encoded/decoded, entropy-encoding/entropy-decoding is performed using at least one of the filter coefficient within a filter as a prediction value.

As a further example, the filter information is entropy-encoded/decoded using any one combination of the filter information entropy-encoding/decoding methods.

According to an embodiment of the present invention, the adaptive in-loop filtering is performed in units of at least one of a block, a CU, a PU, a TU, a CB, a PB, a TB, a CTU, a CTB, a slice, a tile, a tile group, and a picture. When the adaptive in-loop filtering is performed on a per any one unit of the units described above, the block classification step, it means that the filtering execution step, and the filter information encoding/step are performed in units of at least one of a block, a CU, a PU, a TU, a CB, a PB, a TB, a CTU, a CTB, a slice, a tile, a tile group, and a picture.

According to an embodiment of the present invention, whether to perform the adaptive in-loop filtering is determined on the basis of the determination of whether at least one of the deblocking filtering, a sample adaptive offset, and bidirectional filtering is performed.

As an example, the adaptive in-loop filtering is performed on the samples that has undergone at least one of the deblocking filtering, the sample adaptive offset, and the bidirectional filtering, among the reconstructed/decoded samples within the current picture.

As another example, the adaptive in-loop filtering is not performed on the samples that have undergone at least one of the deblocking filtering, the sample adaptive offset, and the bi-directional filtering, among the reconstructed/decoded samples within the current picture.

As a further example, with respect to the samples that have undergone at least one of the deblocking filtering, the sample adaptive offset, and the bi-directional filtering among the reconstructed/decoded samples within the current picture, the adaptive in-loop filtering is performed on the reconstructed/decoded samples within the current picture using L filters without performing the block classification. Here, L is a positive integer.

According to an embodiment of the present invention, whether to perform the adaptive in-loop filtering is determined according to a slice or tile group type of the current picture.

As an example, the adaptive in-loop filtering is performed only when the slice or tile group type of the current picture is an I slice or an I tile group.

As another example, the adaptive in-loop filtering is performed when the slice or tile group type of the current picture is at least one of an I slice, a B slice, a P slice, an I tile group, a B tile group, and a P tile group.

As an example, when the slice or tile group type of the current picture is at least one of an I slice, a B slice, a P slice, an I tile group, a B tile group, and a P tile group, at the time of performing the adaptive in-loop filtering on the current picture, the adaptive in-loop filtering is performed on the reconstructed/decoded samples within the current picture using L filters without performing the block classification. Here, L is a positive integer.

As a further example, the adaptive in-loop filtering is performed using one filter shape when the slice or tile group type of the current picture is at least one of an I slice, a B slice, a P slice, an I tile group, a B tile group, and a P tile group.

As a further example, the adaptive in-loop filtering is performed using one filter tap when the slice or tile group type of the current picture is at least one of an I slice, a B slice, a P slice, an I tile group, a B tile group, and a P tile group.

As a further example, at least one of the block classification and the adaptive in-loop filtering is performed on a per M×N-size block basis when the slice or tile group type of the current picture is at least one of an I slice, a B slice, a P slice, an I tile group, a B tile group, and a P tile group. In this case, M and N are each positive integers. M and N are both specifically 4.

According to an embodiment of the present invention, whether to perform the adaptive in-loop filtering is determined according to the determination of whether the current picture is used as a reference picture.

As an example, when the current picture is used as a reference picture in the process of encoding/decoding a subsequent picture, the adaptive in-loop filtering is performed on the current picture.

As another example, when the current picture is not used as a reference picture in the process of encoding/decoding a subsequent picture, the adaptive in-loop filtering is not performed on the current image.

As a further example, when the current picture is not used in the process of encoding/decoding a subsequent picture, at the time of performing the adaptive in-loop filtering on the current picture, the adaptive in-loop filtering is performed on the reconstructed/decoded samples within the current picture using L filters without performing the block classification. Here, L is a positive integer.

As a further example, when the current picture is not used in the process of encoding/decoding a subsequent picture, the adaptive in-loop filtering is performed using one filter shape.

As a further example, when the current picture is not used in the process of encoding/decoding a subsequent picture, the adaptive in-loop filtering is performed using one filter tap.

As a further example, when the current picture is not used in the process of encoding/decoding a subsequent picture, at least one of the block classification and the filtering is performed on a per N×M-size block basis. In this case, M and N are each positive integers. M and N are both specifically 4.

According to an embodiment of the present invention, whether to perform the adaptive in-loop filtering is determined according to a temporal layer identifier.

As an example, when the temporal layer identifier of the current picture is zero representing the bottom layer, the adaptive in-loop filtering is performed on the current picture.

As a further example, when the temporal layer identifier of the current picture is 4 representing the top layer, the adaptive in-loop filtering is performed.

As a further example, the temporal layer identifier of the current picture is 4 representing the top layer, at the time of performing the adaptive in-loop filtering on the current picture, the adaptive in-loop filtering is performed on the reconstructed/decoded samples within the current picture using L filters without performing the block classification. Here, L is a positive integer.

As a further example, when the temporal layer identifier of the current picture is 4 representing the top layer, the adaptive in-loop filtering is performed using one filter shape.

As a further example, when the temporal layer identifier of the current picture is 4 representing the top layer, the adaptive in-loop filtering is performed using one filter tap.

As a further example, when the temporal layer identifier of the current picture is 4 representing the top layer, at least one of the block classification and the adaptive in-loop filtering is performed on a per N×M-size block basis. In this case, M and N are each positive integers. M and N are both specifically 4.

According to an embodiment of the present invention, at least one of the block classification methods is performed according to a temporal layer identifier.

As an example, when the temporal layer identifier of the current picture is zero representing the bottom layer, at least one of the block classification methods described above is performed on the current picture.

Alternatively, when the temporal layer identifier of the current picture is 4 representing the top layer, at least one of the block classification methods described above is performed on the current picture.

According to an embodiment of the present invention, at least one of the block classification methods described above is performed according to the value of a temporal layer identifier.

As a further example, when the temporal layer identifier of the current picture is 4 representing the top layer, at the time of performing the adaptive in-loop filtering on the current picture, the adaptive in-loop filtering is performed on the reconstructed/decoded samples within the current picture using L filters without performing the block classification. Here, L is a positive integer.

As a further example, when the temporal layer identifier of the current picture is 4 representing the top layer, the adaptive in-loop filtering is performed using one filter shape.

As a further example, when the temporal layer identifier of the current picture is 4 representing the top layer, the adaptive in-loop filtering is performed using one filter tap.

As a further example, when the temporal layer identifier of the current picture is 4 representing the top layer, at least one of the block classification and the adaptive in-loop filtering is performed on a per N×M-size block basis. In this case, M and N are each positive integers. M and N are both specifically 4.

As a further example, at the time of performing the adaptive in-loop filtering on the current picture, the adaptive in-loop filtering is performed on the reconstructed/decoded samples within the current picture using L filters without performing the block classification. Here, L is a positive integer. Alternatively, in this case, the adaptive in-loop filtering is performed on the reconstructed/decoded samples within the current picture using L filters without performing the block classification, without depending on the temporal layer identifier.

On the other hand, at the time of performing the adaptive in-loop filtering on the current picture, the adaptive in-loop filtering is performed on the reconstructed/decoded samples within the current picture using L filters without depending on whether the block classification is performed. Here, L is a positive integer. In this case, the adaptive in-loop filtering may be performed on the reconstructed/decoded samples within the current picture using L filters without performing the block classification, without depending on the temporal layer identifier and on whether the block classification is performed.

On the other hand, the adaptive in-loop filtering may be performed using one filter shape. In this case, the adaptive in-loop filtering may be performed on the reconstructed/decoded samples within the current image using one filter shape without performing the block classification. Alternatively, the adaptive in-loop filtering may be performed on the reconstructed/decoded samples within the current image using one filter shape without depending on whether the block classification is performed.

On the other hand, the adaptive in-loop filtering may be performed using one filter tap. In this case, the adaptive in-loop filtering may be performed on the reconstructed/decoded samples within the current image using one filter tap without performing the block classification. Alternatively, the adaptive in-loop filtering may be performed on the reconstructed/decoded samples within the current image using one filter tap without depending on whether the block classification is performed.

On the other hand, the adaptive in-loop filtering may be performed on a specific unit basis. For example, the specific unit may be at least one of a picture, a slice, a tile, a tile group, a CTU, a CTB, a CU, a PU, a TU, a CB, a PB, a TB, and an M×N-size block. Here, M and N are each positive integers. M and N are the same integer or different integers. In addition, M, N, or both are values predefined in the encoder/decoder. Alternatively, M, N, or both may be values signaled to the decoder from the encoder.

FIGS. 39 to 42 are diagrams illustrating exemplary methods of determining the sum of gradient values for a vertical direction, a horizontal direction, a first diagonal direction, and a second diagonal direction on the basis of subsampling.

Referring to FIGS. 39 to 42, filtering is performed on a per 4×4-size luminance block basis. In this case, filtering may be performed using different filter coefficients for each 4×4-size luminance block. A sub-sampled Laplacian operation may be performed to classify the 4×4-size luminance blocks. In addition, filter coefficients for the filtering vary for each 4×4-size luminance block. In addition, the 4×4-size luminance blocks are classified into a maximum of 25 classes. Further, a class index corresponding to a filter index of the 4×4-size luminance block may be derived from based the directionality value and/or the quantized activity value of the block. Here, in order to calculate the directionality values and/or the quantized activity values for each 4×4-size luminance block, the sums of gradient values for the vertical direction, the horizontal direction, the first diagonal, and the second diagonal direction, respectively are calculated by adding the results of one-dimensional Laplacian operations calculated at sub-sampled positions within an 8×8-size block.

Specifically, referring to FIG. 39, in the case of block classification on a per 4×4-size block basis, at least one of the sums $g_v$, $g_h$, $g_{d1}$, and $g_{d2}$ of the gradient values for the vertical direction, the horizontal direction, the first diagonal direction, and the second diagonal direction is calculated on the basis of subsampling (hereinafter, referred to as "first method"). Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the horizontal direction, the vertical direction, the first diagonal direction, and the second diagonal direction at positions V, H, D1, and D2, respectively. In addition, positions at which the one-dimensional Laplacian operations are performed may be sub-sampled positions. In FIG. 39, the block class indices C are allocated on a per 4×4-size block (that is shaded) basis. In this case, an operation range in which the one-dimensional Laplacian sum is calculated may be larger than the size of the block classification unit. Here, a thin solid-line rectangle represents a reconstructed sample position, and a thick solid-line rectangle represents an operation range in which the one-dimensional Laplacian sum is calculated.

Here, Table 3 illustrates an exemplary block classification-based encoding/decoding process using the first method. Table 4 illustrates another exemplary block classification-based encoding/decoding process using the first method. Table 5 illustrates a further exemplary block classification-based encoding/decoding process using the first method.

TABLE 3

Derivation process for filter index array for luma samples

Inputs of this process are:
- a luma location ( xC, yC ) specifying the top-left luma sample of the current coding tree block relative to the top left luma sample of the current picture,
- a variable log2CbSize specifying the size of the current coding tree block.
- a reconstructed luma picture sample array recPicture prior to the adaptive loop filtering process.
Output of this process is the two-dimensional classification index array of (nS)x(nS), classIdx, transposeIdx.
A variable nS is set equal to ( 1 << log2CbSize ).
The locations ( $h_x$, $v_y$ ) for each of the corresponding luma samples ( x, y ) inside the given array recPicture of luma samples are derived as follows:
  $h_x$ = Clip3( 0, pic_width_in_luma_samples − 1, x )
  $v_y$ = Clip3( 0, pic_height_in_luma_samples − 1, y )
The classification filter index array classIdx is specified as following:
1. For variables varTempH[ x ][ y ], varTempV[ x ][ y ], varTempD0[ x ][ y ] and varTempD1[ x ][ y ], the following applies:
 - The variable varTempH[ x ][ y ] with x, y = − 2..(nS) + 1 is derived as
  If ( abs( y ) % 2 ) is equal to 0, then
   varTempH[ x ][ y ] = | (recPicture[ $h_{xC+x}$, $v_{yC+y}$ ] << 1 ) − recPicture[ $h_{xC+x-1}$, $v_{yC+y}$ ] − recPicture[ $h_{xC+x+1}$, $v_{yC+y}$ ] |
  Otherwise,
   varTempH[ x ][ y ] = 0
 - The variable varTempV[ x ][ y ] with x, y = − 2..(nS) + 1 is derived as
  If ( abs( x ) % 2 ) is equal to 0, then
   varTempV[ x ][ y ] = | ( recPicture[ $h_{xC+x}$, $v_{yC+y}$ ] << 1 ) − recPicture[ $h_{xC+x}$, $v_{yC+y-1}$ ] − recPicture[ $h_{xC+x}$, $v_{yC+y+1}$ ] |
  Otherwise,
   varTempV[ x ][ y ] = 0
 - The variable varTempD0[ x ][ y ] with x, y = − 2..(nS) + 1 is derived as
  If ( ( abs( x ) % 2 = = 0 ) && ( abs( y ) % 2 = = 0 ) ) or ( ( abs( x ) % 2 = = 1 ) && ( abs( y ) % 2 = = 1 ) ) is TRUE, then
  varTempD0[ x ][ y ] = | (recPicture[ $h_{xC+x}$, $v_{yc+y}$ ] << 1 ) − recPicture[ $h_{xC+x-1}$, $v_{yC+y-1}$ ] − recPicture[ $h_{xC+x+1}$, $v_{yC+y+1}$ ] |
  Otherwise,
   varTempD0[ x ][ y ] = 0
 - The variable varTempD1[ x ][ y ] with x, y = − 2..(nS) + 1 is derived as
  If ( ( abs( x ) % 2 = 0 ) && ( abs( y ) % 2 = = 1 ) or ( ( abs( x ) % 2 = = 1 ) && ( abs( y ) % 2 = = 0 ) ) is TRUE, then
  varTempD1[ x ][ y ] = | ( recPicture[ $h_{xC+x}$, $v_{yC+y}$ ] << 1 ) − recPicture[ $h_{xC+1}$, $v_{yC+y-1}$ ] − recPicture[ $h_{xC+x-1}$, $v_{yC+y+1}$ ] |
  Otherwise,
   varTempD1[ x ][ y ] = 0
2. The variables varTempH1[ x, y ], varTempV1[ x, y ], varTempD01[ x, y ], varTempD11[ x, y ] and varTemp[ x, y ] with x, y = 0..( (nS) − 1 ) >> 2 are derived as
 varTempH1[ x ][ y ] = $\Sigma_i\Sigma_j$ varTempH[ (x << 2 ) + i ][ (y << 2) + j ] with i, j = −2..5
 varTempV1[ x ][ y ] = $\Sigma_i\Sigma_j$ varTempV[ (x << 2 ) + i ][ (y << 2) + j ] with i, j = −2..5
 varTempD01[ x ][ y ] = $\Sigma_i\Sigma_j$ varTempD0[ (x << 2 ) + i ][ (y << 2) + j ] with i, j = −2..5
 varTempD11[ x ][ y ] = $\Sigma_i\Sigma_j$ varTempD1[ (x << 2 ) + i ][ (y << 2) + j ] with i, j = −2..5
 varTemp[ x ][ y ] = varTempH1[ x ][ y ] + varTempV1[ x ][ y ]
3. The variables mainDirection, secondaryDirection and directionStrength with x, y = 0..(nS) − 1 are derived as
 - If varTempV1[ x >> 2 ][ y >> 2 ] is greater than varTempH1[ x >> 2 ][ y >> 2 ], then
   hv1 = varTempV1[ x >> 2 ][ y >> 2 ]
   hv0 = varTempH1[ x >> 2 ][ y >> 2 ]
   directionHV = 1
 - Otherwise,
   hv1 = varTempH1[ x >> 2 ][ y >> 2 ]
   hv0 = varTempV1[ x >> 2 ][ y >> 2 ]
   directionHV = 3
 - If varTempD0[ x >> 2 ][ y >> 2 ] is greater than varTempD1[ x >> 2 ][ y >> 2 ], then
   d1 = varTempD0[ x >> 2 ][ y >> 2 ]
   d0 = varTempD1[ x >> 2 ][ y >> 2 ]
   directionD = 0
 - Otherwise,
   d1 = varTempD1[ x >> 2 ][ y >> 2 ]
   d0 = varTempD0[ x >> 2 ][ y >> 2 ]
   directionD = 2
 - If d1 * hv0 > hv1 * d0, then
   hvd1 = d1
   hvd0 = d0
   mainDirection = directionD
   secondaryDirection = directionHV

TABLE 3-continued

Derivation process for filter index array for luma samples

- Otherwise,
    hvd1 = hv1
    hvd0 = hv0
    mainDirection = directionHV
    secondaryDirection = directionD
  The variable directionStrength is set equal 0, and the following applies:
- If hvd1 > 2 * hvd0
    directionStrength = 1
- If hvd1 * 2 > 9 * hvd0
    directionStrength = 2

4. The variable avgVar is derived as
    varTab[16] = { 0, 1, 2, 2, 2, 2, 3, 3, 3, 3, 3, 3, 3, 3, 3, 4 }  (?-??)
    avgVar = varTab[ Clip3( 0, 15, ( varTemp[ x >> 2 ][ y >> 2 ] * 64 ) >> ( 3 + BitDepth$_Y$ ) ) ]  (?-??)

5. The filter index classIdx[ x, y ] with x, y = 0..(nS)−1 is derived as
    transposeTable[8] = { 0, 1, 0, 2, 2, 3, 1, 3 }
    transposeIdx[ x ][ y ] = transposeTable[ mainDirection * 2 + ( secondaryDirection >> 1 ) ]
    classIdx[ x ][ y ] = avgVar
    - If directionStrength is not equal 0, then
        classIdx[ x ][ y ] += ( ( ( mainDirection & 0x1 ) << 1 ) + directionStrength ) * 5  (?-??)

TABLE 4

8.5.3.6 Derivation process for ALF transpose and filter index for luma samples Inputs of this process are:
- a luma location ( xCtb, yCtb ) specifying the top-left sample of the current luma coding tree block relative to the top left sample of the current picture,
- a reconstructed luma picture sample array recPicture, prior to the adaptive loop filtering process.

Outputs of this process are
- the classification filter index array filtIdx[ x ][ y ] with x, y = 0..CtbSizeY − 1,
- the transpose index array transposeIdx[ x ][ y ] with x, y = 0..CtbSizeY − 1.

The locations ( h$_x$, v$_y$ ) for each of the corresponding luma samples ( x, y ) inside the given array recPicture of luma samples are derived as follows:

$h_x$ = Clip3( 0, pic_width_in_luma_samples − 1, x )  (8-435)
$v_y$ = Clip3( 0, pic_height_in_luma_samples − 1, y )  (8-436)

The classification filter index array filtIdx and the transpose index array transposeIdx are derived by the following ordered steps:

1. The variables varTempH[ x ][ y ], varTempV[ x ][ y ], varTempD0[ x ][ y ] and varTempD1[ x ][ y ] with x, y = − 2..CtbSizeY + 1 are derived as follows:
    If ( Abs( y ) % 2 ) is equal to 0, then
        varTempH[ x ][ y ] = Abs( ( recPicture[ h$_{xC+x}$, v$_{yC+y}$ ] << 1 )  (8-437)
            − recPicture[ h$_{xC+x-1}$, v$_{yC+y}$ ] − recPicture[ h$_{xC+x+1}$, v$_{yC+y}$ ] )
    If ( Abs( x ) % 2 ) is equal to 0, then
        varTempV[ x ][ y ] = Abs( ( recPicture[ h$_{xC+x}$, v$_{yC+y}$ ] << 1 )  (8-438)
            − recPicture[ h$_{xC+x}$, v$_{yC+y-1}$ ] − recPicture[ h$_{xC+x}$, v$_{yC+y+1}$ ] )
    If ( ( Abs( x ) + Abs( y ) ) % 2) is equal to 0, then
        varTempD0[ x ][ y ] = Abs( ( recPicture[ h$_{xC+x}$, v$_{yC+y}$ ] << 1 )  (8-439)
            − recPicture[ h$_{xC+x-1}$, v$_{yC+y-1}$ ] − recPicture[ h$_{xC+x+1}$, v$_{yC+y+1}$ ] )
    If ( ( Abs( x ) + Abs( y ) ) % 2) is equal to 1, then
        varTempD1[ x ][ y ] = Abs( ( recPicture[ h$_{xC+x}$, v$_{yC+y}$ ] << 1 )  (8-440)
            − recPicture[ h$_{xC+x+1}$, v$_{yC+y-1}$ ] − recPicture[ h$_{xC+x-1}$, v$_{yC+y+1}$ ] )

2. The variables varTempH1[ x ][ y ], varTempV1[ x ][ y ], varTempD01[ x ][ y ], varTempD11[ x ][ y ] and varTemp[ x ][ y ] with x, y = 0..( CtbSizeY − 1 ) >> 2 are derived as follows:
    varTempH1[ x ][ y ] = Σ$_i$Σ$_j$ varTempH[ (x << 2 ) + i ][ (y << 2) + j ] with i, j = −2..5  (8-441)
    varTempV1[ x ][ y ] = Σ$_i$Σ$_j$ varTempV[ (x << 2 ) + i ][ (y << 2) + j ] with i, j = −2..5  (8-442)
    varTempD01[ x ][ y ] = Σ$_i$Σ$_j$ varTempD0[ (x << 2 ) + i ][ (y << 2) + j ] with i, j = −2..5  (8-443)
    varTempD11[ x ][ y ] = Σ$_i$Σ$_j$ varTempD1[ (x << 2 ) + i ][ (y << 2) + j ] with i, j = −2..5  (8-444)
    varTemp[ x ][ y ] = varTempH1[ x ][ y ] + varTempV1[ x ][ y ]  (8-445)

3. The variables mainDirection, secondaryDirection and directionStrength with x, y = 0..CtbSizeY
4. The variables mainDirection, secondaryDirection and directionStrength with x, y = 0..CtbSizeY − 1 are derived as follows:
    - The variables hv1, hv0 and directionHV are derived as follows:
        - If varTempV1[ x >> 2 ][ y >> 2 ] is greater than varTempH1[ x >> 2 ][ y >> 2 ], the following applies:
            hv1 = varTempV1[ x >> 2 ][ y >> 2 ]  (8-446)
            hv0 = varTempH1[ x >> 2 ][ y >> 2 ]  (8-447)
            directionHV = 1  (8-448)
        - Otherwise, the following applies:
            hv1 = varTempH1[ x >> 2 ][ y >> 2 ]  (8-449)
            hv0 = varTempV1[ x >> 2 ][ y >> 2 ]  (8-450)
            directionHV = 3  (8-451)
    - The variables d1, d0 and directionD are derived as follows:
        - If varTempD0[ x >> 2 ][ y >> 2 ] is greater than varTempD1[ x >> 2 ][ y >> 2 ], the following applies:
            d1 = varTempD0[ x >> 2 ][ y >> 2 ]  (8-452)

TABLE 4-continued

8.5.3.6 Derivation process for ALF transpose and filter index for luma samples d0 = varTempD1[ x >> 2 ][ y >> 2 ]   (8-453)
        directionD = 0   (8-454)
    - Otherwise, the following applies:
        d1 = varTempD1[ x >> 2 ][ y >> 2 ]   (8-455)
        d0 = varTempD0[ x >> 2 ][ y >> 2 ]   (8-456)
        directionD = 2   (8-457)
  - The variables hvd1, hvd0, are derived as follows:
        hvd1 = ( d1 * hv0 > hv1 * d0 ) ? d1 : hv1   (8-458)
        hvd0 = ( d1 * hv0 > hv1 * d0 ) ? d0 : hv0   (8-459)
  - The variables directionStrength, mainDirection and secondaryDirection are derived as follows:
        mainDirection = ( d1 * hv0 > hv1 * d0 ) ? directionD : directionHV   (8-460)
        secondaryDirection = ( d1 * hv0 > hv1 * d0 ) ? direction : HVdirectionD   (8-461)
        directionStrength = ( hvd1 > 2 * hvd0 ) ? 1 : ( ( hvd1 * 2 > 9 * hvd0 ) ? 2 : 0 )   (8-462)

5. The variable avgVar is derived as follows:
        varTab[ ] = { 0, 1, 2, 2, 2, 2, 2, 3, 3, 3, 3, 3, 3, 3, 3, 4 }   (8-463)
        avgVar = varTab[ Clip3( 0, 15, ( varTemp[ x >> 2 ][ y >> 2 ] * 64 ) >> ( 3 + $BitDepth_Y$ ) ) ]   (8-464)

6. The classification filter index array filtIdx[ x ][ y ] and the transpose index array transposeIdx[ x ][ y ] with x = y = 0..CtbSizeY − 1 are derived as follows:
        transposeTable[ ] = { 0, 1, 0, 2, 2, 3, 1, 3 }
        transposeIdx[ x ][ y ] = transposeTable[ mainDirection * 2 + ( secondaryDirection >> 1 ) ]
        filtIdx[ x ][ y ] = avgVar
    When directionStrength is not equal 0, filtIdx[ x ][ y ] is modified as follows:
        filtIdx[ x ][ y ] += ( ( ( mainDirection & 0x1 ) << 1 ) + directionStrength ) * 5   (8-465)

TABLE 5

8.5.3.7 Derivation process for ALF transpose and filter index for luma samples Inputs of this process are:
- a luma location ( xCtb, yCtb ) specifying the top-left sample of the current luma coding tree block relative to the top left sample of the current picture,
- a reconstructed luma picture sample array recPicture, prior to the adaptive loop filtering process.

Outputs of this process are
- the classification filter index array filtIdx[ x ][ y ] with x, y = 0..CtbSizeY − 1,
- the transpose index array transposeIdx[ x ][ y ] with x, y = 0..CtbSizeY − 1.

The locations ( $h_x$, $v_y$ ) for each of the corresponding luma samples ( x, y ) inside the given array recPicture of luma samples are derived as follows:
        $h_x$ = Clip3( 0, pic_width_in_luma_samples − 1, x )   (8-435)
        $v_y$ = Clip3( 0, pic_height_in_luma_samples − 1, y )   (8-436)

The classification filter index array filtIdx and the transpose index array transposeIdx are derived by the following ordered steps:

1. The variables varTempH[ x ][ y ], varTempV[ x ][ y ], varTempD0[ x ][ y ] and varTempD1[ x ][ y ] with x, y = − 2..CtbSizeY + 1 are derived as follows:
    If ( Abs( y ) % 2 ) is equal to 0, then
        varTempH[ x ][ y ] = Abs( ( recPicture[ $h_{xC+x}$, $v_{yC+y}$ ] << 1 )   (8-437)
                − recPicture[ $h_{xC+x−1}$, $v_{yC+y}$ ] − recPicture[ $h_{xC+x+1}$, $v_{yC+y}$ ] )
    Otherwise,
        varTempH[ x ][ y ] = 0
    If ( Abs( x ) % 2 ) is equal to 0, then
        varTempV[ x ][ y ] = Abs( ( recPicture[ $h_{xC+x}$, $v_{yC+y}$ ] << 1 )   (8-438)
                − recPicture[ $h_{xC+x}$, $v_{yC+y−1}$ ] − recPicture[ $h_{xC+x}$, $v_{yC+y+1}$ ] )
    Otherwise,
        varTempV[ x ][ y ] = 0
    If ( ( Abs( x ) + Abs( y ) ) % 2 ) is equal to 0, then
        varTempD0[ x ][ y ] = Abs( ( recPicture[ $h_{xC+x}$, $v_{yC+y}$ ] << 1 )   (8-439)
                − recPicture[ $h_{xC+x−1}$, $v_{yC+y−1}$ ] − recPicture[ $h_{xC+x+1}$, $v_{yC+y+1}$ ] )
    Otherwise,
        varTempD0[ x ][ y ] = 0
    If ( ( Abs( x ) + Abs( y ) ) % 2 ) is equal to 1, then
        varTempD1[ x ][ y ] = Abs( ( recPicture[ $h_{xC+x}$, $v_{yC+y}$ ] << 1 )   (8-440)
                − recPicture[ $h_{xC+x+1}$, $v_{yC+y−1}$ ] − recPicture[ $h_{xC+x−1}$, $v_{yC+y+1}$ ] )
    Otherwise,
        varTempD1[ x ][ y ] = 0

2. The variables varTempH1[ x ][ y ], varTempV1[ x ][ y ], varTempD01[ x ][ y ], varTempD11[ x ][ y ] and varTemp[ x ][ y ] with x, y = 0..( CtbSizeY − 1 ) >> 2 are derived as follows:
    varTempH1[ x ][ y ] = $\Sigma_i \Sigma_j$ varTempH[ (x << 2) + i ][ (y << 2) + j ] with i, j = −2..5   (8-441)
    varTempV1[ x ][ y ] = $\Sigma_i \Sigma_j$ varTempV[ (x << 2) + i ][ (y << 2) + j ] with i, j = −2..5   (8-442)
    varTempD01[ x ][ y ] = $\Sigma_i \Sigma_j$ varTempD0[ (x << 2) + i ][ (y << 2) + j ] with i, j = −2..5   (8-443)
    varTempD11[ x ][ y ] = $\Sigma_i \Sigma_j$ varTempD1[ (x << 2) + i ][ (y << 2) + j ] with i, j = −2..5   (8-444)
    varTemp[ x ][ y ] = varTempH1[ x ][ y ] + varTempV1[ x ][ y ]   (8-445)

3. The variables mainDirection, secondaryDirection and directionStrength with x, y = 0..CtbSizeY)

4. The variables mainDirection, secondaryDirection and directionStrength with x, y = 0..CtbSizeY − 1 are derived as follows:

TABLE 5-continued 8.5.3.7 Derivation process for ALF transpose and filter index for luma samples

- The variables hv1, hv0 and directionHV are derived as follows:
    - If varTempV1[ x >> 2 ][ y >> 2 ] is greater than varTempH1[ x >> 2 ][ y >> 2 ], the
      following applies:
        hv1 = varTempV1[ x >> 2 ][ y >> 2 ]                                              (8-446)
        hv0 = varTempH1[ x >> 2 ][ y >> 2 ]                                              (8-447)
        directionHV = 1                                                                  (8-448)
    - Otherwise, the following applies:
        hv1 = varTempH1[ x >> 2 ][ y >> 2]                                               (8-449)
        hv0 = varTempV1[ x >> 2 ][ y >> 2 ]                                              (8-450)
        directionHV = 3                                                                  (8-451)
- The variables d1, d0 and directionD are derived as follows:
    - If varTempD0[ x >> 2 ][ y >> 2 ] is greater than varTempD1[ x >> 2 ][ y >> 2 ], the
      following applies:
        d1 = varTempD0[ x >> 2 ][ y >> 2 ]                                               (8-452)
        d0 = varTempD1[ x >> 2 ][ y >> 2 ]                                               (8-453)
        directionD = 0                                                                   (8-454)
    - Otherwise, the following applies:
        d1 = varTempD1[ x >> 2 ][ y >> 2 ]                                               (8-455)
        d0 = varTempD0[ x >> 2 ][ y >> 2 ]                                               (8-456)
        directionD = 2                                                                   (8-457)
- The variables hvd1, hvd0, are derived as follows:
    hvd1 = ( d1 * hv0 > hv1 * d0 ) ? d1 : hv1                                            (8-458)
    hvd0 = ( d1 * hv0 > hv1 * d0 ) ? d0 : hv0                                            (8-459)
- The variables directionStrength, mainDirection and secondaryDirectionare derived as follows:
    mainDirection = ( d1 * hv0 > hv1 * d0 ) ? directionD : directionHV                   (8-460)
    secondaryDirection = ( d1 * hv0 > hv1 * d0 ) ? direction : HVdirectionD              (8-461)
    directionStrength = ( hvd1 > 2 * hvd0 ) ? 1 : ( ( hvd1 * 2 > 9 * hvd0 ) ? 2 : 0 )
                                                                                         (8-462)
5. The variable avgVar is derived as follows:
    varTab[ ] = { 0, 1, 2, 2, 2, 2, 2, 3, 3, 3, 3, 3, 3, 3, 3, 4 }                       (8-463)
    avgVar = varTab[ Clip3( 0, 15, ( varTemp[ x >> 2 ][ y >> 2 ] * 64 ) >> ( 3 + BitDepth$_Y$ ) ) ]   (8-464)
6. The classification filter index array filtIdx[ x ][ y ] and the transpose index array transposeIdx[ x ][ y ]
   with x = y = 0..CtbSizeY − 1 are derived as follows:
    transposeTable[ ] = { 0, 1, 0, 2, 2, 3, 1, 3 }
    transposeIdx[ x ][ y ] = transposeTable[ mainDirection * 2 + ( secondaryDirection >> 1 ) ]
    filtIdx[ x ][ y ] = avgVar
    When directionStrength is not equal 0, filtIdx[ x ][ y ] is modified as follows:
    filtIdx[ x ][ y ] += ( ( ( mainDirection & 0x1 ) << 1 ) + directionStrength ) * 5    (8-465)

Referring to FIG. 40, in the case of block classification on a per 4×4-size block basis, at least one of the sums $g_v$, $g_h$, $g_{d1}$, and $g_{d2}$ of the gradient values for the vertical direction, the horizontal direction, the first diagonal direction, and the second diagonal direction is calculated on the basis of subsampling (hereinafter, referred to as "second method"). Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the horizontal direction, the vertical direction, the first diagonal direction, and the second diagonal direction at positions V, H, D1, and D2, respectively. In addition, positions at which the one-dimensional Laplacian operations are performed may be sub-sampled positions. In FIG. 40, the block class indices C are allocated on a per 4×4-size block (that is shaded) basis. In this case, an operation range in which the one-dimensional Laplacian sum is calculated may be larger than the size of the block classification unit. Here, a thin solid-line rectangle represents a reconstructed sample position, and a thick solid-line rectangle represents an operation range in which the one-dimensional Laplacian sum is calculated.

Specifically, the second method means that the one-dimensional Laplacian operation is performed at the position (x, y) when both the coordinate x value and the coordinate y value are even numbers, or when both the coordinate x value and the coordinate y value are odd numbers. When neither the coordinate x value nor the coordinate y value is an even number, or when neither the coordinate x value nor the coordinate y value is an odd number, the one-dimensional Laplacian operation result at the position (x, y) is allocated zero. That is, it means that the one-dimensional Laplacian operation is performed with a checkerboard pattern according to the coordinate x value and the coordinate y value.

Referring to FIG. 40, the positions at which the one-dimensional Laplacian operations are performed are the same for the horizontal direction, the vertical direction, the first diagonal direction, and the second diagonal directions. That is, the one-dimensional Laplacian operations for the respective directions are performed using a unified sub-sampled one-dimensional Laplacian operation position irrespective of the directions of the vertical, horizontal, first diagonal, and second diagonal directions.

Here, Table 6 illustrates one exemplary block classification-based encoding/decoding process using the second method. Table 7 illustrates another exemplary block classification-based encoding/decoding process using the second method. Table 8 illustrates a further exemplary block classification-based encoding/decoding process using the first method. Table 9 illustrates a further exemplary block classification-based encoding/decoding process using the first method.

TABLE 6

Derivation process for filter index array for luma samples

Inputs of this process are:
- a luma location ( xC, yC ) specifying the top-left luma sample of the current coding tree block relative to the top left luma sample of the current picture,
- a variable log2CbSize specifying the size of the current coding tree block.
- a reconstructed luma picture sample array recPicture prior to the adaptive loop filtering process.

Output of this process is the two-dimensional classification index array of (nS)x(nS), classIdx, transposeIdx.

A variable nS is set equal to ( 1 << log2CbSize ).
The locations ( $h_x$, $v_y$ ) for each of the corresponding luma samples ( x, y ) inside the given array recPicture of luma samples are derived as follows:
$\quad h_x$ = Clip3( 0, pic_width_in_luma_samples − 1, x )
$\quad v_y$ = Clip3( 0, pic_height_in_luma_samples − 1, y )

The classification filter index array classIdx is specified as following:
1. The variables varTempH[ x ][ y ], varTempV[ x ][ y ], varTempD0[ x ][ y ] and varTempD1[ x ][ y ] with x, y = − 2..(nS) + 1 are derived as
   If ( ( abs( x ) % 2 = = 0 ) && ( abs( y ) % 2 = = 0 ) ) or ( ( abs( x ) % 2 = = 1 ) && ( abs( y ) % 2 = = 1 ) ) is TRUE, then
   $\quad$ varTempH[ x ][ y ] = | (recPicture[ $h_{xC+x}$, $v_{yC+y}$ ] << 1 ) − recPicture[ $h_{xC+x-1}$, $v_{yC+y}$ ] − recPicture[ $h_{xC+x+1}$, $v_{yC+y}$ ] |
   $\quad$ varTempV[ x ][ y ] = | ( recPicture[ $h_{xC+x}$, $v_{yC+y}$ ] << 1 ) − recPicture[ $h_{xC+x}$, $v_{yC+y-1}$ ] − recPicture[ $h_{xC+x}$, $v_{yC+y+1}$ ] |
   $\quad$ varTempD0[ x ][ y ] = | (recPicture[ $h_{xC+x}$, $v_{yC+y}$ ] << 1 ) − recPicture[ $h_{xC+x-1}$, $v_{yC+y-1}$ ] − recPicture[ $h_{xC+x+1}$, $v_{yC+y+1}$ ] |
   $\quad$ varTempD1[ x ][ y ] = | ( recPicture[ $h_{xC+x}$, $v_{yC+y}$ ] << 1 ) − recPicture[ $h_{xC+x+1}$, $v_{yC+y-1}$ ] − recPicture[ $h_{xC+x-1}$, $v_{yC+y+1}$ ] |
   Otherwise,
   $\quad$ varTempH[ x ][ y ] = 0
   $\quad$ varTempV[ x ][ y ] = 0
   $\quad$ varTempD0[ x ][ y ] = 0
   $\quad$ varTempD1[ x ][ y ] = 0
2. The variables varTempH1[ x, y ], varTempV1[ x, y ], varTempD01[ x, y ], varTempD11[ x, y ] and varTemp[ x, y ] with x, y = 0..( (nS) − 1 ) >> 2 are derived as
   varTempH1[ x ][ y ] = $\Sigma_i \Sigma_j$ varTempH[ (x << 2 ) + i ][ (y << 2) + j ] with i, j = −2..5
   varTempV1[ x ][ y ] = $\Sigma_i \Sigma_j$ varTempV[ (x << 2 ) + i ][ (y << 2) + j ] with i, j = −2..5
   varTempD01[ x ][ y ] = $\Sigma_i \Sigma_j$ varTempD0[ (x << 2 ) + i ][ (y << 2) + j ] with i, j = −2..5
   varTempD11[ x ][ y ] = $\Sigma_i \Sigma_j$ varTempD1[ (x << 2 ) + i ][ (y << 2) + j ] with i, j = −2..5
   varTemp[ x ][ y ] = varTempH1[ x ][ y ] + varTempV1[ x ][ y ]
3. The variables mainDirection, secondaryDirection and directionStrength with x, y = 0..(nS) − 1 are derived as
   - If varTempV1[ x >> 2 ][ y >> 2 ] is greater than varTempH1[ x >> 2 ][ y >> 2 ], then
     $\quad$ hv1 = varTempV1[ x >> 2 ][ y >> 2 ]
     $\quad$ hv0 = varTempH1[ x >> 2 ][ y >> 2 ]
     $\quad$ directionHV = 1
   - Otherwise,
     $\quad$ hv1 = varTempH1[ x >> 2 ][ y >> 2 ]
     $\quad$ hv0 = varTempV1[ x >> 2 ][ y >> 2 ]
     $\quad$ directionHV = 3
   - If varTempD0[ x >> 2 ][ y >> 2 ] is greater than varTempD1[ x >> 2 ][ y >> 2 ], then
     $\quad$ d1 = varTempD0[ x >> 2 ][ y >> 2]
     $\quad$ d0 = varTempD1[ x >> 2 ][ y >> 2 ]
     $\quad$ directionD = 0
   - Otherwise,
     $\quad$ d1 = varTempD1[ x >> 2 ][ y >> 2 ]
     $\quad$ d0 = varTempD0[ x >> 2 ][ y >> 2 ]
     $\quad$ directionD = 2
   - If d1 * hv0 > hv1 * d0, then
     $\quad$ hvd1 = d1
     $\quad$ hvd0 = d0
     $\quad$ mainDirection = directionD
     $\quad$ secondaryDirection = directionHV
   - Otherwise,
     $\quad$ hvd1 = hv1
     $\quad$ hvd0 = hv0
     $\quad$ mainDirection = directionHV
     $\quad$ secondaryDirection = directionD
   The variable directionStrength is set equal 0, and the following applies:
   - If hvd1 > 2 * hvd0
     $\quad$ directionStrength = 1
   - If hvd1 * 2 > 9 * hvd0
     $\quad$ directionStrength = 2
4. The variable avgVar is derived as
   varTab[16] = { 0, 1, 2, 2, 2, 2, 2, 3, 3, 3, 3, 3, 3, 3, 3, 4 } $\quad$ (?-??)
   avgVar = varTab[ Clip3( 0, 15, ( varTemp[ x >> 2 ][ y >> 2 ] * 64 ) >> ( 3 + BitDepth$_Y$ ) ) ] $\quad$ (?-??)
5. The filter index classIdx[ x, y ] with x, y = 0..(nS)−1 is derived as
   transposeTable[8] = { 0, 1, 0, 2, 2, 3, 1, 3 }

TABLE 6-continued

Derivation process for filter index array for luma samples transposeIdx[ x ][ y ] = transposeTable[ mainDirection * 2 + ( secondaryDirection >> 1 ) ]
classIdx[ x ][ y ] = avgVar
- If directionStrength is not equal 0, then
    classIdx[ x ][ y ] += ( ( ( mainDirection & 0x1 ) << 1 ) + directionStrength ) * 5    (?-??)

TABLE 7

8.5.3.6 Derivation process for ALF transpose and filter index for luma samples

Inputs of this process are:
- a luma location ( xCtb, yCtb ) specifying the top-left sample of the current luma coding tree block relative to the top left sample of the current picture,
- a reconstructed luma picture sample array recPicture, prior to the adaptive loop filtering process.

Outputs of this process are
- the classification filter index array filtIdx[ x ][ y ] with x, y = 0..CtbSizeY − 1,
- the transpose index array transposeIdx[ x ][ y ] with x, y = 0..CtbSizeY − 1.

The locations ( $h_x$, $v_y$ ) for each of the corresponding luma samples ( x, y ) inside the given array recPicture of luma samples are derived as follows:

$h_x$ = Clip3( 0, pic_width_in_luma_samples − 1, x )    (8-435)
    $v_y$ = Clip3( 0, pic_height_in_luma_samples − 1, y )    (8-436)

The classification filter index array filtIdx and the transpose index array transposeIdx are derived by the following ordered steps:

1. The variables varTempH[ x ][ y ], varTempV[ x ][ y ], varTempD0[ x ][ y ] and varTempD1[ x ][ y ] with x, y = − 2..CtbSizeY + 1 are derived as follows:
    If ( ( Abs( x ) + Abs( y ) ) % 2 ) is equal to 0, then
        varTempH[ x ][ y ] = Abs( ( recPicture[ $h_{xC+x}$, $v_{yC+y}$ ] << 1 )    (8-437)
            − recPicture[ $h_{xC+x−1}$, $v_{yC+y}$ ] − recPicture[ $h_{xC+x+1}$, $v_{yC+y}$ ] )
        varTempV[ x ][ y ] = Abs( ( recPicture[ $h_{xC+x}$, $v_{yC+y}$ ] << 1 )    (8-438)
            − recPicture[ $h_{xC+x}$, $v_{yC+y−1}$ ] − recPicture[ $h_{xC+x}$, $v_{yC+y+1}$ ] )
        varTempD0[ x ][ y ] = Abs( ( recPicture[ $h_{xC+x}$, $v_{yC+y}$ ] << 1 )    (8-439)
            − recPicture[ $h_{xC+x−1}$, $v_{yC+y−1}$ ] − recPicture[ $h_{xC+x+1}$, $v_{yC+y+1}$ ] )
        varTempD1[ x ][ y ] = Abs( ( recPicture[ $h_{xC+x}$, $v_{yC+y}$ ] << 1 )    (8-440)
            − recPicture[ $h_{xC+x+1}$, $v_{yC+y−1}$ ] − recPicture[ $h_{xC+x−1}$, $v_{yC+y+1}$ ] )

2. The variables varTempH1[ x ][ y ], varTempV1[ x ][ y ], varTempD01[ x ][ y ], varTempD11[ x ][ y ] and varTemp[ x ][ y ] with x, y = 0..( CtbSizeY − 1 ) >> 2 are derived as follows:
    varTempH1[ x ][ y ] = $\Sigma_i\Sigma_j$ varTempH[ (x << 2 ) + i ][ (y << 2) + j ] with i, j = −2..5    (8-441)
    varTempV1[ x ][ y ] = $\Sigma_i\Sigma_j$ varTempV[ (x << 2 ) + i ][ (y << 2) + j ] with i, j = −2..5    (8-442)
    varTempD01[ x ][ y ] = $\Sigma_i\Sigma_j$ varTempD0[ (x << 2 ) + i ][ (y << 2) + j ] with i, j = −2..5    (8-443)
    varTempD11[ x ][ y ] = $\Sigma_i\Sigma_j$ varTempD1[ (x << 2 ) + i ][ (y << 2) + j ] with i, j = −2..5    (8-444)
    varTemp[ x ][ y ] = varTempH1[ x ][ y ] + varTempV1[ x ][ y ]    (8-445)

3. The variables mainDirection, secondaryDirection and directionStrength with x, y = 0..CtbSizeY)
4. The variables mainDirection, secondaryDirection and directionStrength with x, y = 0..CtbSizeY − 1 are derived as follows:
    - The variables hv1, hv0 and directionHV are derived as follows:
        - If varTempV1[ x >> 2 ][ y >> 2 ] is greater than varTempH1[ x >> 2 ][ y >> 2 ], the following applies:
            hv1 = varTempV1[ x >> 2 ][ y >> 2]    (8-446)
            hv0 = varTempH1[ x >> 2 ][ y >> 2 ]    (8-447)
            directionHV = 1    (8-448)
        - Otherwise, the following applies:
            hv1 = varTempH1[ x >> 2 ][ y >> 2 ]    (8-449)
            hv0 = varTempV1[ x >> 2 ][ y >> 2 ]    (8-450)
            directionHV = 3    (8-451)
    - The variables d1, d0 and directionD are derived as follows:
        - If varTempD0[ x >> 2 ][ y >> 2 ] is greater than varTempD1[ x >> 2 ][ y >> 2 ], the following applies:
            d1 = varTempD0[ x >> 2 ][ y >> 2 ]    (8-452)
            d0 = varTempD1[ x >> 2 ][ y >> 2 ]    (8-453)
            directionD = 0    (8-454)
        - Otherwise, the following applies:
            d1 = varTempD1[ x >> 2 ][ y >> 2 ]    (8-455)
            d0 = varTempD0[ x >> 2 ][ y >> 2 ]    (8-456)
            directionD = 2    (8-457)
    - The variables hvd1, hvd0, are derived as follows:
        hvd1 = ( d1 * hv0 > hv1 * d0 ) ? d1 : hv1    (8-458)
        hvd0 = ( d1 * hv0 > hv1 * d0 ) ? d0 : hv0    (8-459)
    - The variables directionStrength, mainDirection and secondaryDirectionare derived as follows:
        mainDirection = ( d1 * hv0 > hv1 * d0 ) ? directionD : directionHV    (8-460)
        secondaryDirection = ( d1 * hv0 > hv1 * d0 ) ? direction : HVdirectionD    (8-461)
        directionStrength = ( hvd1 > 2 * hvd0 ) ? 1 : ( ( hvd1 * 2 > 9 * hvd0 ) ? 2 : 0 )    (8-462)

5. The variable avgVar is derived as follows:
    varTab[ ] = { 0, 1, 2, 2, 2, 2, 2, 3, 3, 3, 3, 3, 3, 3, 3, 4 }    (8-463)
    avgVar = varTab[ Clip3( 0, 15, ( varTemp[ x >> 2][ y >> 2] * 64 ) >> ( 3 + $BitDepth_Y$ ) ) ]    (8-464)

6. The classification filter index array filtIdx[ x ][ y ] and the transpose index array transposeIdx[ x ][ y ] with x = y = 0..CtbSizeY − 1 are derived as follows:

TABLE 7-continued

8.5.3.6 Derivation process for ALF transpose and filter index for luma samples transposeTable[ ] = { 0, 1, 0, 2, 2, 3, 1, 3 }
transposeIdx[ x ][ y ] = transposeTable[ mainDirection * 2 + ( secondaryDirection >> 1 ) ]
filtIdx[ x ][ y ] = avgVar
When directionStrength is not equal 0, filtIdx[ x ][ y ] is modified as follows:
    filtIdx[ x ][ y ] += ( ( ( mainDirection & 0x1 ) << 1 ) + directionStrength ) * 5     (8-465)

TABLE 8

8.5.3.7 Derivation process for ALF transpose and filter index for luma samples Inputs of this process are:
- a luma location ( xCtb, yCtb ) specifying the top-left sample of the current luma coding tree block relative to the top left sample of the current picture,
- a reconstructed luma picture sample array recPicture, prior to the adaptive loop filtering process.

Outputs of this process are
- the classification filter index array filtIdx[ x ][ y ] with x, y = 0..CtbSizeY − 1,
- the transpose index array transposeIdx[ x ][ y ] with x, y = 0..CtbSizeY − 1.

The locations ( $h_x$, $v_y$ ) for each of the corresponding luma samples ( x, y ) inside the given array recPicture of luma samples are derived as follows:

$h_x$ = Clip3( 0, pic_width_in_luma_samples − 1, x )     (8-435)
    $v_y$ = Clip3( 0, pic_height_in_luma_samples − 1, y )     (8-436)

The classification filter index array filtIdx and the transpose index array transposeIdx are derived by the following ordered steps:

1. The variables varTempH[ x ][ y ], varTempV[ x ][ y ], varTempD0[ x ][ y ] and varTempD1[ x ][ y ] with x, y = − 2..CtbSizeY + 1 are derived as follows:
   If ( ( Abs( x ) + Abs( y ) ) % 2 ) is equal to 0, then
       varTempH[ x ][ y ] = Abs( ( recPicture[ $h_{xC+x}$, $v_{yC+y}$ ] << 1 )
         − recPicture[ $h_{xC+x-1}$, $v_{yC+y}$ ] − recPicture[ $h_{xC+x+1}$, $v_{yC+y}$ ] )     (8-437)
       varTempV[ x ][ y ] = Abs( ( recPicture[ $h_{xC+x}$, $v_{yC+y}$ ] << 1 )
         − recPicture[ $h_{xC+x}$, $v_{yC+y-1}$ ] − recPicture[ $h_{xC+x}$, $v_{yC+y+1}$ ] )     (8-438)
       varTempD0[ x ][ y ] = Abs( ( recPicture[ $h_{xC+x}$, $v_{yC+y}$ ] << 1 )
         − recPicture[ $h_{xC+x-1}$, $v_{yC+y-1}$ ] − recPicture[ $h_{xC+x+1}$, $v_{yC+y+1}$ ] )     (8-439)
       varTempD1[ x ][ y ] = Abs( ( recPicture[ $h_{xC+x}$, $v_{yC+y}$ ] << 1 )
         − recPicture[ $h_{xC+x+1}$, $v_{yC+y-1}$ ] − recPicture[ $h_{xC+x-1}$, $v_{yC+y+1}$ ] )     (8-440)
   Otherwise,
       varTempH[ x ][ y ] = 0
       varTempV[ x ][ y ] = 0
       varTempD0[ x ][ y ] = 0
       varTempD1[ x ][ y ] = 0

2. The variables varTempH1[ x ][ y ], varTempV1[ x ][ y ], varTempD01[ x ][ y ], varTempD11[ x ][ y ] and varTemp[ x ][ y ] with x, y = 0..( CtbSizeY − 1 ) >> 2 are derived as follows:
       varTempH1[ x ][ y ] = $\Sigma_i\Sigma_j$ varTempH[ (x << 2 ) + i ][ (y << 2) + j ]with i, j = −2..5     (8-441)
       varTempV1[ x ][ y ] = $\Sigma_i\Sigma_j$ varTempV[ (x << 2 ) + i ][ (y << 2) + j ] with i, j = −2..5     (8-442)
       varTempD01[ x ][ y ] = $\Sigma_i\Sigma_j$ varTempD0[ (x << 2 ) + i ][ (y << 2) + j ] with i, j = −2..5     (8-443)
       varTempD11[ x ][ y ] = $\Sigma_i\Sigma_j$ varTempD1[ (x << 2 ) + i ][ (y << 2) + j ] with i, j = −2..5     (8-444)
       varTemp[ x ][ y ] = varTempH1[ x ][ y ] + varTempV1[ x ][ y ]     (8-445)

3. The variables mainDirection, secondaryDirection and directionStrength with x, y = 0..CtbSizeY)

4. The variables mainDirection, secondaryDirection and directionStrength with x, y = 0..CtbSizeY − 1 are derived as follows:
   - The variables hv1, hv0 and directionHV are derived as follows:
     - If varTempV1[ x >> 2 ][ y >> 2 ] is greater than varTempH1[ x >> 2 ][ y >> 2 ], the following applies:
           hv1 = varTempV1[ x >> 2 ][ y >> 2 ]     (8-446)
           hv0 = varTempH1[ x >> 2 ][ y >> 2 ]     (8-447)
           directionHV = 1     (8-448)
     - Otherwise, the following applies:
           hv1 = varTempH1[ x >> 2 ][ y >> 2 ]     (8-449)
           hv0 = varTempV1[ x >> 2 ][ y >> 2 ]     (8-450)
           directionHV = 3     (8-451)
   - The variables d1, d0 and directionD are derived as follows:
     - If varTempD0[ x >> 2 ][ y >> 2 ] is greater than varTempD1[ x >> 2 ][ y >> 2 ], the following applies:
           d1 = varTempD0[ x >> 2 ][ y >> 2]     (8-452)
           d0 = varTempD1[ x >> 2 ][ y >> 2 ]     (8-453)
           directionD = 0     (8-454)
     - Otherwise, the following applies:
           d1 = varTempD1[ x >> 2 ][ y >> 2 ]     (8-455)
           d0 = varTempD0[ x >> 2 ][ y >> 2 ]     (8-456)
           directionD = 2     (8-457)
   - The variables hvd1, hvd0, are derived as follows:
         hvd1 = ( d1 * hv0 > hv1 * d0 ) ? d1 : hv1     (8-458)
         hvd0 = ( d1 * hv0 > hv1 * d0 ) ? d0 : hv0     (8-459)
   - The variables directionStrength, mainDirection and secondaryDirectionare derived as follows:
         mainDirection = ( d1 * hv0 > hv1 * d0 ) ? directionD : directionHV     (8-460)
         secondaryDirection = ( d1 * hv0 > hv1 * d0 ) ? direction : HVdirectionD     (8-461)

TABLE 8-continued 8.5.3.7 Derivation process for ALF transpose and filter index for luma samples $\quad$ directionStrength = ( hvd1 > 2 * hvd0 ) ? 1 : ( ( hvd1 * 2 > 9 * hvd0 ) ? 2 : 0 ) $\quad$ (8-462)

5. The variable avgVar is derived as follows:
   varTab[ ] = { 0, 1, 2, 2, 2, 2, 2, 3, 3, 3, 3, 3, 3, 3, 3, 4 } $\quad$ (8-463)
   avgVar = varTab[ Clip3( 0, 15, ( varTemp[ x >> 2 ][ y >> 2 ] * 64 ) >> ( 3 + BitDepth$_Y$ ) ) ] $\quad$ (8-464)
6. The classification filter index array filtIdx[ x ][ y ] and the transpose index array transposeIdx[ x ][ y ]
   with x = y = 0..CtbSizeY − 1 are derived as follows:
   transposeTable[ ] = { 0, 1, 0, 2, 2, 3, 1, 3 }
   transposeIdx[ x ][ y ] = transposeTable[ mainDirection * 2 + ( secondaryDirection >> 1 ) ]
   filtIdx[ x ][ y ] = avgVar
   When directionStrength is not equal 0, filtIdx[ x ][ y ] is modified as follows:
   filtIdx[ x ][ y ] += ( ( ( mainDirection & 0x1 ) << 1 ) + directionStrength ) * 5 $\quad$ (8-465)

TABLE 9

8.5.4.3 Derivation process for ALF transpose and filter index for luma samples

Inputs of this process are:
- a luma location ( xCtb, yCtb ) specifying the top-left sample of the current luma coding tree block relative
  to the top left sample of the current picture,
- a reconstructed luma picture sample array recPicture$_L$ prior to the adaptive loop filtering process.
Outputs of this process are
- the classification filter index array filtIdx[ x ][ y ] with x, y = 0..CtbSizeY − 1,
- the transpose index array transposeIdx[ x ][ y ] with x, y = 0..CtbSizeY − 1.
The locations ( h$_x$, v$_y$ ) for each of the corresponding luma samples ( x, y ) inside the given array recPicture
of luma samples are derived as follows:
$\quad$ h$_x$ = Clip3( 0, pic_width_in_luma_samples − 1, x ) $\quad$ (8-437)
$\quad$ v$_y$ = Clip3( 0, pic_height_in_luma_samples − 1, y ) $\quad$ (8-438)
The classification filter index array filtIdx and the transpose index array transposeIdx are derived by the
following ordered steps:
1. The variables filtH[ x ][ y ], filtV[ x ][ y ], filtD0[ x ][ y ] and filtD1[ x ][ y ] with
   x, y = − 2..CtbSizeY + 1 are derived as follows:
   - If both x and y are even numbers or both x and y are uneven numbers, the following applies:
     filtH[ x ][ y ] = Abs( ( recPicture[ h$_{xCtb+x}$, v$_{yCtb+y}$ ] << 1 ) − recPicture[ h$_{xCtb+x-1}$, v$_{yCtb+y}$ ] − $\quad$ (8-439)
     $\quad$ recPicture[ h$_{xCtb+x+1}$, v$_{yCtb+y}$ ] )
     filtV[ x ][ y ] = Abs( ( recPicture[ h$_{xCtb+x}$, v$_{yCtb+y}$ ] << 1 ) − recPicture[ h$_{xCtb+x}$, v$_{yCtb+y-1}$ ] − $\quad$ (8-440)
     $\quad$ recPicture[ h$_{xCtb+x}$, v$_{yCtb+y+1}$ ] )
     filtD0[ x ][ y ] = Abs( ( recPicture[ h$_{xCtb+x}$, v$_{yCtb+y}$ ] << 1 ) − recPicture[ h$_{xCtb+x-1}$, v$_{yCtb+y-1}$ ] − $\quad$ (8-441)
     $\quad$ recPicture[ h$_{xCtb+x+1}$, v$_{yCtb+y+1}$ ] )
     filtD1[ x ][ y ] = Abs( ( recPicture[ h$_{xCtb+x}$, v$_{yCtb+y}$ ] << 1 ) − recPicture[ h$_{xCtb+x+1}$, v$_{yCtb+y-1}$ ] − $\quad$ (8-442)
     $\quad$ recPicture[ h$_{xCtb+x-1}$, v$_{yCtb+y+1}$ ] )
   - Otherwise, filtH[ x ][ y ], filtV[ x ][ y ], filtD0[ x ][ y ] and filtD1[ x ][ y ] are set equal to 0.
2. The variables varTempH1[ x ][ y ], varTempV1[ x ][ y ], varTempD01[ x ][ y ], varTempD11[ x ][ y ]
   and varTemp[ x ][ y ] with x, y = 0..( CtbSizeY − 1 ) >> 2 are derived as follows:
   sumH[ x ][ y ] = Σ$_i$Σ$_j$ filtH[ (x << 2 ) + i ][ (y << 2) + j ] with i, j = −2..5 $\quad$ (8-443)
   sumV[ x ][ y ] = Σ$_i$Σ$_j$ filtV[ (x << 2 ) + i ][ (y << 2) + j ] with i, j = −2..5 $\quad$ (8-444)
   sumD0[ x ][ y ] = Σ$_i$Σ$_j$ filtD0[ (x << 2 ) + i ][ (y << 2) + j ] with i, j = −2..5 $\quad$ (8-445)
   sumD1[ x ][ y ] = Σ$_i$Σ$_j$ filtD1[ (x << 2 ) + i ][ (y << 2) + j ] with i, j = −2..5 $\quad$ (8-446)
   sumOfHV[ x ][ y ] = sumH[ x ][ y ] + sumV[ x ][ y ] $\quad$ (8-447)
3. The variables dir1[ x ][ y ], dir2[ x ][ y ] and dirS[ x ][ y ] with x, y = 0..CtbSizeY − 1 are derived as
follows:
- The variables hv1, hv0 and dirHV are derived as follows:
  - If sumV[ x >> 2 ][ y >> 2 ] is greater than sumH[ x >> 2 ][ y >> 2], the following
    applies:
    hv1 = sumV[ x >> 2 ][ y >> 2 ] $\quad$ (8-448)
    hv0 = sumH[ x >> 2 ][ y >> 2 ] ( $\quad$ 8-449)
    dirHV = 1 $\quad$ (8-450)
  - Otherwise, the following applies:
    hv1 = sumH[ x >> 2 ][ y >> 2 ] $\quad$ (8-451)
    hv0 = sumV[ x >> 2 ][ y >> 2 ] (8-452)
    dirHV = 3 $\quad$ (8-453)
- The variables d1, d0 and dirD are derived as follows:
  - If sumD0[ x >> 2 ][ y >> 2 ] is greater than sumD1[ x >> 2 ][ y >> 2 ], the following
    applies:
    d1 = sumD0[ x >> 2 ][ y >> 2 ](8-454)
    d0 = sumD1[ x >> 2 ][ y >> 2 ] (8-455)
    dirD = 0 $\quad$ (8-456)
  - Otherwise, the following applies:
    d1 = sumD1[ x >> 2 ][ y >> 2 ](8-457)
    d0 = sumD0[ x >> 2 ][ y >> 2 ] (8-458)
    dirD = 2 $\quad$ (8-459)
- The variables hvd1, hvd0, are derived as follows:
  hvd1 = ( d1 * hv0 > hv1 * d0 ) ? d1 : hv1 $\quad$ (8-460)
  hvd0 = ( d1 * hv0 > hv1 * d0 ) ? d0 : hv0 $\quad$ (8-461)
- The variables dirS[ x ][ y ], dir1[ x ][ y ] and dir2[ x ][ y ] derived as follows:

TABLE 9-continued 8.5.4.3 Derivation process for ALF transpose and filter index for luma samples

```
        dir1[ x ][ y ] = ( d1 * hv0 > hv1 * d0 ) ? dirD : dirHV                              (8-462)
        dir2[ x ][ y ] = ( d1 * hv0 > hv1 * d0 ) ? dirHV : dirD                              (8-463)
        dirS[ x ][ y ] = ( hvd1 > 2 * hvd0 ) ? 1 : ( ( hvd1 * 2 > 9 * hvd0 ) ? 2 : 0 )       (8-464)
4. The variable avgVar[ x ][ y ] with x, y = 0..CtbSizeY − 1 is derived as follows:
        varTab[ ] = { 0, 1, 2, 2, 2, 2, 2, 3, 3, 3, 3, 3, 3, 3, 3, 4 }                       (8-465)
        avgVar[ x ][ y ] = varTab[ Clip3( 0, 15, ( sumOfHV[ x >> 2 ][ y >>
        2 ] * 64 ) >> ( 3 + BitDepth_Y ) ) ] (8-466)
5. The classification filter index array filtIdx[ x ][ y ] and the transpose index array transposeIdx[ x ][ y ]
    with x = y = 0..CtbSizeY − 1 are derived as follows:
        transposeTable[ ] = { 0, 1, 0, 2, 2, 3, 1, 3 }
        transposeIdx[ x ][ y ] = transposeTable[ dir1[ x ][ y ] * 2 + ( dir2[ x ][ y ] >> 1 ) ]
        filtIdx[ x ][ y ] = avgVar[ x ][ y ]
    When dirS[ x ][ y ] is not equal 0, filtIdx[ x ][ y ] is modified as follows:
        filtIdx[ x ][ y ] += ( ( ( dir1[ x ][ y ] & 0x1 ) << 1 ) + dirS[ x ][ y ] ) * 5      (8-467)
```

Referring to FIG. 41, in the case of block classification on a per 4×4-size block basis, at least one of the sums $g_v$, $g_h$, $g_{d1}$, and $g_{d2}$ of the gradient values for the vertical direction, the horizontal direction, the first diagonal direction, and the second diagonal direction is calculated on the basis of subsampling (hereinafter, referred to as "third method"). Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the horizontal direction, the vertical direction, the first diagonal direction, and the second diagonal direction at positions V, H, D1, and D2, respectively. In addition, positions at which the one-dimensional Laplacian operations are performed may be sub-sampled positions. In FIG. 41, the block class indices C are allocated on a per 4×4-size block (that is shaded) basis. In this case, an operation range in which the one-dimensional Laplacian sum is calculated may be larger than the size of the block classification unit. Here, a thin solid-line rectangle represents a reconstructed sample position, and a thick solid-line rectangle represents an operation range in which the one-dimensional Laplacian sum is calculated.

Specifically, the third method means that the one-dimensional Laplacian operation is performed at the position (x, y) when either one of the coordinate x value and the coordinate y value is an even number and the other is an odd number. When both of the coordinate x value and the coordinate y value are even numbers or odd numbers, the one-dimensional Laplacian operation result at the position (x, y) is allocated zero. That is, it means that the one-dimensional Laplacian operation is performed with a checkerboard pattern according to the coordinate x value and the coordinate y value.

Referring to FIG. 41, the positions at which the one-dimensional Laplacian operations are performed are the same for the horizontal direction, the vertical direction, the first diagonal direction, and the second diagonal directions. That is, the one-dimensional Laplacian operations for the respective directions are performed using a unified sub-sampled one-dimensional Laplacian operation position irrespective of the directions.

Here, Table 10 illustrates an exemplary block classification-based encoding/decoding process using the third method. Table 11 illustrates another exemplary block classification-based encoding/decoding process using the third method. Table 12 illustrates a further exemplary block classification-based encoding/decoding process using the third method.

TABLE 10

Derivation process for filter index array for luma samples

```
Inputs of this process are:
 - a luma location ( xC, yC ) specifying the top-left luma sample of the current coding tree block
     relative to the top left luma sample of the current picture,
 - a variable log2CbSize specifying the size of the current coding tree block.
 - a reconstructed luma picture sample array recPicture prior to the adaptive loop filtering process.
Output of this process is the two-dimensional classification index array of (nS)×(nS), classIdx,
     transposeIdx.
A variable nS is set equal to ( 1 << log2CbSize ).
The locations ( h_x, v_y ) for each of the corresponding luma samples ( x, y ) inside the given array recPicture
of luma samples are derived as follows:
        h_x = Clip3( 0, pic_width_in_luma_samples − 1, x )
        v_y = Clip3( 0, pic_height_in_luma_samples − 1, y )
The classification filter index array classIdx is specified as following:
  1. The variables varTempH[ x ][ y ], varTempV[ x ][ y ], varTempD0[ x ][ y ] and varTempD1[ x ][ y ] with
         x, y = − 2..(nS) + 1 are derived as
         If ( ( abs( x ) % 2 = = 0 ) && ( abs( y ) % 2 = = 1 ) ) or
         ( ( abs( x ) % 2 = = 1 ) && ( abs( y ) % 2 = = 0 ) ) is TRUE, then
             varTempH[ x ][ y ] = | (recPicture[ h_{xC+x}, v_{yC+y} ] << 1 ) − recPicture[ h_{xC+x−1}, v_{yC+y} ] −
                  recPicture[ h_{xC+x+1}, v_{yC+y} ] |
             varTempV[ x ][ y ] = | ( recPicture[ h_{xC+x}, v_{yC+y} ] << 1 ) −
                  recPicture[ h_{xC+x}, v_{yC+y−1} ] − recPicture[ h_{xC+x}, v_{yC+y+1} ] |
             varTempD0[ x ][ y ] = | (recPicture[ h_{xC+x}, v_{yC+y} ] << 1 ) −
                  recPicture[ h_{xC+x−1}, v_{yC+y−1} ] − recPicture[ h_{xC+x+1}, v_{yC+y+1} ] |
             varTempD1[ x ][ y ] = | ( recPicture[ h_{xC+x}, v_{yC+y} ] << 1 ) −
```

TABLE 10-continued

Derivation process for filter index array for luma samples $\quad\quad\quad\quad$ recPicture[ $h_{xC+x+1}$, $v_{yC+y-1}$ ] − recPicture[ $h_{xC+x-1}$, $v_{yC+y+1}$ ] |
$\quad$ Otherwise,
$\quad\quad$ varTempH[ x ][ y ] = 0
$\quad\quad$ varTempV[ x ][ y ] = 0
$\quad\quad$ varTempD0[ x ][ y ] = 0
$\quad\quad$ varTempD1[ x ][ y ] = 0
2. The variables varTempH1[ x, y ], varTempV1[ x, y ], varTempD01[ x, y ], varTempD11[ x, y ] and
$\quad$ varTemp[ x, y ] with x, y = 0..( (nS) − 1 ) > 2 are derived as
$\quad\quad$ varTempH1[ x ][ y ] = $\Sigma_i\Sigma_j$ varTempH[ (x << 2 ) + i ][ (y << 2) + j ] with i, j = −2..5
$\quad\quad$ varTempV1[ x ][ y ] = $\Sigma_i\Sigma_j$ varTempV[ (x << 2 ) + i ][ (y << 2) + j ] with i, j = −2..5
$\quad\quad$ varTempD01[ x ][ y ] = $\Sigma_i\Sigma_j$ varTempD0[ (x << 2 ) + i ][ (y << 2) + j ] with i, j = −2..5
$\quad\quad$ varTempD11[ x ][ y ] = $\Sigma_i\Sigma_j$ varTempD1[ (x << 2 ) + i ][ (y << 2) + j ] with i, j = −2..5
$\quad\quad$ varTemp[ x ][ y ] = varTempH1[ x ][ y ] + varTempV1[ x ][ y ]
3. The variables mainDirection, secondaryDirection and directionStrength with x, y = 0..(nS) − 1 are
$\quad$ derived as
$\quad$ - If varTempV1[ x >> 2 ][ y >> 2 ] is greater than varTempH1[ x >> 2 ][ y >> 2 ], then
$\quad\quad$ hv1 = varTempV1[ x >> 2 ][ y >> 2 ]
$\quad\quad$ hv0 = varTempH1[ x >> 2 ][ y >> 2 ]
$\quad\quad$ directionHV = 1
$\quad$ - Otherwise,
$\quad\quad$ hv1 = varTempH1[ x >> 2 ][ y >> 2 ]
$\quad\quad$ hv0 = varTempV1[ x >> 2 ][ y >> 2 ]
$\quad\quad$ directionHV = 3
$\quad$ - If varTempD0[ x >> 2 ][ y >> 2 ] is greater than varTempD1[ x >> 2 ][ y >> 2 ], then
$\quad\quad$ d1 = varTempD0[ x >> 2 ][ y >> 2 ]
$\quad\quad$ d0 = varTempD1[ x >> 2 ][ y >> 2 ]
$\quad\quad$ directionD = 0
$\quad$ - Otherwise,
$\quad\quad$ d1 = varTempD1[ x >> 2 ][ y >> 2 ]
$\quad\quad$ d0 = varTempD0[ x >> 2 ][ y >> 2 ]
$\quad\quad$ directionD = 2
$\quad$ - If d1 * hv0 > hv1 * d0, then
$\quad\quad$ hvd1 = d1
$\quad\quad$ hvd0 = d0
$\quad\quad$ mainDirection = directionD
$\quad\quad$ secondaryDirection = directionHV
$\quad$ - Otherwise,
$\quad\quad$ hvd1 = hv1
$\quad\quad$ hvd0 = hv0
$\quad\quad$ mainDirection = directionHV
$\quad\quad$ secondaryDirection = directionD
$\quad$ The variable directionStrength is set equal 0, and the following applies:
$\quad$ - If hvd1 > 2 * hvd0
$\quad\quad$ directionStrength = 1
$\quad$ - If hvd1 * 2 > 9 * hvd0
$\quad\quad$ directionStrength = 2
4. The variable avgVar is derived as
$\quad$ varTab[16] = { 0, 1, 2, 2, 2, 2, 2, 3, 3, 3, 3, 3, 3, 3, 3, 4 } $\quad\quad\quad\quad\quad\quad\quad\quad$ (?-??)
$\quad$ avgVar = varTab[ Clip3( 0, 15, ( varTemp[ x >> 2 ][ y >> 2 ] * 64 ) >> ( 3 + BitDepth$_Y$ ) ) ] $\quad\quad$ (?-??)
5. The filter index classIdx[ x, y ] with x, y = 0..(nS)−1 is derived as
$\quad$ transposeTable[8] = { 0, 1, 0, 2, 2, 3, 1, 3 }
$\quad$ transposeIdx[ x ][ y ] = transposeTable[ mainDirection * 2 + ( secondaryDirection >> 1 ) ]
$\quad$ classIdx[ x ][ y ] = avgVar
$\quad$ - If directionStrength is not equal 0, then
$\quad\quad$ classIdx[ x ][ y ] += ( ( ( mainDirection & 0x1 ) << 1 ) + directionStrength ) * 5 $\quad\quad\quad\quad$ (?-??)

TABLE 11

8.5.3.6 Derivation process for ALF transpose and filter index for luma samples Inputs of this process are:
- a luma location ( xCtb, yCtb ) specifying the top-left sample of the current luma coding tree block relative
  to the top left sample of the current picture,
- a reconstructed luma picture sample array recPicture$_L$ prior to the adaptive loop filtering process.
Outputs of this process are
- the classification filter index array filtIdx[ x ][ y ] with x, y = 0..CtbSizeY − 1,
- the transpose index array transposeIdx[ x ][ y ] with x, y = 0..CtbSizeY − 1.
The locations ( $h_x$, $v_y$ ) for each of the corresponding luma samples ( x, y ) inside the given array recPicture
of luma samples are derived as follows:
$\quad$ $h_x$ = Clip3( 0, pic_width_in_luma_samples − 1, x ) $\quad\quad\quad\quad\quad\quad\quad\quad\quad\quad\quad\quad\quad\quad\quad\quad$ (8-435)
$\quad$ $v_y$ = Clip3( 0, pic_height_in_luma_samples − 1, y ) $\quad\quad\quad\quad\quad\quad\quad\quad\quad\quad\quad\quad\quad\quad\quad$ (8-436)
The classification filter index array filtIdx and the transpose index array transposeIdx are derived by the
following ordered steps:
1. The variables varTempH[ x ][ y ], varTempV[ x ][ y ], varTempD0[ x ][ y ] and varTempD1[ x ][ y ] with
$\quad$ x, y = − 2..CtbSizeY + 1 are derived as follows:

TABLE 11-continued

8.5.3.6 Derivation process for ALF transpose and filter index for luma samples If ( ( Abs( x ) + Abs( y ) ) % 2 ) is equal to 1, then
  varTempH[ x ][ y ] = Abs( ( recPicture[ $h_{xC+x}$, $v_{yC+y}$ ] << 1 ) −    (8-437)
    recPicture[ $h_{xC+x-1}$, $v_{yC+y}$ ] − recPicture[ $h_{xC+x+1}$, $v_{yC+y}$ ] )
  varTempV[ x ][ y ] = Abs( ( recPicture[ $h_{xC+x}$, $v_{yC+y}$ ] << 1 ) −    (8-438)
    recPicture[ $h_{xC+x}$, $v_{yC+y-1}$ ] − recPicture[ $h_{xC+x}$, $v_{yC+y+1}$ ] )
  varTempD0[ x ][ y ] = Abs( ( recPicture[ $h_{xC+x}$, $v_{yC+y}$ ] << 1 ) −    (8-439)
    recPicture[ $h_{xC+x-1}$, $v_{yC+y-1}$ ] − recPicture[ $h_{xC+x+1}$, $v_{yC+y+1}$ ] )
  varTempD1[ x ][ y ] = Abs( ( recPicture[ $h_{xC+x}$, $v_{yC+y}$ ] << 1 ) −    (8-440)
    recPicture[ $h_{xC+x+1}$, $v_{yC+y-1}$ ] − recPicture[ $h_{xC+x-1}$, $v_{yC+y+1}$ ] )
2. The variables varTempH1[ x ][ y ], varTempV1[ x ][ y ], varTempD01[ x ][ y ], varTempD11[ x ][ y ] and varTemp[ x ][ y ] with x, y = 0..( CtbSize − 1 ) >> 2 are derived as follows:
  varTempH1[ x ][ y ] = $\Sigma_i\Sigma_j$ varTempH[ (x << 2 ) + i ][ (y << 2) + j ] with i, j = −2..5    (8-441)
  varTempV1[ x ][ y ] = $\Sigma_i\Sigma_j$ varTempV[ (x << 2 ) + i ][ (y << 2) + j ] with i, j = −2..5    (8-442)
  varTempD01[ x ][ y ] = $\Sigma_i\Sigma_j$ varTempD0[ (x << 2 ) + i ][ (y << 2) + j ] with i, j = −2..5    (8-443)
  varTempD11[ x ][ y ] = $\Sigma_i\Sigma_j$ varTempD1[ (x << 2 ) + i ][ (y << 2) + j ] with i, j = −2..5    (8-444)
  varTemp[ x ][ y ] = varTempH1[ x ][ y ] + varTempV1[ x ][ y ]    (8-445)
3. The variables mainDirection, secondaryDirection and directionStrength with x, y = 0..CtbSizeY)
4. The variables mainDirection, secondaryDirection and directionStrength with x, y = 0..CtbSizeY − 1 are derived as follows:
  - The variables hv1, hv0 and directionHV are derived as follows:
    - If varTempV1[ x >> 2 ][ y >> 2 ] is greater than varTempH1[ x >> 2 ][ y >> 2 ], the following applies:
      hv1 = varTempV1[ x >> 2 ][ y >> 2 ]    (8-446)
      hv0 = varTempH1[ x >> 2 ][ y >> 2 ]    (8-447)
      directionHV = 1    (8-448)
    - Otherwise, the following applies:
      hv1 = varTempH1[ x >> 2 ][ y >> 2 ]    (8-449)
      hv0 = varTempV1[ x >> 2 ][ y >> 2 ]    (8-450)
      directionHV = 3    (8-451)
  - The variables d1, d0 and directionD are derived as follows:
    - If varTempD0[ x >> 2 ][ y >> 2 ] is greater than varTempD1[ x >> 2 ][ y >> 2 ], the following applies:
      d1 = varTempD0[ x >> 2 ][ y >> 2 ]    (8-452)
      d0 = varTempD1[ x >> 2 ][ y >> 2 ]    (8-453)
      directionD = 0    (8-454)
    - Otherwise, the following applies:
      d1 = varTempD1[ x >> 2 ][ y >> 2 ]    (8-455)
      d0 = varTempD0[ x >> 2 ][ y >> 2 ]    (8-456)
      directionD = 2    (8-457)
  - The variables hvd1, hvd0, are derived as follows:
      hvd1 = ( d1 * hv0 > hv1 * d0 ) ? d1 : hv1    (8-458)
      hvd0 = ( d1 * hv0 > hv1 * d0 ) ? d0 : hv0    (8-459)
  - The variables directionStrength, mainDirection and secondaryDirection are derived as follows:
      mainDirection = ( d1 * hv0 > hv1 * d0 ) ? directionD : directionHV    (8-460)
      secondaryDirection = ( d1 * hv0 > hv1 * d0 ) ? direction : HVdirectionD    (8-461)
      directionStrength = ( hvd1 > 2 * hvd0 ) ? 1 : ( ( hvd1 * 2 > 9 * hvd0 ) ? 2 : 0 )    (8-462)
5. The variable avgVar is derived as follows:
  varTab[ ] = { 0, 1, 2, 2, 2, 2, 2, 3, 3, 3, 3, 3, 3, 3, 3, 4 }    (8-463)
  avgVar = varTab[ Clip3( 0, 15, ( varTemp[ x >> 2 ][ y >> 2 ] * 64 ) >> ( 3 + $BitDepth_Y$ ) ) ]    (8-464)
6. The classification filter index array filtIdx[ x ][ y ] and the transpose index array transposeIdx[ x ][ y ] with x = y = 0..CtbSizeY − 1 are derived as follows:
  transposeTable[ ] = { 0, 1, 0, 2, 2, 3, 1, 3 }
  transposeIdx[ x ][ y ] = transposeTable[ mainDirection * 2 + ( secondaryDirection >> 1 ) ]
  filtIdx[ x ][ y ] = avgVar
  When directionStrength is not equal 0, filtIdx[ x ][ y ] is modified as follows:
    filtIdx[ x ][ y ] += ( ( ( mainDirection & 0x1 ) << 1 ) + directionStrength ) * 5    (8-465)

TABLE 12

8.5.3.7 Derivation process for ALF transpose and filter index for luma samples Inputs of this process are:
- a luma location ( xCtb, yCtb ) specifying the top-left sample of the current luma coding tree block relative to the top left sample of the current picture,
- a reconstructed luma picture sample array $recPicture_L$ prior to the adaptive loop filtering process.
Outputs of this process are
- the classification filter index array filtIdx[ x ][ y ] with x, y = 0..CtbSizeY − 1,
- the transpose index array transposeIdx[ x ][ y ] with x, y = 0..CtbSizeY − 1.
The locations ( $h_x$, $v_y$ ) for each of the corresponding luma samples ( x, y ) inside the given array recPicture of luma samples are derived as follows:
  $h_x$ = Clip3( 0, pic_width_in_luma_samples − 1, x )    (8-435)
  $v_y$ = Clip3( 0, pic_height_in_luma_samples − 1, y )    (8-436)
The classification filter index array filtIdx and the transpose index array transposeIdx are derived by the following ordered steps:

TABLE 12-continued

8.5.3.7 Derivation process for ALF transpose and filter index for luma samples 1. The variables varTempH[ x ][ y ], varTempV[ x ][ y ], varTempD0[ x ][ y ] and varTempD1[ x ][ y ] with x, y = − 2..CtbSizeY + 1 are derived as follows:
   If ( ( Abs( x ) + Abs( y ) ) % 2 ) is equal to 1, then
       varTempH[ x ][ y ] = Abs( ( recPicture[ $h_{xC+x}$, $v_{yC+y}$ ] << 1 ) −     (8-437)
           recPicture[ $h_{xC+x-1}$, $v_{yC+y}$ ] − recPicture[ $h_{xC+x+1}$, $v_{yC+y}$ ] )
       varTempV[ x ][ y ] = Abs( ( recPicture[ $h_{xC+x}$, $v_{yC+y}$ ] << 1 ) −     (8-438)
           recPicture[ $h_{xC+x}$, $v_{yC+y-1}$ ] − recPicture[ $h_{xC+x}$, $v_{yC+y+1}$ ] )
       varTempD0[ x ][ y ] = Abs( ( recPicture[ $h_{xC+x}$, $v_{yC+y}$ ] << 1 ) −     (8-439)
           recPicture[ $h_{xC+x-1}$, $v_{yC+y-1}$ ] − recPicture[ $h_{xC+x+1}$, $v_{yC+y+1}$ ] )
       varTempD1[ x ][ y ] = Abs( ( recPicture[ $h_{xC+x}$, $v_{yC+y}$ ] << 1 ) −     (8-440)
           recPicture[ $h_{xC+x+1}$, $v_{yC+y-1}$ ] − recPicture[ $h_{xC+x-1}$, $v_{yC+y+1}$ ] )
   Otherwise,
       varTempH[ x ][ y ] = 0
       varTempV[ x ][ y ] = 0
       varTempD0[ x ][ y ] = 0
       varTempD1[ x ][ y ] = 0
2. The variables varTempH1[ x ][ y ], varTempV1[ x ][ y ], varTempD01[ x ][ y ], varTempD11 [ x ][ y ] and varTemp[ x ][ y ] with x, y = 0..( CtbSizeY − 1 ) >> 2 are derived as follows:
       varTempH1[ x ][ y ] = $\Sigma_i\Sigma_j$ varTempH[ (x << 2 ) + i ][ (y << 2) + j ] with i, j = −2..5     (8-441)
       varTempV1[ x ][ y ] = $\Sigma_i\Sigma_j$ varTempV[ (x << 2 ) + i ][ (y << 2) + j ] with i, j = −2..5     (8-442)
       varTempD01[ x ][ y ] = $\Sigma_i\Sigma_j$ varTempD0[ (x << 2 ) + i ][ (y << 2) + j ] with i, j = −2..5     (8-443)
       varTempD11[ x ][ y ] = $\Sigma_i\Sigma_j$ varTempD1[ (x << 2 ) + i ][ (y << 2) + j ] with i, j = −2..5     (8-444)
       varTemp[ x ][ y ] = varTempH1[ x ][ y ] + varTempV1[ x ][ y ]     (8-445)
3. The variables mainDirection, secondaryDirection and directionStrength with x, y = 0..CtbSizeY)
4. The variables mainDirection, secondaryDirection and directionStrength with x, y = 0..CtbSizeY − 1 are derived as follows:
   - The variables hv1, hv0 and directionHV are derived as follows:
     - If varTempV1[ x >> 2 ][ y >> 2 ] is greater than varTempH1[ x >> 2 ][ y >> 2 ], the following applies:
           hv1 = varTempV1[ x >> 2 ][ y >> 2 ]     (8-446)
           hv0 = varTempH1[ x >> 2 ][ y >> 2 ]     (8-447)
           directionHV = 1     (8-448)
     - Otherwise, the following applies:
           hv1 = varTempH1[ x >> 2 ][ y >> 2 ]     (8-449)
           hv0 = varTempV1[ x >> 2 ][ y >> 2 ]     (8-450)
           directionHV = 3     (8-451)
   - The variables d1, d0 and directionD are derived as follows:
     - If varTempD0[ x >> 2 ][ y >> 2 ] is greater than varTempD1[ x >> 2 ][ y >> 2 ], the following applies:
           d1 = varTempD0[ x >> 2 ][ y >> 2 ]     (8-452)
           d0 = varTempD1[ x >> 2 ][ y >> 2 ]     (8-453)
           directionD = 0     (8-454)
     - Otherwise, the following applies:
           d1 = varTempD1[ x >> 2 ][ y >> 2 ]     (8-455)
           d0 = varTempD0[ x >> 2 ][ y >> 2 ]     (8-456)
           directionD = 2     (8-457)
   - The variables hvd1, hvd0, are derived as follows:
         hvd1 = ( d1 * hv0 > hv1 * d0 ) ? d1 : hv1     (8-458)
         hvd0 = ( d1 * hv0 > hv1 * d0 ) ? d0 : hv0     (8-459)
   - The variables directionStrength, mainDirection and secondaryDirectionare derived as follows:
         mainDirection = ( d1 * hv0 > hv1 * d0 ) ? directionD : directionHV     (8-460)
         secondaryDirection = ( d1 * hv0 > hv1 * d0 ) ? direction : HVdirectionD     (8-461)
         directionStrength = ( hvd1 > 2 * hvd0 ) ? 1 : ( ( hvd1 * 2 > 9 * hvd0 ) ? 2 : 0 )     (8-462)
5. The variable avgVar is derived as follows:
       varTab[ ] = { 0, 1, 2, 2, 2, 2, 2, 3, 3, 3, 3, 3, 3, 3, 3, 4 }     (8-463)
       avgVar = varTab[ Clip3( 0, 15, ( varTemp[ x >> 2 ][ y >> 2 ] * 64 ) >> ( 3 + $BitDepth_Y$ ) ) ]     (8-464)
6. The classification filter index array filtIdx[ x ][ y ] and the transpose index array transposeIdx[ x ][ y ] with x = y = 0..CtbSizeY − 1 are derived as follows:
       transposeTable[ ] = { 0, 1, 0, 2, 2, 3, 1, 3 }
       transposeIdx[ x ][ y ] = transposeTable[ mainDirection * 2 + ( secondaryDirection >> 1 ) ]
       filtIdx[ x ][ y ] = avgVar
   When directionStrength is not equal 0, filtIdx[ x ][ y ] is modified as follows:
       filtIdx[ x ][ y ] += ( ( ( mainDirection & 0x1 ) << 1 ) + directionStrength ) * 5     (8-465)

Referring to FIG. 42, in the case of block classification on a per 4×4-size block basis, at least one of the sums $g_v$, $g_h$, $g_{d1}$, and $g_{d2}$ of the gradient values for the vertical direction, the horizontal direction, the first diagonal direction, and the second diagonal direction is calculated on the basis of subsampling (hereinafter, referred to as "fourth method"). Here, V, H, D1, and D2 represent the results of the sample-based one-dimensional Laplacian operations for the vertical direction, the horizontal direction, the first diagonal direction, and the second diagonal direction, respectively. That is, the one-dimensional Laplacian operations are performed along the horizontal direction, the vertical direction, the first diagonal direction, and the second diagonal direction at positions V, H, D1, and D2, respectively. In addition, positions at which the one-dimensional Laplacian operations are performed may be sub-sampled positions. In FIG. 42, the block class indices C are allocated on a per 4×4-size block (that is shaded) basis. In this case, an operation range in which the one-dimensional Laplacian sum is calculated may be larger than the size of the block classification unit. Here, a thin solid-line rectangle represents a reconstructed sample position, and a thick solid-line rectangle represents an operation range in which the one-dimensional Laplacian sum is calculated.

Specifically, the fourth method means that the one-dimensional Laplacian operation is performed at sub-sampled positions (x, y) in the vertical direction while sub-sampling is not performed in the horizontal direction. That is, it means that the one-dimensional Laplacian operation is performed while skipping by one row each time the one-dimensional Laplacian operation is performed.

Referring to FIG. 42, the positions at which the one-dimensional Laplacian operations are performed are the same for the horizontal direction, the vertical direction, the first diagonal direction, and the second diagonal direction. That is, the one-dimensional Laplacian operations for the respective directions are performed using a unified sub-sampled one-dimensional Laplacian operation position irrespective of the directions.

Here, Table 13 illustrates an exemplary block classification-based encoding/decoding process using the fourth method. Table 14 illustrates another exemplary block classification-based encoding/decoding process using the fourth method. Table 15 illustrates a further exemplary block classification-based encoding/decoding process using the fourth method.

TABLE 13

Derivation process for filter index array for luma samples

Inputs of this process are:
- a luma location ( xC, yC ) specifying the top-left luma sample of the current coding tree block relative to the top left luma sample of the current picture,
- a variable log2CbSize specifying the size of the current coding tree block.
- a reconstructed luma picture sample array recPicture prior to the adaptive loop filtering process.
Output of this process is the two-dimensional classification index array of (nS)×(nS), classIdx, transposeIdx.
A variable nS is set equal to ( 1 << log2CbSize ).
The locations ( $h_x$, $v_y$ ) for each of the corresponding luma samples ( x, y ) inside the given array recPicture of luma samples are derived as follows:
  $h_x$ = Clip3( 0, pic_width_in_luma_samples − 1, x )
  $v_y$ = Clip3( 0, pic_height_in_luma_samples − 1, y )
The classification filter index array classIdx is specified as following:
  1. The variables varTempH[ x ][ y ], varTempV[ x ][ y ], varTempD0[ x ][ y ] and varTempD1[ x ][ y ] with x, y = − 2..(nS) + 1 are derived as
    If ( abs( y ) % 2 ) is equal to 0, then
      varTempH[ x ][ y ] = | (recPicture[ $h_{xC+x}$, $v_{yC+y}$ ] << 1 ) −
        recPicture[ $h_{xC+x-1}$, $v_{yC+y}$ ] − recPicture[ $h_{xC+x+1}$, $v_{yC+y}$ ] |
      varTempV[ x ][ y ] = | ( recPicture[ $h_{xC+x}$, $v_{yC+y}$ ] << 1 ) −
        recPicture[ $h_{xC+x}$, $v_{yC+y-1}$ ] − recPicture[ $h_{xC+x}$, $v_{yC+y+1}$ ] |
      varTempD0[ x ][ y ] = | (recPicture[ $h_{xC+x}$, $v_{yC+y}$ ] << 1 ) −
        recPicture[ $h_{xC+x-1}$, $v_{yC+y-1}$ ] − recPicture[ $h_{xC+x+1}$, $v_{yC+y+1}$ ] |
      varTempD1[ x ][ y ] = | ( recPicture[ $h_{xC+x}$, $v_{yC+y}$ ] << 1 ) −
        recPicture[ $h_{xC+x+1}$, $v_{yC+y-1}$ ] − recPicture[ $h_{xC+x-1}$, $v_{yC+y+1}$ ] |
    Otherwise,
      varTempH[ x ][ y ] = 0
      varTempV[ x ][ y ] = 0
      varTempD0[ x ][ y ] = 0
      varTempD1[ x ][ y ] = 0
  2. The variables varTempH1[ x, y ], varTempV1[ x, y ], varTempD01[ x, y ], varTempD11[ x, y ] and varTemp[ x, y ] with x, y = 0..( (nS) − 1 ) >> 2 are derived as
      varTempH1[ x ][ y ] = $\Sigma_i \Sigma_j$ varTempH[ (x << 2 ) + i ][ (y << 2) + j ] with i, j = −2..5
      varTempV1[ x ][ y ] = $\Sigma_i \Sigma_j$ varTempV[ (x << 2 ) + i ][ (y << 2) + j ] with i, j = −2..5
      varTempD01[ x ][ y ] = $\Sigma_i \Sigma_j$ varTempD0[ (x << 2 ) + i ][ (y << 2) + j ] with i, j = −2..5
      varTempD11[ x ][ y ] = $\Sigma_i \Sigma_j$ varTempD1[ (x << 2 ) + i ][ (y << 2) + j ] with i, j = −2..5
      varTemp[ x ][ y ] = varTempH1[ x ][ y ] + varTempV1[ x ][ y ]
  3. The variables mainDirection, secondaryDirection and directionStrength with x, y = 0..(nS) − 1 are derived as
    - If varTempV1[ x >> 2 ][ y >> 2 ] is greater than varTempH1[ x >> 2 ][ y >> 2 ], then
        hv1 = varTempV1[ x >> 2 ][ y >> 2 ]
        hv0 = varTempH1[ x >> 2 ][ y >> 2 ]
        directionHV = 1
    - Otherwise,
        hv1 = varTempH1[ x >> 2 ][ y >> 2 ]
        hv0 = varTempV1[ x >> 2 ][ y >> 2 ]
        directionHV = 3
    - If varTempD0[ x >> 2 ][ y >> 2 ] is greater than varTempD1[ x >> 2 ][ y >> 2 ], then
        d1 = varTempD0[ x >> 2 ][ y >> 2 ]
        d0 = varTempD1[ x >> 2 ][ y >> 2 ]
        directionD = 0
    - Otherwise,
        d1 = varTempD1[ x >> 2 ][ y >> 2 ]
        d0 = varTempD0[ x >> 2 ][ y >> 2 ]
        directionD = 2
    - If d1 * hv0 > hv1 * d0, then
        hvd1 = d1
        hvd0 = d0
        mainDirection = directionD
        secondaryDirection = directionHV

TABLE 13-continued

Derivation process for filter index array for luma samples

- Otherwise,
    hvd1 = hv1
    hvd0 = hv0
    mainDirection = directionHV
    secondaryDirection = directionD
The variable directionStrength is set equal 0, and the following applies:
- If hvd1 > 2 * hvd0
    directionStrength = 1
- If hvd1 * 2 > 9 * hvd0
    directionStrength = 2
4. The variable avgVar is derived as
    varTab[16] = { 0, 1, 2, 2, 2, 2, 2, 3, 3, 3, 3, 3, 3, 3, 3, 4 }     (?-??)
    avgVar = varTab[ Clip3( 0, 15, ( varTemp[ x >> 2 ][ y >> 2 ] * 64 ) >> ( 3 + $BitDepth_Y$ ) ) ]     (?-??)
5. The filter index classIdx[ x, y ] with x, y = 0..(nS)−1 is derived as
    transposeTable[8] = { 0, 1, 0, 2, 2, 3, 1, 3 }
    transposeIdx[ x ][ y ] = transposeTable[ mainDirection * 2 + ( secondaryDirection >> 1 ) ]
    classIdx[ x ][ y ] = avgVar
- If directionStrength is not equal 0, then
    classIdx[ x ][ y ] += ( ( ( mainDirection & 0x1 ) << 1 ) + directionStrength ) * 5     (?-??)

TABLE 14

8.5.3.6 Derivation process for ALF transpose and filter index for luma samples

Inputs of this process are:
- a luma location ( xCtb, yCtb ) specifying the top-left sample of the current luma coding tree block relative
  to the top left sample of the current picture,
- a reconstructed luma picture sample array $recPicture_L$ prior to the adaptive loop filtering process.
Outputs of this process are
- the classification filter index array filtIdx[ x ][ y ] with x, y = 0..CtbSizeY − 1,
- the transpose index array transposeIdx[ x ][ y ] with x, y = 0..CtbSizeY − 1.
The locations ( $h_x$, $v_y$ ) for each of the corresponding luma samples ( x, y ) inside the given array recPicture
of luma samples are derived as follows:
    $h_x$ = Clip3( 0, pic_width_in_luma_samples − 1, x )     (8-435)
    $v_y$ = Clip3( 0, pic_height_in_luma_samples − 1, y )     (8-436)
The classification filter index array filtIdx and the transpose index array transposeIdx are derived by the
following ordered steps:
1. The variables varTempH[ x ][ y ], varTempV[ x ][ y ], varTempD0[ x ][ y ] and varTempD1[ x ][ y ] with
   x, y = − 2..CtbSizeY + 1 are derived as follows:
    If ( Abs( y ) % 2 ) is equal to 0, then
      varTempH[ x ][ y ] = Abs( ( recPicture[ $h_{xC+x}$, $v_{yC+y}$ ] << 1 ) −     (8-437)
        recPicture[ $h_{xC+x−1}$, $v_{yC+y}$ ] − recPicture[ $h_{xC+x+1}$, $v_{yC+y}$ ] )
      varTempV[ x ][ y ] = Abs( ( recPicture[ $h_{xC+x}$, $v_{yC+y}$ ] << 1 ) −     (8-438)
        recPicture[ $h_{xC+x}$, $v_{yC+y−1}$ ] − recPicture[ $h_{xC+x}$, $v_{yC+y+1}$ ] )
      varTempD0[ x ][ y ] = Abs( ( recPicture[ $h_{xC+x}$, $v_{yC+y}$ ] << 1 ) −     (8-439)
        recPicture[ $h_{xC+x−1}$, $v_{yC+y−1}$ ] − recPicture[ $h_{xC+x+1}$, $v_{yC+y+1}$ ] )
      varTempD1[ x ][ y ] = Abs( ( recPicture[ $h_{xC+x}$, $v_{yC+y}$ ] << 1 ) −     (8-440)
        recPicture[ $h_{xC+x+1}$, $v_{yC+y−1}$ ] − recPicture[ $h_{xC+x−1}$, $v_{yC+y+1}$ ] )
2. The variables varTempH1[ x ][ y ], varTempV1[ x ][ y ], varTempD01[ x ][ y ], varTempD11[ x ][ y ]
   and varTemp[ x ][ y ] with x, y = 0..( CtbSizeY − 1 ) >> 2 are derived as follows:
    varTempH1[ x ][ y ] = $\Sigma_i \Sigma_j$ varTempH[ (x << 2) + i ][ (y << 2) + j ] with i, j = −2..5     (8-441)
    varTempV1[ x ][ y ] = $\Sigma_i \Sigma_j$ varTempV[ (x << 2) + i ][ (y << 2) + j ] with i, j = −2..5     (8-442)
    varTempD01[ x ][ y ] = $\Sigma_i \Sigma_j$ varTempD0[ (x << 2) + i ][ (y << 2) + j ] with i, j = −2..5     (8-443)
    varTempD11[ x ][ y ] = $\Sigma_i \Sigma_j$ varTempD1[ (x << 2) + i ][ (y << 2) + j ] with i, j = −2..5     (8-444)
    varTemp[ x ][ y ] = varTempH1[ x ][ y ] + varTempV1[ x ][ y ]     (8-445)
3. The variables mainDirection, secondaryDirection and directionStrength with x, y = 0..CtbSizeY)
4. The variables mainDirection, secondaryDirection and directionStrength with x, y = 0..CtbSizeY − 1
   are derived as follows:
    - The variables hv1, hv0 and directionHV are derived as follows:
      - If varTempV1[ x >> 2 ][ y >> 2 ] is greater than varTempH1[ x >> 2 ][ y >> 2 ], the
        following applies:
        hv1 = varTempV1[ x >> 2 ][ y >> 2 ]     (8-446)
        hv0 = varTempH1[ x >> 2 ][ y >> 2 ]     (8-447)
        directionHV = 1     (8-448)
      - Otherwise, the following applies:
        hv1 = varTempH1[ x >> 2 ][ y >> 2 ]     (8-449)
        hv0 = varTempV1[ x >> 2 ][ y >> 2 ]     (8-450)
        directionHV = 3     (8-451)
    - The variables d1, d0 and directionD are derived as follows:
      - If varTempD0[ x >> 2 ][ y >> 2 ] is greater than varTempD1[ x >> 2 ][ y >> 2 ], the
        following applies:
        d1 = varTempD0[ x >> 2 ][ y >> 2 ]     (8-452)
        d0 = varTempD1[ x >> 2 ][ y >> 2 ]     (8-453)
        directionD = 0     (8-454)

TABLE 14-continued

8.5.3.6 Derivation process for ALF transpose and filter index for luma samples

- Otherwise, the following applies:
    d1 = varTempD1[ x >> 2 ][ y >> 2 ]     (8-455)
    d0 = varTempD0[ x >> 2 ][ y >> 2 ]     (8-456)
    directionD = 2     (8-457)
- The variables hvd1, hvd0, are derived as follows:
    hvd1 = ( d1 * hv0 > hv1 * d0 ) ? d1 : hv1     (8-458)
    hvd0 = ( d1 * hv0 > hv1 * d0 ) ? d0 : hv0     (8-459)
- The variables directionStrength, mainDirection and secondaryDirectionare derived as follows:
    mainDirection = ( d1 * hv0 > hv1 * d0 ) ? directionD : directionHV     (8-460)
    secondaryDirection = ( d1 * hv0 > hv1 * d0 ) ? direction : HVdirectionD     (8-461)
    directionStrength = ( hvd1 > 2 * hvd0 ) ? 1 : ( ( hvd1 * 2 > 9 * hvd0 ) ? 2 : 0 )     (8-462)
5. The variable avgVar is derived as follows:
    varTab[ ] = { 0, 1, 2, 2, 2, 2, 2, 3, 3, 3, 3, 3, 3, 3, 3, 4 }     (8-463)
    avgVar = varTab[ Clip3( 0, 15, ( varTemp[ x >> 2 ][ y >> 2 ] * 64 ) >> ( 3 + BitDepth$_Y$ ) ) ]     (8-464)
6. The classification filter index array filtIdx[ x ][ y ] and the transpose index array transposeIdx[ x ][ y ] with x = y = 0..CtbSizeY − 1 are derived as follows:
    transposeTable[ ] = { 0, 1, 0, 2, 2, 3, 1, 3 }
    transposeIdx[ x ][ y ] = transposeTable[ mainDirection * 2 + ( secondaryDirection >> 1 ) ]
    filtIdx[ x ][ y ] = avgVar
    When directionStrength is not equal 0, filtIdx[ x ][ y ] is modified as follows:
    filtIdx[ x ][ y ] += ( ( ( mainDirection & 0x1 ) << 1 ) + directionStrength ) * 5     (8-465)

TABLE 15

8.5.3.7 Derivation process for ALF transpose and filter index for luma samples Inputs of this process are:
- a luma location ( xCtb, yCtb ) specifying the top-left sample of the current luma coding tree block relative to the top left sample of the current picture,
- a reconstructed luma picture sample array recPicture$_L$ prior to the adaptive loop filtering process.
Outputs of this process are
- the classification filter index array filtIdx[ x ][ y ] with x, y = 0..CtbSizeY − 1,
- the transpose index array transposeIdx[ x ][ y ] with x, y = 0..CtbSizeY − 1.
The locations ( h$_x$, v$_y$ ) for each of the corresponding luma samples ( x, y ) inside the given array recPicture of luma samples are derived as follows:
    h$_x$ = Clip3( 0, pic_width_in_luma_samples − 1, x )     (8-435)
    v$_y$ = Clip3( 0, pic_height_in_luma_samples − 1, y )     (8-436)
The classification filter index array filtIdx and the transpose index array transposeIdx are derived by the following ordered steps:
7. The variables varTempH[ x ][ y ], varTempV[ x ][ y ], varTempD0[ x ][ y ] and varTempD1[ x ][ y ] with x, y = − 2..CtbSizeY + 1 are derived as follows:
    If ( Abs( y ) % 2 ) is equal to 0, then
        varTempH[ x ][ y ] = Abs( ( recPicture[ h$_{xC+x}$, v$_{yC+y}$ ] << 1 ) −     (8-437)
            recPicture[ h$_{xC+x-1}$, v$_{yC+y}$ ] − recPicture[ h$_{xC+x+1}$, v$_{yC+y}$ ] )
        varTempV[ x ][ y ] = Abs( ( recPicture[ h$_{xC+x}$, v$_{yC+y}$ ] << 1 ) −     (8-438)
            recPicture[ h$_{xC+x}$, v$_{yC+y-1}$ ] − recPicture[ h$_{xC+x}$, v$_{yC+y+1}$ ] )
        varTempD0[ x ][ y ] = Abs( ( recPicture[ h$_{xC+x}$, v$_{yC+y}$ ] << 1 ) −     (8-439)
            recPicture[ h$_{xC+x-1}$, v$_{yC+y-1}$ ] − recPicture[ h$_{xC+x+1}$, v$_{yC+y+1}$ ] )
        varTempD1[ x ][ y ] = Abs( ( recPicture[ h$_{xC+x}$, v$_{yC+y}$ ] << 1 ) −     (8-440)
            recPicture[ h$_{xC+x+1}$, v$_{yC+y-1}$ ] − recPicture[ h$_{xC+x-1}$, v$_{yC+y+1}$ ] )
    Otherwise,
        varTempH[ x ][ y ] = 0
        varTempV[ x ][ y ] = 0
        varTempD0[ x ][ y ] = 0
        varTempD1[ x ][ y ] = 0
8. The variables varTempH1[ x ][ y ], varTempV1[ x ][ y ], varTempD01[ x ][ y ], varTempD11 [ x ][ y ] and varTemp[ x ][ y ] with x, y = 0..( CtbSizeY − 1 ) >> 2 are derived as follows:
    varTempH1[ x ][ y ] = Σ$_i$Σ$_j$ varTempH[ (x << 2 ) + i ][ (y << 2) + j ] with i, j = −2..5     (8-441)
    varTempV1[ x ][ y ] = Σ$_i$Σ$_j$ varTempV[ (x << 2 ) + i ][ (y << 2) + j ] with i, j = −2..5     (8-442)
    varTempD01[ x ][ y ] = Σ$_i$Σ$_j$ varTempD0[ (x << 2 ) + i ][ (y << 2) + j ] with i, j = −2..5     (8-443)
    varTempD11[ x ][ y ] = Σ$_i$Σ$_j$ varTempD1[ (x << 2 ) + i ][ (y << 2) + j ] with i, j = −2..5     (8-444)
    varTemp[ x ][ y ] = varTempH1[ x ][ y ] + varTempV1[ x ][ y ]     (8-445)
9. The variables mainDirection, secondaryDirection and directionStrength with x, y = 0..CtbSizeY
10. The variables mainDirection, secondaryDirection and directionStrength with x, y = 0..CtbSizeY − 1 are derived as follows:
- The variables hv1, hv0 and directionHV are derived as follows:
  - If varTempV1[ x >> 2 ][ y >> 2 ] is greater than varTempH1[ x >> 2 ][ y >> 2 ], the following applies:
    hv1 = varTempV1[ x >> 2 ][ y >> 2 ]     (8-446)
    hv0 = varTempH1[ x >> 2 ][ y >> 2 ]     (8-447)
    directionHV = 1     (8-448)
  - Otherwise, the following applies:
    hv1 = varTempH1[ x >> 2 ][ y >> 2 ]     (8-449)
    hv0 = varTempV1[ x >> 2 ][ y >> 2 ]     (8-450)
    directionHV = 3     (8-451)

TABLE 15-continued 8.5.3.7 Derivation process for ALF transpose and filter index for luma samples

- The variables d1, d0 and directionD are derived as follows:
    - If varTempD0[ x >> 2 ][ y >> 2 ] is greater than varTempD1[ x >> 2 ][ y >> 2 ], the
      following applies:
        d1 = varTempD0[ x >> 2 ][ y >> 2 ]                                        (8-452)
        d0 = varTempD1[ x >> 2 ][ y >> 2 ]                                        (8-453)
        directionD = 0                                                             (8-454)
    - Otherwise, the following applies:
        d1 = varTempD1[ x >> 2 ][ y >> 2 ]                                        (8-455)
        d0 = varTempD0[ x >> 2 ][ y >> 2 ]                                        (8-456)
        directionD = 2                                                             (8-457)
- The variables hvd1, hvd0, are derived as follows:
    hvd1 = ( d1 * hv0 > hv1 * d0 ) ? d1 : hv1                                     (8-458)
    hvd0 = ( d1 * hv0 > hv1 * d0 ) ? d0 : hv0                                     (8-459)
- The variables directionStrength, mainDirection and secondaryDirectionare derived as follows:
    mainDirection = ( d1 * hv0 > hv1 * d0 ) ? directionD : directionHV            (8-460)
    secondaryDirection = ( d1 * hv0 > hv1 * d0 ) ? direction : HVdirectionD       (8-461)
    directionStrength = ( hvd1 > 2 * hvd0 ) ? 1 : ( ( hvd1 * 2 > 9 * hvd0 ) ? 2 : 0 )  (8-462)
11. The variable avgVar is derived as follows:
    varTab[ ] = { 0, 1, 2, 2, 2, 2, 2, 3, 3, 3, 3, 3, 3, 3, 3, 4 }                (8-463)
    avgVar = varTab[ Clip3( 0, 15, ( varTemp[ x >> 2 ][ y >> 2 ] * 64 ) >> ( 3 + BitDepth$_Y$ ) ) ]  (8-464)
12. The classification filter index array filtIdx[ x ][ y ] and the transpose index array transposeIdx[ x ][ y ]
    with x = y = 0..CtbSizeY − 1 are derived as follows:
    transposeTable[ ] = { 0, 1, 0, 2, 2, 3, 1, 3 }
    transposeIdx[ x ][ y ] = transposeTable[ mainDirection * 2 + ( secondaryDirection >> 1 ) ]
    filtIdx[ x ][ y ] = avgVar
    When directionStrength is not equal 0, filtIdx[ x ][ y ] is modified as follows:
    filtIdx[ x ][ y ] += ( ( ( mainDirection & 0x1 ) << 1 ) + directionStrength ) * 5   (8-465)

On the other hand, a method of deriving at least one of the directionality value and the quantized activity value $A_q$ of the activity value A by using the gradient values calculated by the methods illustrated in FIGS. 39 to 42 is similar to the in-loop filtering method described above.

On the other hand, in the sub-sampling-based gradient value calculation method, the one-dimensional Laplacian operation is not calculated for all the samples within an operation range (for example, an 8×8-size block) in which the one-dimensional Laplacian sum is calculated but is calculated for sub-sampled positions within the operation range. Therefore, the number of calculations (for example, multiplications, shift operations, additions, and absolute value calculations) needed for block classification is reduced. Therefore, the computational complexity in the encoder and the decoder is reduced.

According to the first to fourth methods, in the case of 4×4-size block classification based on sub-sampling-based one-dimensional Laplacian operations, the operation results V, H, D1, and D2 of one-dimensional Laplacian operations calculated at sum-sampled positions within an 8×8 block are added to the 4×4-size luminance blocks in order to derive the gradient values for the vertical direction, the horizontal direction, the first diagonal direction, and the second diagonal direction, respectively. Accordingly, in order to calculate all of the gradient values within the 8×8 range, 720+240 additions, 288 comparisons, and 144 shifts are required.

On the other hand, according to a conventional in-loop filtering method, in the case of 4×4-size block classification, V, H, D1, and D2, which are the one-dimensional Laplacian operation results calculated at all the positions within the 8×8 range, are to the 4×4 luminance blocks in order to derive the gradient values for the vertical direction, the horizontal direction, the first diagonal direction, and the second diagonal direction. Accordingly, in order to calculate all of the gradient values within the 8×8 range, 1586+240 additions, 576 comparisons, and 144 shifts are required.

Then, a process of deriving the directionality value D and the quantized activity value $A_q$ of the activity value A using the gradient values requires 8 additions, 28 comparisons, 8 multiplications, and 20 shifts.

Therefore, the block classification method using the first to fourth methods within the 8×8 range requires 968 additions, 316 comparisons, 8 multiplications, and 164 shifts in total. Thus, 15.125 additions, 4.9375 comparisons, 0.125 multiplications, and 2.5625 shifts are required for each sample.

On the other hand, the block classification method using the conventional in-loop filtering technique within the 8×8 range requires 1832 additions, 604 comparisons, 8 multiplications, and 164 shifts in total. Thus, 28.625 additions, 9.4375 comparisons, 0.125 multiplications, and 2.5625 shifts are required for each sample.

Therefore, the block classification using the first to fourth methods can reduce the computational complexity for a given block size (e.g., 8×8 range) compared with the conventional in-loop filtering-based block classification. That is, the number of calculations is reduced by 44.17%. In addition, the block classification method using the first to fourth methods according to the present invention can reduce the number of hardware operations by 17.02% compared with the conventional in-loop filtering-based block classification.

A computer-readable recording medium according to the present invention stores a bitstream generated by a video encoding method including classifying a coding unit into classes on a per block classification unit basis, filtering the coding unit that is classified on a per block classification unit basis, and encoding filter information. The block classification unit is not limited to the coding unit. That is, the block classification may be performed in units of a slice, a tile, a tile group, a picture, a sequence, a CTU, a block, a CU, a PU, or a TU. In addition, a target to be filtered is not to the coding unit. That is, the filtering may be performed on a slice, a tile, a tile group, a picture, a sequence, a CTU, a block, a CU, a PU, or a TU. In addition, the filter information is not limited to filter information per coding unit. The filter information may be filter information per slice, tile, tile group, picture, sequence, CTU, block, CU, PU, or TU.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used in encoding/decoding an image.

The invention claimed is:
1. A video decoding method comprising:
obtaining reconstruction samples by summing prediction samples and residual samples;
decoding filter information;
classifying the reconstruction samples in a coding tree block into classes on a per block classification unit basis;
assigning block class indices to the coding tree block having the reconstruction samples classified into the classes on a per block classification unit basis; and
applying a filtering on the coding tree block having the reconstruction samples classified into the classes on a per block classification unit basis by using the filter information and the block class indices,
wherein the block class indices are determined according to directionality information and activity information,
wherein at least one of the directionality information and the activity information is determined on the basis of a gradient value with respect to at least one of a vertical direction, a horizontal direction, a first directional direction, and a second directional direction,
wherein the gradient value is obtained using a one-dimensional Laplacian operation for the block classification unit,
wherein the one-dimensional Laplacian operation is performed only for a specific sample position included in the block classification unit, and
wherein a horizontal position and a vertical position of the specific sample are both even or both odd based on each block classification unit.

2. The video decoding method according to claim 1, wherein the activity information is derived based on summation of one-dimensional Laplacian operations in an operation region determined based on the position of a current reconstruction sample.

3. The video decoding method according to claim 2, wherein when the position of the current reconstruction sample is (i,j), a width of the operation region is determined from i−2 to i+5, and a height of the operation region is determined from j−2 to j+5.

4. The video decoding method according to claim 1, wherein when the coding tree block is a luma component block, the filtering is applied using a 7×7 rhombus filter, and
wherein when the coding tree block is a chroma component block, the filtering is applied using a 5×5 rhombus filter.

5. The video decoding method according to claim 1, wherein when there is a non-available neighboring sample among neighboring samples of a reconstruction sample of the coding tree block to which the filtering is applied, the filtering is applied by performing padding on the non-available neighboring sample.

6. The video decoding method according to claim 1, wherein a filter coefficient value used for the filtering is a value represented in 8 bits.

7. The video decoding method according to claim 6, wherein the filter information comprises:
at least one piece of information selected from among information on whether filtering is executed, a filter coefficient value, the number of filters, the number of filter taps (a filter length), filter shape information, filter type information, information on whether a fixed filter is used for the block class index, and filter symmetry type information.

8. The video decoding method according to claim 7, wherein the information on whether filtering is executed, includes information indicating whether to execute filtering for each color component of the coding tree block,
wherein the information indicating whether to execute filtering for each color component is entropy-decoded in a unit of coding tree block.

9. The video decoding method according to claim 7, wherein the information on the filter coefficient value includes information on the filter coefficient value for each color component of the coding tree block, and
wherein the filter coefficient value used for the filtering is determined for each color component based on the information on the filter coefficient value for each color component.

10. A video encoding method comprising:
obtaining reconstruction samples by summing prediction samples and residual samples;
classifying the reconstruction samples in a coding tree block into classes on a per block classification unit basis;
assigning block class indices to the coding tree block having the reconstruction samples classified into the classes on a per block classification unit basis;
applying the filtering on the coding tree block having the reconstruction samples classified into the classes on a per block classification unit basis by using filter information and the block class indices; and
encoding the filter information,
wherein the block class indices are determined according to directionality information and activity information,
wherein at least one of the directionality information and the activity information is determined on the basis of a gradient value with respect to at least one of a vertical direction, a horizontal direction, a first directional direction, and a second directional direction,
wherein the gradient value is obtained using a one-dimensional Laplacian operation for the block classification unit,
wherein the one-dimensional Laplacian operation is performed only for a specific sample position included in the block classification unit, and
wherein a horizontal position and a vertical position of the specific sample are both even or both odd based on each block classification unit.

11. A device for transmitting a bitstream, comprising:
a processor configured to cause obtaining the bitstream; and
a transmitting unit operably coupled to the processor, the transmitting unit configured to cause transmitting the bitstream,
wherein the obtaining the bitstream comprises:
obtaining reconstruction samples by summing prediction samples and residual samples;
classifying the reconstruction samples in a coding tree block into classes on a per block classification unit basis;
assigning block class indices to the coding tree block having the reconstruction samples classified into the classes on a per block classification unit basis;
applying the filtering on the coding tree block having the reconstruction samples classified into the classes on a per block classification unit basis by using filter information and the block class indices; and
encoding the filter information,
wherein the block class indices are determined according to directionality information and activity information,
wherein at least one of the directionality information and the activity information is determined on the basis of a gradient value with respect to at least one of a vertical direction, a horizontal direction, a first directional direction, and a second directional direction,
wherein the gradient value is obtained using a one-dimensional Laplacian operation for the block classification unit,
wherein the one-dimensional Laplacian operation is performed only for a specific sample position included in the block classification unit, and
wherein a horizontal position and a vertical position of the specific sample are both even or both odd based on each block classification unit.

* * * * *